(12) United States Patent
Jung et al.

(10) Patent No.: US 9,619,497 B2
(45) Date of Patent: **\*Apr. 11, 2017**

(54) METHODS AND SYSTEMS FOR MANAGING ONE OR MORE SERVICES AND/OR DEVICE DATA

(71) Applicant: Elwha LLC, Bellevue, WA (US)

(72) Inventors: Edward K.Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwah LLC, Bellevue, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/731,947

(22) Filed: Dec. 31, 2012

(65) Prior Publication Data

US 2014/0123299 A1 May 1, 2014

Related U.S. Application Data

(63) Continuation of application No. 13/731,624, filed on Dec. 31, 2012, which is a continuation-in-part of (Continued)

(51) Int. Cl.
*H04L 9/32* (2006.01)
*G06F 17/30* (2006.01)
(Continued)

(52) U.S. Cl.
CPC ........ *G06F 17/30312* (2013.01); *G06F 21/60* (2013.01); *G06F 21/62* (2013.01);
(Continued)

(58) Field of Classification Search
CPC ........ G06F 21/10; G06F 21/12; G06F 21/121; G06F 21/16; G06F 21/30; G06F 21/31; G06F 21/335; G06F 21/44
(Continued)

(56) References Cited

U.S. PATENT DOCUMENTS 6,029,175 A 2/2000 Chow et al.
6,122,520 A 9/2000 Want et al.
(Continued)

FOREIGN PATENT DOCUMENTS

EP 1818807 A 8/2007
WO WO 01/28273 A1 4/2001

OTHER PUBLICATIONS

Zhou, Yajin et al., "Taming Information-Stealing Smartphone Applications (on Android)," Proceedings of the 4th International Conference on Trust and Trustworthy Computing, Pittsburgh, PA, Jun. 2011, 15 pages.
(Continued)

*Primary Examiner* — Hosuk Song

(57) ABSTRACT

Computationally implemented methods and systems include acquiring obscured data, said obscured data including property data regarding at least one property of one or more devices, wherein said obscured data has been obscured to avoid uniquely identifying the one or more devices, acquiring one or more services configured to be carried out on the one or more devices, said acquiring at least partly based on the acquired obscured data including the property data regarding at least one property of the one or more devices, and offering the one or more services in exchange for access to identifying data configured to uniquely identify the one or more devices associated with the property data. In addition to the foregoing, other aspects are described in the claims, drawings, and text.

41 Claims, 32 Drawing Sheets

Related U.S. Application Data application No. 13/685,485, filed on Nov. 26, 2012, and a continuation-in-part of application No. 13/685,609, filed on Nov. 26, 2012, now abandoned, and a continuation-in-part of application No. 13/685,488, filed on Nov. 26, 2012, and a continuation-in-part of application No. 13/685,612, filed on Nov. 26, 2012, and a continuation-in-part of application No. 13/685,491, filed on Nov. 26, 2012, and a continuation-in-part of application No. 13/685,613, filed on Nov. 26, 2012, now abandoned, and a continuation-in-part of application No. 13/692,829, filed on Dec. 3, 2012, and a continuation-in-part of application No. 13/692,882, filed on Dec. 3, 2012.

(60) Provisional application No. 61/720,245, filed on Oct. 30, 2012, provisional application No. 61/720,874, filed on Oct. 31, 2012.

(51) Int. Cl.
  *G06F 21/60* (2013.01)
  *G06F 21/62* (2013.01)
  *G06F 21/74* (2013.01)
  *G06F 21/78* (2013.01)

(52) U.S. Cl.
  CPC .......... *G06F 21/6254* (2013.01); *G06F 21/74* (2013.01); *G06F 21/78* (2013.01); *G06F 2221/2105* (2013.01)

(58) Field of Classification Search
  USPC ............. 726/2–7, 26–30; 713/189, 193–194; 380/270
  See application file for complete search history.

(56) References Cited

U.S. PATENT DOCUMENTS

| | | | |
|---|---|---|---|
| 6,871,277 B1 | 3/2005 | Keronen | |
| 7,178,034 B2 * | 2/2007 | Cihula et al. | 713/186 |
| 7,203,752 B2 * | 4/2007 | Rice et al. | 709/225 |
| 7,269,853 B1 * | 9/2007 | Dunn | 726/27 |
| 7,496,652 B2 | 2/2009 | Pezzutti | |
| 7,647,164 B2 | 1/2010 | Reeves | |
| 7,685,238 B2 | 3/2010 | Etelapera | |
| 7,849,311 B2 | 12/2010 | Donlin et al. | |
| 7,860,807 B2 | 12/2010 | Kaneko et al. | |
| 7,873,957 B2 | 1/2011 | Nallipogu et al. | |
| 7,913,312 B2 * | 3/2011 | de Jong | 726/29 |
| 7,917,154 B2 | 3/2011 | Fortescue et al. | |
| 7,996,682 B2 | 8/2011 | Schutz et al. | |
| 8,364,389 B2 | 1/2013 | Dorogusker et al. | |
| 8,387,155 B2 * | 2/2013 | Gregg et al. | 726/29 |
| 8,504,729 B2 | 8/2013 | Pezzutti | |
| 8,578,483 B2 | 11/2013 | Seshadri et al. | |
| 8,630,494 B1 | 1/2014 | Svendsen | |
| 8,756,321 B2 | 6/2014 | Clark et al. | |
| 2001/0025316 A1 | 9/2001 | Oh | |
| 2002/0032798 A1 | 3/2002 | Xu | |
| 2003/0023726 A1 | 1/2003 | Rice et al. | |
| 2003/0045308 A1 | 3/2003 | Sidhu et al. | |
| 2004/0002902 A1 | 1/2004 | Muehlhaeuser | |
| 2004/0128500 A1 | 7/2004 | Cihula et al. | |
| 2005/0278342 A1 | 12/2005 | Abdo et al. | |
| 2006/0010047 A1 | 1/2006 | Minor | |
| 2007/0113079 A1 | 5/2007 | Ito et al. | |
| 2007/0136466 A1 | 6/2007 | Etelapera | |
| 2007/0232268 A1 | 10/2007 | Park et al. | |
| 2007/0273583 A1 | 11/2007 | Rosenberg | |
| 2008/0102856 A1 | 5/2008 | Fortescue et al. | |
| 2008/0126541 A1 | 5/2008 | Rosenberg et al. | |
| 2008/0153670 A1 | 6/2008 | McKirdy et al. | |
| 2009/0077085 A1 | 3/2009 | Olivieri et al. | |
| 2010/0024020 A1 | 1/2010 | Baugher et al. | |
| 2010/0082237 A1 | 4/2010 | Black | |
| 2010/0107225 A1 | 4/2010 | Spencer et al. | |
| 2010/0324819 A1 | 12/2010 | Nurminen et al. | |
| 2011/0022468 A1 | 1/2011 | Muster et al. | |
| 2011/0128568 A1 | 6/2011 | Bhogal et al. | |
| 2011/0179366 A1 | 7/2011 | Chae | |
| 2011/0190009 A1 | 8/2011 | Gerber, Jr. et al. | |
| 2011/0209221 A1 | 8/2011 | Hanson et al. | |
| 2011/0243553 A1 | 10/2011 | Russell | |
| 2011/0274011 A1 | 11/2011 | Stuempert et al. | |
| 2011/0295899 A1 | 12/2011 | James et al. | |
| 2012/0036345 A1 | 2/2012 | Chen et al. | |
| 2012/0054841 A1 | 3/2012 | Schultz et al. | |
| 2012/0084247 A1 | 4/2012 | Aguera Y Arcas et al. | |
| 2012/0089465 A1 | 4/2012 | Froloff | |
| 2012/0096080 A1 | 4/2012 | Levesque et al. | |
| 2012/0101952 A1 | 4/2012 | Raleigh et al. | |
| 2012/0117232 A1 | 5/2012 | Brown et al. | |
| 2012/0143662 A1 | 6/2012 | Heath | |
| 2012/0185912 A1 | 7/2012 | Lee et al. | |
| 2012/0209923 A1 | 8/2012 | Mathur et al. | |
| 2012/0222083 A1 | 8/2012 | Vaha-Sipila et al. | |
| 2012/0291101 A1 | 11/2012 | Ahlstrom et al. | |
| 2013/0014212 A1 | 1/2013 | Cohen | |
| 2013/0046632 A1 | 2/2013 | Grigg et al. | |
| 2013/0110854 A1 | 5/2013 | Lockhart et al. | |
| 2013/0124546 A1 | 5/2013 | Wormley et al. | |
| 2013/0179244 A1 | 7/2013 | Laffoon et al. | |
| 2013/0179988 A1 | 7/2013 | Bekker et al. | |
| 2013/0219461 A1 | 8/2013 | Esaki et al. | |
| 2013/0263000 A1 | 10/2013 | Lucas et al. | |
| 2013/0263206 A1 | 10/2013 | Nefedov et al. | |
| 2013/0282227 A1 | 10/2013 | Chen et al. | |
| 2013/0290359 A1 | 10/2013 | Eronen et al. | |
| 2013/0318627 A1 | 11/2013 | Lundkvist et al. | |
| 2013/0339234 A1 | 12/2013 | Prakash et al. | |
| 2014/0006616 A1 | 1/2014 | Aad et al. | |
| 2014/0031959 A1 | 1/2014 | Glode et al. | |
| 2014/0047062 A1 | 2/2014 | Krueger et al. | |
| 2014/0059695 A1 | 2/2014 | Parecki et al. | |
| 2014/0122890 A1 | 5/2014 | Prot | |
| 2014/0123300 A1 | 5/2014 | Jung et al. | |
| 2014/0195349 A1 | 7/2014 | Muster et al. | |

OTHER PUBLICATIONS

Holder, Joseph; "BlackBerry 101—Application permissions"; bearing a date of Dec. 31, 2010; printed on Sep. 28, 2016; pp. 1-6.
Extended European Search Report; European App. No. EP 14 75 7393; Oct. 13, 2016 (received by our Agent on Oct. 14, 2016); pp. 1-8.
Reddy et al.; "Biketastic: Sensing and Mapping for Better Biking"; CHI 2010; Apr. 10-15, 2010; pp. 1-4; ACM; located at http://research.cens.ucla.edu/people/estrin/resources/conferences/2010apr-Reddy-Shilton-Biketastic.pdf.
PCT International Search Report; International App. No. PCT/US14/19562; Jun. 10, 2014; pp. 1-2.

* cited by examiner

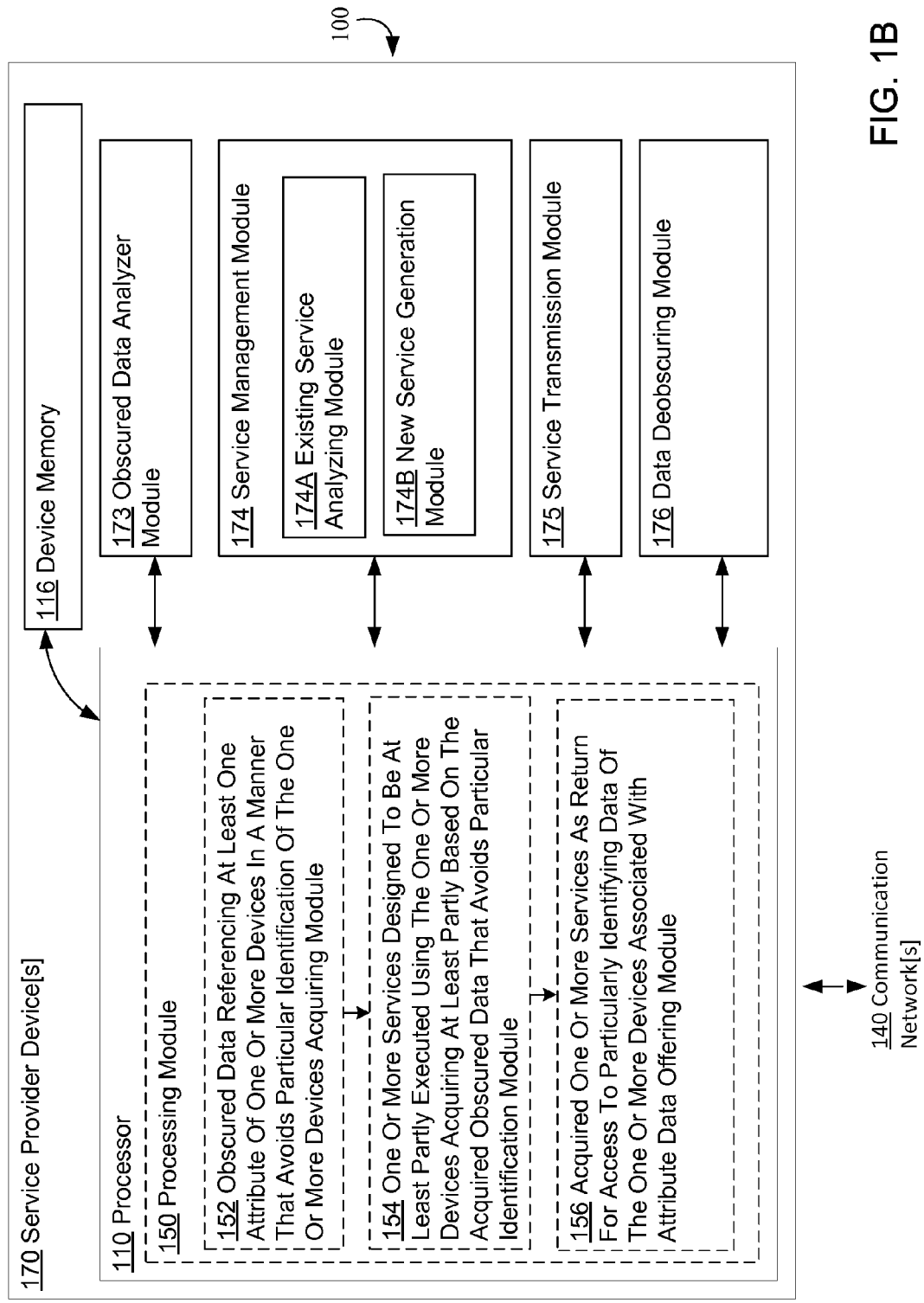

152 Obscured Data Referencing At Least One Attribute Of One Or More Devices In A Manner That Avoids Particular Identification Of The One Or More Devices Acquiring Module 204 Obscured Data Referencing A Number Of Devices Having At Least One Attribute At A Particular Time In A Manner That Avoids Particular Identification Of The One Or More Devices Acquiring Module

| 202 Obscured Data Referencing At Least One Attribute Of More Than One Devices In A Manner That Avoids Particular Identification Of Individual Devices Of The More Than One Devices Acquiring Module | 206 Obscured Data Referencing A Number Of Devices Having At A Particular Location At A Particular Time In A Manner That Avoids Particular Identification Of The One Or More Devices Acquiring Module | 208 Obscured Data Referencing A Number Of Devices Having An Image Capturing Sensor Having A Particular Resolution At A Particular Time In A Manner That Avoids Particular Identification Of The One Or More Devices Acquiring Module | 210 Obscured Data Referencing A Number Of Devices Having A Particular Type Of Data At A Particular Time In A Manner That Avoids Particular Identification Of The One Or More Devices Acquiring Module |
|---|---|---|---|
| | | | 212 Obscured Data Referencing A Number Of Devices Having More Than Twenty-five Contacts Stored In Memory At A Particular Time In A Manner That Avoids Particular Identification Of The One Or More Devices Acquiring Module |

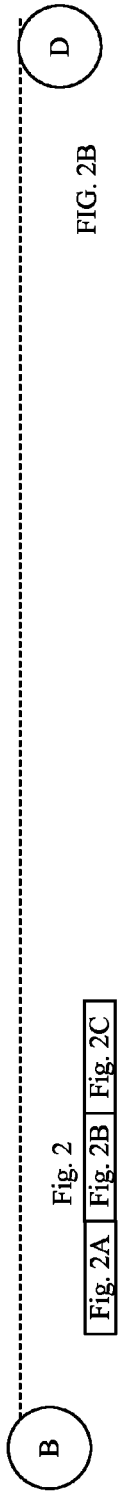

152 Obscured Data Referencing At Least One Attribute Of One Or More Devices In A Manner That Avoids Particular Identification Of The One Or More Devices Acquiring Module

228 Obscured Data Referencing At Least One Attribute Of One Or More Devices In A Manner That Avoids Particular Identification Of The One Or More Devices By Replacing Identification Data With Randomly Generated Data Acquiring Module

230 Obscured Data Referencing At Least One Attribute Of One Or More Devices In A Manner That Avoids Particular Identification Of The One Or More Devices By Replacing Identification Data With Nonrandomly Generated Data Acquiring Module

232 Obscured Data Referencing At Least One Attribute Of One Or More Devices In A Manner That Avoids Particular Identification Of The One Or More Devices By Replacing Identification Data With Ordered Data Configured To Appear Random Acquiring Module

234 Obscured Data Referencing At Least One Attribute Of One Or More Devices In A Manner That Avoids Particular Identification Of The One Or More Devices By Inserting False Identification Data Acquiring Module

236 Obscured Data Referencing At Least One Attribute Of One Or More Devices In A Manner That Avoids Particular Identification Of The One Or More Devices By Inserting False Identification Data Having A Same Format As True Identification Data Acquiring Module

238 Obscured Data Referencing At Least One Attribute Of One Or More Devices In A Manner That Avoids Particular Identification Of The One Or More Devices By Inserting Random Data Having A Similar Data Structure As True Identification Data Acquiring Module

| Fig. 2A | Fig. 2B | Fig. 2C |

154 One Or More Services Designed To Be At Least Partly Executed Using The One Or More Devices Acquiring At Least Partly Based On The Acquired Obscured Data That Avoids Particular Identification Module

302 Friend-finding Service Designed To Be At Least Partly Executed Using A Smartphone Acquiring At Least Partly Based On The Acquired Obscured Data That Avoids Particular Identification Module

304 Friend-finding Service Configured To Locate One Or More Entities Identified In The Smartphone And To Present A Notification On The Smartphone When One Or More Of The Located Entities Are Detected At A Particular Location Acquiring At Least Partly Based On The Acquired Obscured Data That Avoids Particular Identification Module

306 Friend-finding Service Configured To Locate One Or More Entities Identified In The Smartphone And To Present A Notification On The Smartphone When One Or More Of The Located Entities Are Detected At A Particular Location Acquiring At Least Partly Based On A Smartphone Contact List Property That Avoids Particular Identification Module

308 Friend-finding Service Configured To Locate One Or More Entities Identified In The Smartphone And To Present A Notification On The Smartphone When One Or More Of The Located Entities Are Detected At A Particular Location Acquiring At Least Partly Based On A Smartphone Contact List Property Of Having More Than Twenty Five Contacts Module

310 Friend-finding Service Configured To Locate One Or More Entities Identified In The Smartphone And To Present A Notification On The Smartphone When One Or More Of The Located Entities Are Detected At A Particular Location Acquiring At Least Partly Based On A Smartphone Contact List Property Of Having More Than Twenty Five Contacts That Meet A Particular Contact Criterion Module

312 Friend-finding Service Configured To Locate One Or More Entities Identified In The Smartphone And To Present A Notification On The Smartphone When One Or More Of The Located Entities Are Detected At A Particular Location Acquiring At Least Partly Based On A Smartphone Contact List Property Of Having More Than Twenty Five Contacts That Are Of Particular Gender Module

314 Friend-finding Service Configured To Locate One Or More Entities Identified In The Smartphone And To Present A Notification On The Smartphone When One Or More Of The Located Entities Are Detected At A Particular Location Acquiring At Least Partly Based On A Smartphone Contact List Property Of Having More Than Twenty Five Contacts That Are Of Particular Age Module

| Fig. 3A | Fig. 3B | Fig. 3C | Fig. 3D | Fig. 3E |

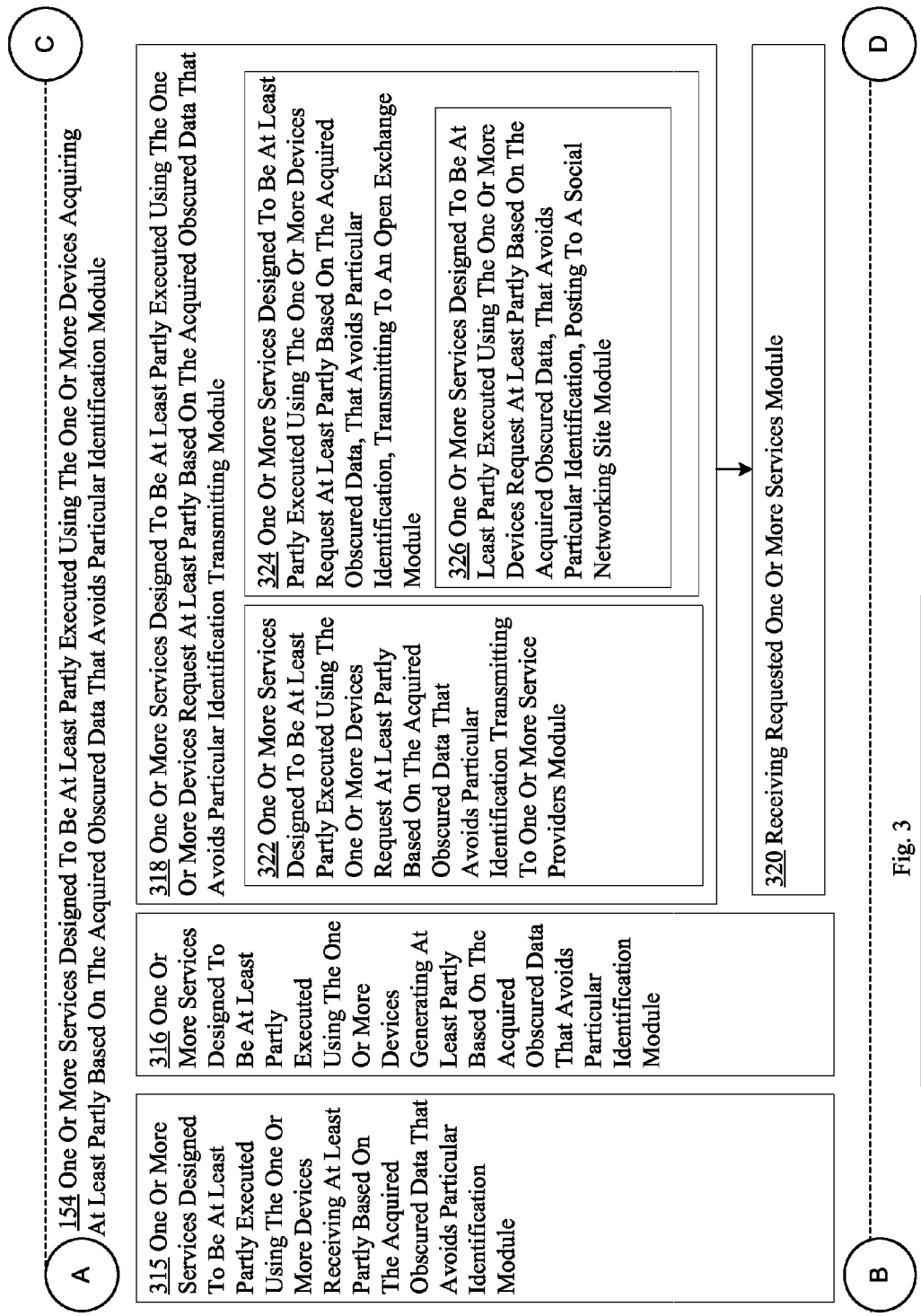

Fig. 3C

154 One Or More Services Designed To Be At Least Partly Executed Using The One Or More Devices Acquiring At Least Partly Based On The Acquired Obscured Data That Avoids Particular Identification Module 328 One Or More Services Designed To Be At Least Partly Executed Using The One Or More Devices Description Receiving Module 330 One Or More Received Described Services Designed To Be At Least Partly Executed Using The One Or More Devices Selecting At Least Partly Based On The Acquired Obscured Data That Avoids Particular Identification Module

| 332 One Or More Received Described Services Designed To Be At Least Partly Executed Using The One Or More Devices Selecting At Least Partly Based An Estimated Profitability Of The One Or More Received Described Services Module | 334 One Or More Received Described Services Designed To Be At Least Partly Executed Using The One Or More Devices Selecting At Least Partly Based An Estimated Device Agreement To Install Rate Of The One Or More Received Described Services Module |

| 336 One Or More Received Described Services Designed To Be At Least Partly Executed Using The One Or More Devices Selecting At Least Partly Based On The Acquired Obscured Data That Avoids Particular Identification And At Least Partly Based On A Received Described Service Property Module | 340 One Or More Received Described Services Designed To Be At Least Partly Executed Using The One Or More Devices Selecting At Least Partly Based On The Acquired Obscured Data That Avoids Particular Identification And At Least Partly Based On A Received Described Service Surcharge Module |
| 338 One Or More Received Described Services Designed To Be At Least Partly Executed Using The One Or More Devices Selecting At Least Partly Based On The Acquired Obscured Data That Avoids Particular Identification And At Least Partly Based On A Received Described Service Developer Identity Module | |

Fig. 3

| 154 One Or More Services Designed To Be At Least Partly Executed Using The One Or More Devices Acquiring At Least Partly Based On The Acquired Obscured Data That Avoids Particular Identification Module |
|---|

| 342 One Or More Services Designed To Be At Least Partly Executed Using The One Or More Devices Acquiring At Least Partly Based On An Estimated Value Of Data That Identifies The One Or More Devices Given In Exchange For Providing At Least A Portion Of The One Or More Services Module | 344 One Or More Services Designed To Be At Least Partly Executed Using The One Or More Devices Acquiring At Least Partly Based On An Estimated Resale Of Data That Identifies The One Or More Devices Given In Exchange For Providing At Least A Portion Of The One Or More Services Module | 346 One Or More Services Designed To Be At Least Partly Executed Using The One Or More Devices Acquiring At Least Partly Based On An Estimated Value Of Using Data That Identifies The One Or More Devices Given In Exchange For Providing At Least A Portion Of The One Or More Services Module | 348 One Or More Services Designed To Be At Least Partly Executed Using The One Or More Devices Developing At Least Partly Based On The Acquired Obscured Data That Avoids Particular Identification Module | 350 Bicycling Traffic Service Designed To Be At Least Partly Executed Using The One Or More Devices Acquiring At Least Partly Based On The Acquired Obscured Data That Indicates One Or More Devices That Are Identified As Moving On A Bicycle For One Hour Per Day Or More And Avoids Particular Identification Module | 352 Ice Cream Shop Information Service Designed To Be At Least Partly Executed Using The One Or More Devices Acquiring At Least Partly Based On The Acquired Obscured Data That Indicates One Or More Devices That Are Identified As In Proximity To An Ice Cream Shop When An Ambient Temperature Is Above A Particular Threshold And Avoids Particular Identification Module |

| Fig. 3A | Fig. 3B | Fig. 3C | Fig. 3D | Fig. 3E |

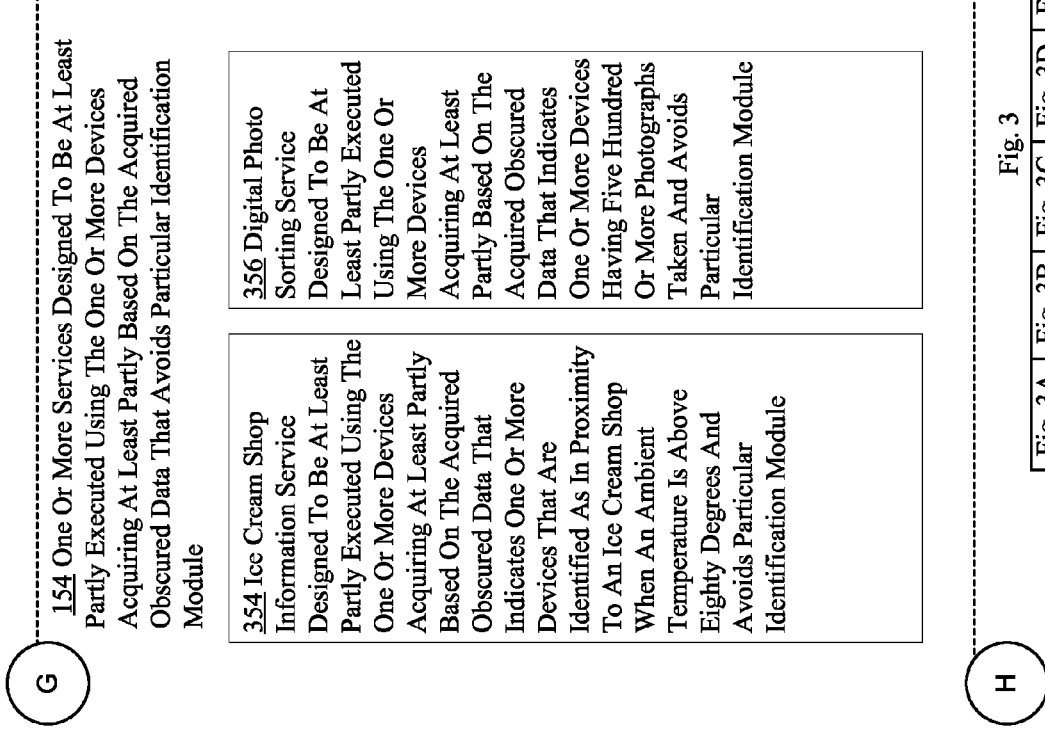

156 Acquired One Or More Services As Return For Access To Particularly Identifying Data Of The One Or More Devices Associated With Attribute Data Offering Module

| 402 Acquired One Or More Services As Return For Access To Particularly Identifying Data That Identifies One Or More Users Of The One Or More Devices Associated With Attribute Data Offering Module | 404 Acquired One Or More Services As Return For Access To Unique Device Identifier Data Of The One Or More Devices Associated With Attribute Data Offering Module | 406 Acquired One Or More Services As Return For Access To Service Login Credentials Used By At Least One Of The One Or More Devices Associated With Attribute Data Offering Module | 408 Acquired One Or More Services As Return For Access To Marketplace Login Credentials Used By At Least One Of The One Or More Devices Associated With Attribute Data Offering Module | 410 Acquired One Or More Services As Return For Access To Social Networking Site Login Credentials Used By At Least One Of The One Or More Devices Associated With Attribute Data Offering Module |

Fig. 4

| Fig. 4A | Fig. 4B | Fig. 4C | Fig. 4D |

FIG. 4A

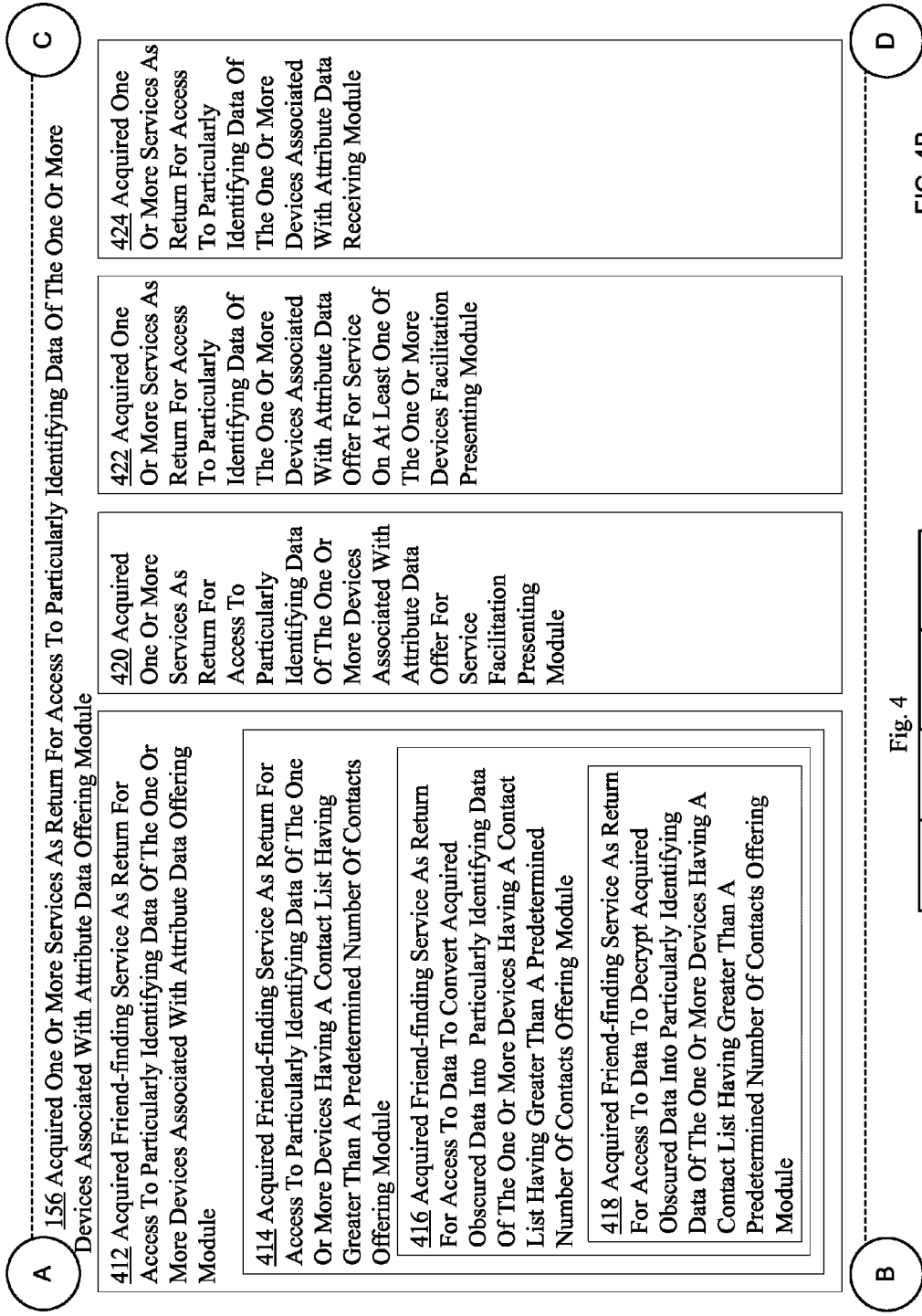

| Fig. 4A | Fig. 4B | Fig. 4C | Fig. 4D |

156 Acquired One Or More Services As Return For Access To Particularly Identifying Data Of The One Or More Devices Associated With Attribute Data Offering Module 430 Acquired One Or More Services As Return For Access To Particularly Identifying Data Configured To Deobscure The Acquired Obscured Data Offering Module 442 Acquired One Or More Services As Return For Access To Data Configured To Substitute An Anonymized Portion Of The Acquired Obscured Data With Particularly Identifying Data Using A Lookup Table Offering Module 444 Acquired One Or More Services As Return For Access To Data Configured To Filter Out A False Data Portion Of The Acquired Obscured Data And Leaving Particularly Identifying Data As A Remainder Offering Module 446 Acquired One Or More Services As Return For Access To An Algorithm For Which Application To The Acquired Obscured Data Results In Particularly Identifying Data Offering Module 448 Acquired One Or More Services As Return For Access To A Database Of Particularly Identifying Data Of The One Or More Devices Associated With Attribute Data Offering Module 450 Acquired One Or More Services As Return For Restricted Access To A Database Of Particularly Identifying Data Of The One Or More Devices Associated With Attribute Data Offering Module 452 Direct Delivery Of One Or More Services As Return For Access To Particularly Identifying Data Of The One Or More Devices Associated With Attribute Data Offering Module 454 Direct Delivery To One Or More Users Of The One Or More Devices, Of One Or More Services As Return For Access To Particularly Identifying Data Of The One Or More Devices Associated With Attribute Data Offering Module

| Fig. 4A | Fig. 4B | Fig. 4C | Fig. 4D |

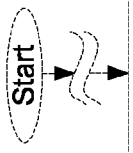
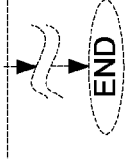

FIG. 7B

504 Acquiring One Or More Services Configured To Be Carried Out On The One Or More Devices, Said Acquiring At Least Partly Based On The Acquired Obscured Data Including The Property Data Regarding At Least One Property Of The One Or More Devices

702 Acquiring A Friend-finding Service Configured To Be Carried Out By A Smartphone, Said Acquiring At Least Partly Based On The Acquired Obscured Data Including The Property Data Regarding The At Least One Property Of The One Or More Devices

706 Acquiring A Friend-finding Service Configured To Be Carried Out By A Smartphone, Said Acquiring At Least Partly Based On The Acquired Obscured Data Including The Property Data Regarding The At Least One Property Of A Contact List Stored On The Smartphone

708 Acquiring The Friend-finding Service Configured To Be Carried Out By The Smartphone, Said Acquiring At Least Partly Based On The Acquired Obscured Data Including Property Data Indicating That More Than Twenty-five Contacts Are Stored On The Contact List Of The Smartphone

710 Determining, At Least Partly Based On A Level Of Protection Specified For The Particular Portion Of The Device, Whether To Accept The Offer To Facilitate Execution Of The One Or More Services And Grant Access To The Particular Portion Of The Device

714 Acquiring The Friend-finding Service Configured To Be Carried Out By The Smartphone, Said Acquiring At Least Partly Based On The Acquired Obscured Data Including Property Data Indicating That More Than Twenty-five Contacts That Are Between Ages Eighteen And Thirty-five Are Stored On The Contact List Of The Smartphone

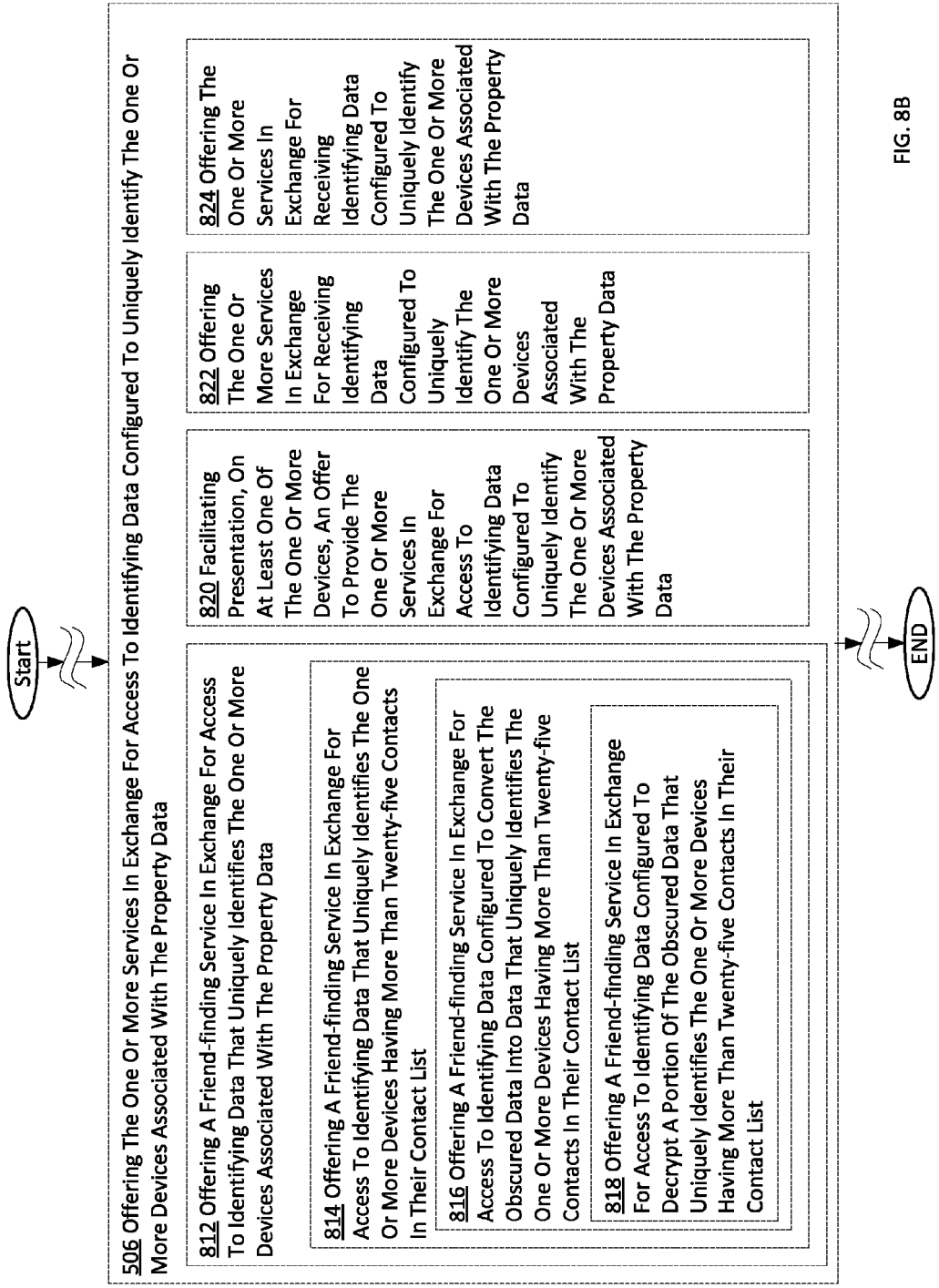

METHODS AND SYSTEMS FOR MANAGING ONE OR MORE SERVICES AND/OR DEVICE DATA

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 13/731,624, entitled METHODS AND SYSTEMS FOR MANAGING ONE OR MORE SERVICES AND/OR DEVICE DATA, naming Edward K. Y. Jung, Royce A. Levien, Richard T. Lord, Robert W. Lord, and Mark A. Malamud as inventors, filed 31 Dec. 2012, which is currently co-pending or is an application of which a currently co-pending application is entitled to the benefit of the filing date.

For purposes of the USPTO extra-statutory requirements, the present application claims benefit of priority of U.S. Provisional Patent Application No. 61/720,245 titled METHODS AND SYSTEMS FOR DATA SERVICES, naming Edward K. Y. Jung, Royce A. Levien, Richard T. Lord, Robert W. Lord, and Mark A. Malamud as inventors, filed 30 Oct. 2012, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 61/720,874 titled METHODS AND SYSTEMS FOR DATA SERVICES, naming Edward K. Y. Jung, Royce A. Levien, Richard T. Lord, Robert W. Lord, and Mark A. Malamud as inventors, filed 31 Oct. 2012, which was filed within the twelve months preceding the filing date of the present application or is an application of which a currently co-pending application is entitled to the benefit of the filing date.

For purposes of the USPTO extra-statutory requirements, the present application constitutes a continuation-in-part of U.S. patent application Ser. No. 13/685,485, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,609, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,488, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,612, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,491, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,613, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/692,829, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 3 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/692,882, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 3 Dec. 2012, which is currently co-pending or is an application of which a currently co-pending application is entitled to the benefit of the filing date.

RELATED APPLICATIONS

U.S. patent application Ser. No. 13/731,947, entitled METHODS AND SYSTEMS FOR MANAGING ONE OR MORE SERVICES AND/OR DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,641, entitled METHODS AND SYSTEMS FOR MANAGING SERVICES AND DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,960, entitled METHODS AND SYSTEMS FOR MANAGING SERVICES AND DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,968, entitled METHODS AND SYSTEMS FOR MANAGING DATA AND/OR SERVICES FOR DEVICES, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/732,127, entitled METHODS AND SYSTEMS FOR MANAGING DATA AND/OR SERVICES FOR DEVICES, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/732,305, entitled METHODS AND SYSTEMS FOR MONITORING AND/OR MANAGING DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/732,326, entitled METHODS AND SYSTEMS FOR MONITORING AND/OR MANAGING DEVICE DATA, naming Edward K. Y. Jung, Royce A. Levien, Richard T. Lord, Robert W. Lord, and Mark A. Malamud as inventors, filed 31 Dec. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to data services for devices.

SUMMARY

In one or more various aspects, a method includes but is not limited to acquiring obscured data, said obscured data including property data regarding at least one property of one or more devices, wherein said obscured data has been obscured to avoid uniquely identifying the one or more devices, acquiring one or more services configured to be carried out on the one or more devices, said acquiring at least partly based on the acquired obscured data including the property data regarding at least one property of the one or more devices, and offering the one or more services in exchange for access to identifying data configured to uniquely identify the one or more devices associated with the property data. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein—referenced method aspects depending upon the design choices of the system designer, and limited to patentable subject matter under 35 USC 101.

In one or more various aspects, a system includes, but is not limited to, means for acquiring obscured data, said obscured data including property data regarding at least one property of one or more devices, wherein said obscured data has been obscured to avoid uniquely identifying the one or more devices, means for acquiring one or more services configured to be carried out on the one or more devices, said acquiring at least partly based on the acquired obscured data including the property data regarding at least one property of the one or more devices, and means for offering the one or more services in exchange for access to identifying data configured to uniquely identify the one or more devices associated with the property data. In addition to the foregoing, other system aspects are described in the claims, drawings, and text forming a part of the disclosure set forth herein.

In one or more various aspects, a system includes, but is not limited to, circuitry for acquiring obscured data, said obscured data including property data regarding at least one property of one or more devices, wherein said obscured data has been obscured to avoid uniquely identifying the one or more devices, circuitry for acquiring one or more services configured to be carried out on the one or more devices, said acquiring at least partly based on the acquired obscured data including the property data regarding at least one property of the one or more devices, and circuitry for offering the one or more services in exchange for access to identifying data configured to uniquely identify the one or more devices associated with the property data. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for acquiring obscured data, said obscured data including property data regarding at least one property of one or more devices, wherein said obscured data has been obscured to avoid uniquely identifying the one or more devices, one or more instructions for acquiring one or more services configured to be carried out on the one or more devices, said acquiring at least partly based on the acquired obscured data including the property data regarding at least one property of the one or more devices, and one or more instructions for offering the one or more services in exchange for access to identifying data configured to uniquely identify the one or more devices associated with the property data. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for acquiring obscured data, said obscured data including property data regarding at least one property of one or more devices, wherein said obscured data has been obscured to avoid uniquely identifying the one or more devices, one or more interchained physical machines ordered for acquiring one or more services configured to be carried out on the one or more devices, said acquiring at least partly based on the acquired obscured data including the property data regarding at least one property of the one or more devices, and one or more interchained physical machines ordered for offering the one or more services in exchange for access to identifying data configured to uniquely identify the one or more devices associated with the property data.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1B shows a high-level block diagram of a service provider device 170 operating in an exemplary environment 100, according to an embodiment.

FIG. 2, including FIGS. 2A-2C, shows a particular perspective of an obscured data referencing at least one attribute of one or more devices in a manner that avoids particular identification of the one or more devices acquiring module 152 of processing module 150 of service provider device 170 of FIG. 1B, according to an embodiment.

FIG. 3, including FIGS. 3A-3E, shows a particular perspective of a one or more services designed to be at least partly executed using the one or more devices acquiring at least partly based on the acquired obscured data that avoids particular identification module 154 of processing module 150 of service provider device 170 of FIG. 1B, according to an embodiment.

FIG. 4, including FIGS. 4A-4D, shows a particular perspective of an acquired one or more services as return for access to particularly identifying data of the one or more devices associated with attribute data offering module 156 of processing module 150 of service provider device 170 of FIG. 1B, according to an embodiment.

FIG. 7B is a high-level logic flow chart of a process depicting alternate implementations of an acquiring one or more services operation 504, according to one or more embodiments.

FIG. 8B is a high-level logic flow chart of a process depicting alternate implementations of a facilitating performance of at least a portion of the at least one service operation 506, according to one or more embodiments.

DETAILED DESCRIPTION

Figure 1A:
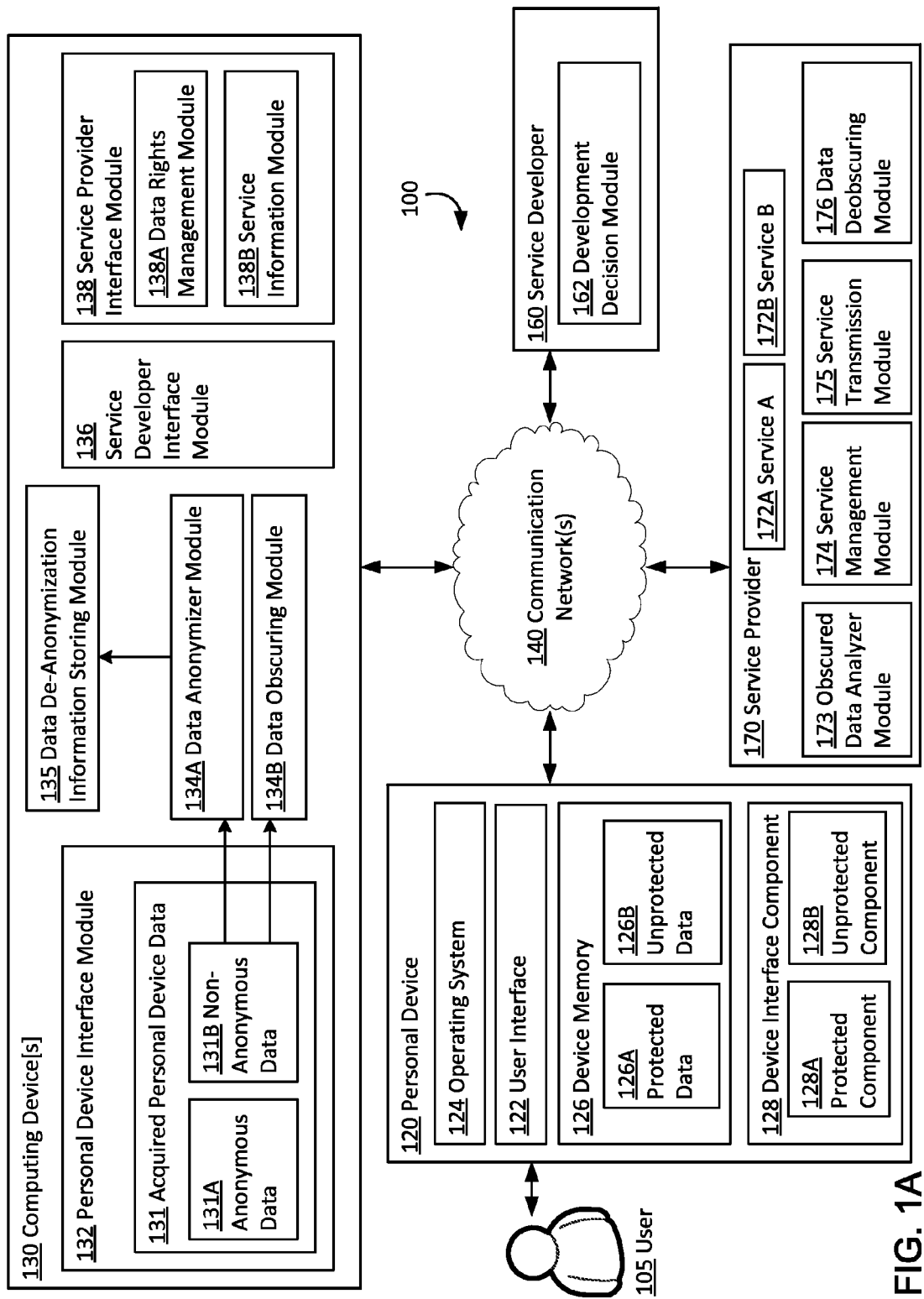
FIG. 1A shows a high-level block diagram of an exemplary environment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for acquiring obscured data, said obscured data including property data regarding at least one property of one or more devices, wherein said obscured data has been obscured to avoid uniquely identifying the one or more devices, acquiring one or more services configured to be carried out on the one or more devices, said acquiring at least partly based on the acquired obscured data including the property data regarding at least one property of the one or more devices, and offering the one or more services in exchange for access to identifying data configured to uniquely identify the one or more devices associated with the property data.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein, e.g., in FIG. 1, and other places, as a single illustrated figure, those skilled in the art will appreciate that user 105 may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In known systems, devices that are associated with one or more users, e.g., phones, tablets, laptops, desktops, cars, game systems, appliances, and the like, may collect data regarding the user. This data may be desired by third parties. The following describes, among other implementations, methods and systems of managing user data collected by one or more devices that may also be useful to entities that are not the user, and which entities may not necessarily have access to the data.

Referring now to FIG. 1, FIG. 1 illustrates an example environment 100 in which the methods, systems, circuitry, articles of manufacture, and computer program products and architecture, in accordance with various embodiments, may be implemented by one or more computing devices 130. As shown in FIG. 1A, one or more personal devices 120, one or more service providers 170, one or more service developers 160, and one or more computing devices 130 may communicate via one or more communication networks 140. In an embodiment, service provider 170 may have one or more services that personal device 120 may want. In an embodiment, computing device 130, which may be a remote or local server, or distributed set of servers, may manage data that is gathered, stored, controlled, accessed, restricted, monitored, under the control of, checked, examined, verified, authenticated, authorized, manipulated, updated, altered, filtered, or otherwise acted upon, whether passively or actively, by personal device 20. In an embodiment, as described in more detail herein, computing device 130 may have access to some or all of the data on personal device 120. In another embodiment, computing device 130 may have access to only a portion of the data on personal device 120. In still another embodiment, computing device 130 may have access to a modified version of the data on personal device 120. Specifically, in an embodiment, computing device 20 may have access to the data stored on personal device 120, but in anonymous form.

In an embodiment, computing device 130 may offer one or more services to personal device 120. In an embodiment, the offer of one or more services may be conditional on a grant of access to part or all of the data stored and/or collected by personal device 120. In an embodiment, computing device 130 may receive one or more services from service provider 170 and/or service developer 160, and may select one or more of the received services for presentation to the personal device 120. In an embodiment, the data from personal device 120 may be shared with one or more of service provider 170 and service developer 160. In an embodiment, the data from personal device 120 may be anonymized prior to sharing with service developer 160 and/or service developer 170.

Referring again to FIG. 1A, FIG. 1A shows a personal device 120. Personal device 120 may be any electronic device, portable or not, that may be operated by or associated with one or more users. Personal device 120 is shown as interacting with a user 105. As set forth above, user 105 may be a person, or a group of people, or another entity that mimics the operations of a user. In some embodiments, user 105 may be a computer or a computer-controlled device. Personal device 120 may be, but is not limited to, a cellular phone, a network phone, a smartphone, a tablet, a music player, a walkie-talkie, a radio, a USB drive, a portable solid state drive, a portable disc-type hard drive, an augmented reality device (e.g., augmented reality glasses and/or headphones), earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring again to FIG. 1A, personal device 120 may include an operating system 124. In this context, operating system 124 refers to any hardware, software, firmware, and combination thereof which is considered at the core or baseline of a device. For example, applications that interact directly with hardware may be considered to be part of an operating system. In some embodiments, operating system 124 may be an FPGA, printed circuit board, or other wired device. In an embodiment, operating system 124 may include one or more of Google's Android, Apple's iOS, Microsoft's Windows, various implementations of Linux, and the like. In some embodiments, operating system 124 may include a root menu for one or more televisions, stereo systems, media players, and the like. In some embodiments, operating system 124 may be a "home" screen of a device.

Referring again to FIG. 1A, in an embodiment, personal device 20 may include a user interface 123. User interface 123 may include any hardware, software, firmware, and combination thereof that allow a user 105 to interact with a personal device 120, and for a personal device 120 to interact with a user 105. In some embodiments, user interface 123 may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, and the like.

Referring again to FIG. 1A, in some embodiments, personal device 120 may include a device memory 126. In some embodiments, device memory 126 may include memory, random access memory ("RAM"), read only memory ("ROM"), flash memory, hard drives, disk-based media, disc-based media, magnetic storage, optical storage, volatile memory, nonvolatile memory, and any combination thereof. In some embodiments, device memory 126 may be separated from the device, e.g., available on a different device on a network, or over the air. For example, in a networked system, there may be many personal devices 120 whose device memory 126 is located at a central server that may be a few feet away or located across an ocean.

Referring again to FIG. 1A, in some embodiments, device memory 126 may include one or more of protected data 126A and unprotected data 126B. Not all embodiments include each or both of these, but protected data 126A and unprotected data 126B may be present in one or more embodiments. Protected data 126A may include any data, including data stored on personal device 120, data for which personal device 120 maintains at least partial control of, data for which personal device 120 monitors or provides the ability to monitor, and the like, for which some form of authorization is required to access the data. The authorization may take any form and relate to any sub-unit, including both internally and externally to the device. For example, in an embodiment, protected data 126A may include data which is not available to at least one application running on a computing device. For another example, in an embodiment, protected data 126A may be available to one application at any time, and to another application at specific times, or at times when the first application is not using the data. In an embodiment, protected data 126A includes data for which an application must be authenticated (e.g., a Microsoft operating system certification, or a user flag set to true) in order to access the protected data 126A.

In an embodiment, protected data 126A includes data that a user, e.g., user 105, cannot view until the user 105 verifies their identity, e.g., through a password input or biometric identification. In an embodiment, protected data 126A is limited to the device, and is not transmitted to any other system not under the direct control of the personal device 120. In an embodiment, protected data 126A is limited to the personal device 120, and only applications originating at the personal device 120, or originating with the user 105, are allowed to read protected data 126A. In an embodiment, personal device 120 modifies or directs to be modified protected data 126A, so at least a portion of the protected data 126A is altered or obscured. In an embodiment, personal device 120 allows protected data 126A to be transmitted to an external entity under the condition that the external entity will alter or obscure at least a portion of the protected data 126A.

Referring again to FIG. 1A, in an embodiment, personal device 120 may include device memory 126, which, in some embodiments, may include unprotected data 26B. In an embodiment, unprotected data 126B may have no protections or limitations. In another embodiment, unprotected data 126B may have protections and limitations, but be less protected and/or less limited than protected data 126B. In an embodiment, unprotected data 126B is broadcasted or otherwise transmitted upon request. In an embodiment, unprotected data 126B cannot be accessed by an entity external to personal device 120 due to device design or other factors, but there is no specific protection on unprotected data 126B from access by one or more entities external to personal device 20.

Referring again to FIG. 1A, in an embodiment, personal device 120 may include device interface component 128. In an embodiment, device interface component 128 includes any component that allows the device to interact with its environment. For example, in an embodiment, device interface component 128 includes one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, and the like. In an embodiment, device interface component 128 also may include one or more user interface components, e.g., user interface 122 (e.g., although they are drawn separately, in some embodiments, user interface 122 is a type of device interface component 128), and in some embodiments including one or more user input receiving components and output presenting components.

Referring again to FIG. 1A, in an embodiment, device interface component 128 may include protected component 128A. Protected component 128A may include any device interface component 128, of which some non-limiting examples previously were enumerated, for which some form of authorization and/or authentication is required to access the data. The authorization may take any form and relate to any sub-unit, including both internally and externally to the device. In an embodiment, protected component 128A is similar to protected data 126A. For example, in an embodiment, a personal device 120, e.g., a smart phone, may have twelve applications running on the smartphone. In an embodiment, six of those applications may have access to a protected component 128A, e.g., a positioning sensor, and the other six may not. In some embodiments, data collected by a protected component 128A is part of the protected component 128A. In some embodiments, data collected by a protected component 128A becomes protected data 126A. In some embodiments, data collected by a protected component 128A becomes protected data 126A some of the time, or none of the time. In some embodiments, data collected by a protected component 128A may be part of protected component 128A for a particular amount of time, e.g., two weeks, and then may transition to unprotected data or data that is not considered protected or unprotected. In some embodiments, a protected component 128A may be accessible to everyone at particular times and/or circumstances. For example, a protected component 128A, e.g., a wireless radio, may be accessible to any entity between the hours of 7 and 8 pm, and only accessible to specific entities and/or applications at other times. In some embodiments, a protected component 128A, e.g., an image capturing component, may be accessible to any entity when one or more conditions are met, which conditions may or may not be related to the protected component 128A or the personal device 120, e.g., when the personal device 120 is at a particular location.

Referring again to FIG. 1A, in some embodiments, computing device 130 may include personal device interface module 132. In some embodiments, personal device interface module 132 may communicate with one or more personal devices 120. In some embodiments, personal device interface module 132 may receive data 131 received from a personal device 120. Acquired personal device data 131 may include any data gathered from personal device 120, in any manner. In some embodiments, computing device 130 may request data from personal device 120. In some embodiments, computing device 130 may receive data from personal device 120 on a schedule. In some embodiments, computing device 130 may retrieve data from personal device 120 when certain conditions are met. In some embodiments, personal device 120 is broadcasting data, and computing device 130 gathers the broadcasted data. In some embodiments, personal device 120 broadcasts data that only computing device 130 can use (e.g., decrypt, interpret, or the like). In some embodiments, personal device 120 may transmit acquired personal device data 131 to computing device 130 using one or more communication networks 140, which will be described in more detail herein.

Referring again to FIG. 1A, in some embodiments, the acquired personal device data 131 may be anonymous data 131A. In an embodiment, anonymous data refers to data from which the origin of the data cannot be uniquely identified. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification. It is noted that, in some embodiments, the device may be able to recognize the origin of the data, e.g., an identity of personal device 120, that is transmitting the data due to the nature of the data transmission, but be unable to deduce the origin of the data through the data itself, in which case, in some embodiments, this data is still considered anonymous data 131A.

Anonymous data 131A may include data for which uniquely identifying information has been removed, or data for which uniquely identifying information has been concealed, obscured, made uncertain, made ambiguous, screened, camouflaged, masked, veiled, shrouded, hidden, encoded, encrypted, or otherwise altered. In some embodiments, the received anonymous data 131A never included uniquely identifying information. In some embodiments, anonymous data 131A may partially or non-uniquely identify its origin, e.g., the user 105 or the personal device 120 from which the anonymous data came. In some embodiments, uniquely identifying information may be extracted from anonymous data 131A using additional information, e.g., a lookup table, hash, or other known algorithm. In some embodiments, uniquely identifying information may be deduced from anonymous data 131A without additional information. In some embodiments, uniquely identifying information may not be retrieved from anonymous data 131A once the data is in its anonymous format.

In an embodiment, acquired personal device data 131 may include non-anonymous data 131B. In some embodiments, non-anonymous data 131B may identify, either explicitly or implicitly, the origin of the data. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification.

Referring to FIGS. 1A-1D, data anonymization systems and methods are illustrated. Although these systems and methods are illustrated as part of computing device 130, this is merely for convenience of drawing. In an embodiment, one or more of data de-anonymization information storing module 135, data anonymizer module 134A, and data obscuring module 134B may be located within personal device 120. In an embodiment, these modules may interact directly with device memory 126. In an embodiment, as pictured in FIG. 1A, computing device 130 may include a data anonymizer module 134A that converts non-anonymous data 131B into anonymized data, in a process described in more detail with respect to FIGS. 1C and 1D. In an embodiment, depending on the type of anonymization, there may be additional data that can be used to return the anonymized data into non-anonymous data, e.g., a lookup table. In some such embodiments, the additional data, e.g., de-anonymization data, may be stored in data de-anonymization information storing module 135.

Referring again to FIGS. 1A-1D, in an embodiment, computing device 130 may include a data obscuring module 134B. For example, in an embodiment, data obscuring module 134B may obscure the non-anonymous data 131B, similarly to the data anonymizer module 134A. For example, in an embodiment, data obscuring module 134B may apply data masking. In an embodiment, data obscuring module 134B may obscure by addition, e.g., by adding false identification information to the true identification information, so that the false identification information may not be distinguished from the true identification information. Data de-anonymization information storing module 135, data anonymizer module 134A, and data obscuring module 134B may be absent in some embodiments.

Referring again to FIG. 1A, in an embodiment, computing device 130 may include service developer interface module 136. Service developer interface module 136 may communicate with service developer 160, e.g., via communication network 140. Specifically, in an embodiment, service developer interface module 136 may provide limited information regarding the acquired personal device data 131. In an embodiment, for example, service developer interface module 136 may provide information to service developer 160 regarding the type of data collected. In an embodiment, for example, service developer interface module 136 may provide information to service developer 160 regarding an aggregate synopsis of the data collected. In an embodiment, service developer 160 may receive such information and make a decision about what types of services to develop, e.g., using development decision module 162.

Referring again to FIG. 1A, in an embodiment, computing device 130 may include service provider interface module 138. In an embodiment, service provider interface module 138 may communicate with service provider 170, e.g., via communication network 140.

In an embodiment, service provider interface module 138 may include data rights management module 138A. In an embodiment, data rights management module 138A may keep track of which services have rights to which personal device data. For example, in an embodiment, service 172A may have rights to certain anonymous data 131A. For another example, in an embodiment, service 172B may have rights to data that has been processed through the data anonymizer 134A.

Referring again to FIG. 1A, in an embodiment, service provider interface module 138 may include service information module 138B. Service information module 138B may include a list of services that are provided from service provider 170, so that such information may be delivered to personal device 120, in an embodiment. In an embodiment, computing device 130 may present one or more of the services listed in service information module 138B to personal device 120, either upon request, or upon detecting that personal device 120 may be interested in one or more of the services.

Referring again to FIG. 1A, in an embodiment, service provider 170 may provide services to a personal device 120. In an embodiment, these services may be delivered to directly to personal device 120. In an embodiment, service provider 170 has limited or no communication with personal device 120, and communication is handled through an intermediary, e.g., computing device 130. In an embodiment, computing device 130 handles the delivery of services and data between service provider 170 and personal device 120 such that protected data 126A and protected component 128A are protected from service provider 170, but that service provider 170 can still provide services, e.g., service 172A and service 172B, to personal device 120. In an embodiment, service provider 170 includes a list of services management module 174 that maintains a list of services to present to computing device 130, e.g., to allow service information module 138B of computing device 130 to maintain information about various services.

In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" as used herein and in the drawings refers to one or more communication networks, which may or may not interact with each other and which, in some embodiments, may work in concert, wittingly or unwittingly, to facilitate communication between one or more entities.

Figure 1C:
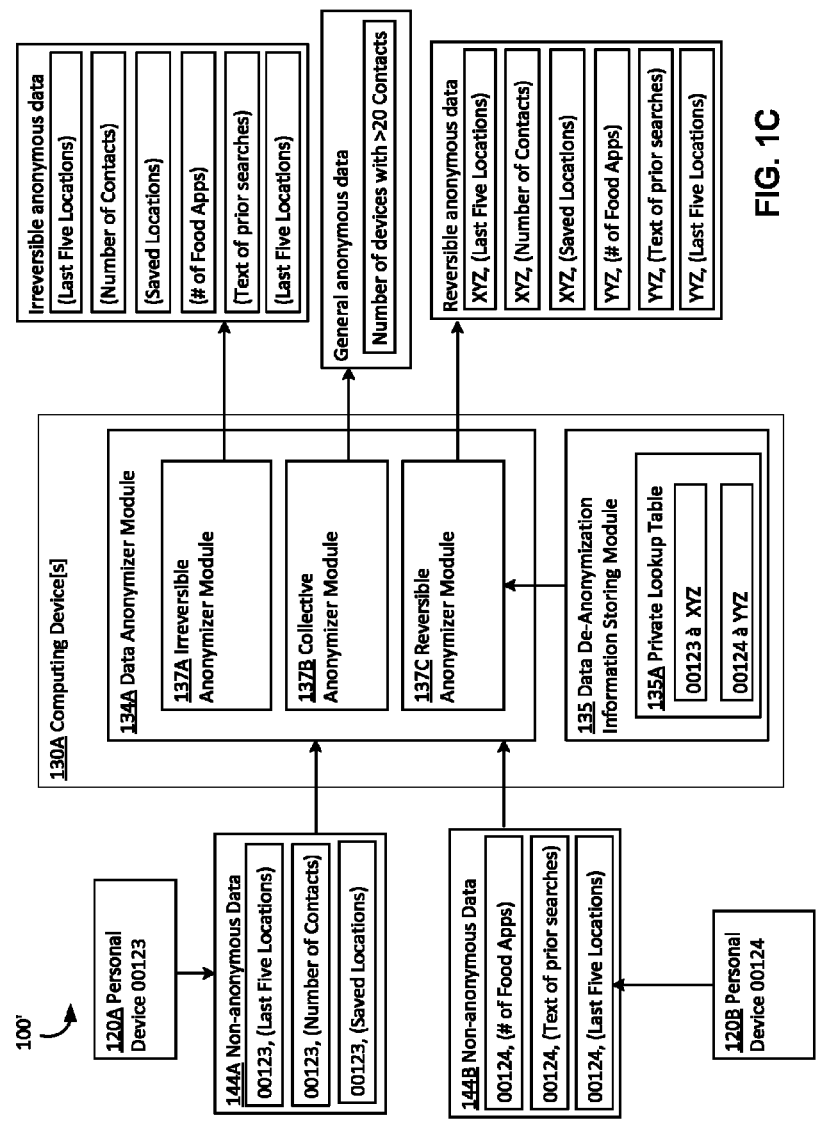
FIG. 1C shows a high level block diagram of a computing device 130A operating in an exemplary embodiment 100', according to an embodiment.

Referring now to FIG. 1C, an embodiment may include a personal device 120A and a personal device 120B. Personal device 120A may generate non-anonymous data 144A, and personal device 120B may generate non-anonymous data 144B. Non anonymous data 144A and non-anonymous data 144B may be transmitted to computing device 130A, which may be a non-exclusive and non-limiting example of computing device 130. In an embodiment, computing device 130A may include a data anonymizer module 134A. In an embodiment, data anonymizer module 134A may include irreversible anonymizer module 137A, which generates anonymous data that is irreversible, e.g., in an example, the identifying data has been removed. In an embodiment, data anonymizer module 134A may include collective anonymizer module 137B, which may take the non-anonymous data 144A and the non-anonymous data 144B and create an aggregated, general anonymous data, as shown FIG. 1C. In an embodiment, data anonymizer module 134A may include reversible anonymizer module 137C, which may use a private lookup table 135A to convert the non-anonymous data into anonymous data. In an embodiment, that private lookup table 135A may be stored in the data-deanonymization information storing module 135.

Figure 1D:
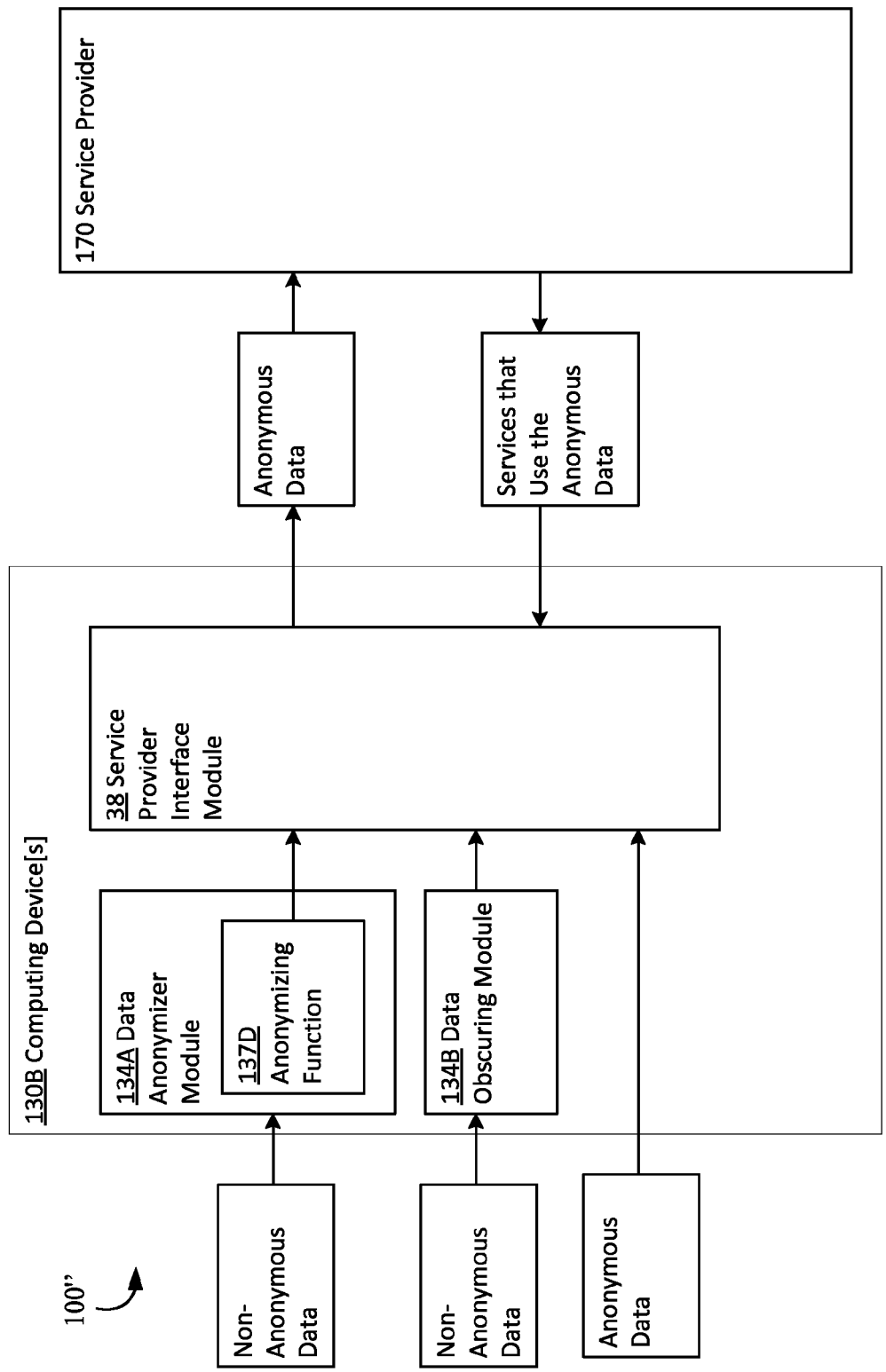
FIG. 1D shows a high-level block diagram of a computing device 130B operating in an exemplary embodiment 100", according to an embodiment.

Referring now to FIG. 1D, in an embodiment, a computing device 130B may have a data anonymizer 134A that may apply an anonymizing function 132A, as shown in FIG. 1D. For example, an anonymizing function may use a cryptographic method, a perturbation method, a DataFly algorithm, top-down specialization, and/or Mondarian multidimensional k-anonymity, as non-limiting and non-exclusive examples. In another embodiment, a data obscuring module 134B obscures the non-anonymous data. In an embodiment, the obscuring may be accomplished by adding similar-looking and plausible "false" data to the actual identifying data, so that later, the true data cannot be determined merely by looking at the data. In an embodiment, the anonymized data may be used by the service provider interface module 38 to give data to the service provider 170, either to carry out a portion of a service, or to determine which services may be useful to one or more personal devices 120.

The examples shown in FIGS. 1C and 1D are merely examples of how a data anonymizer might be implemented, and are not intended to be limiting or exclusive. There are many other techniques for anonymizing the data, some of which will be mentioned herein.

Figure 1E:
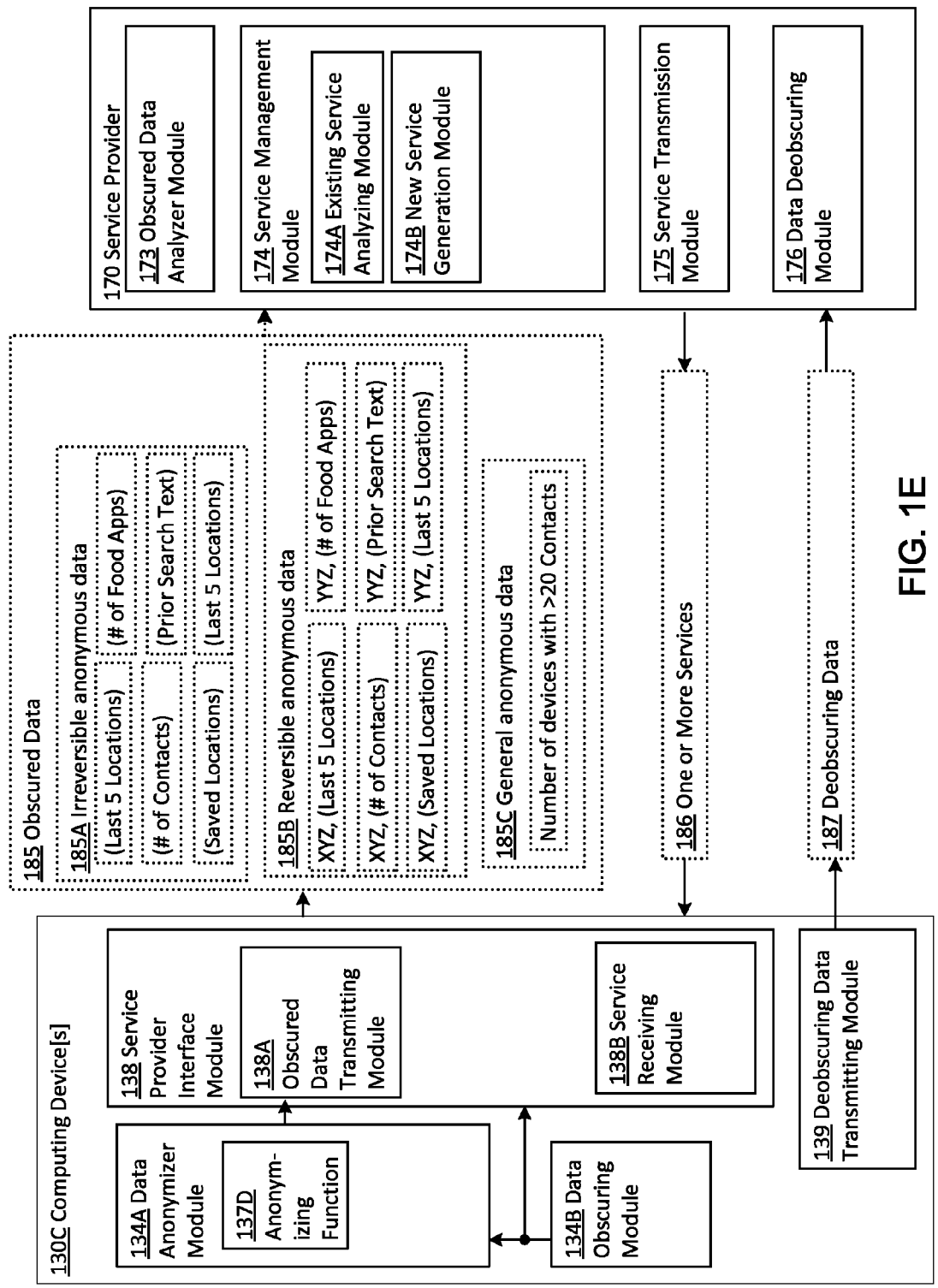
FIG. 1E shows a high-level block diagram of a computing device 130C operating in an exemplary embodiment 100''', according to an embodiment.

Referring now to FIG. 1E, FIG. 1E shows an embodiment of the invention focusing on a service provider 170 and a computing device 130C. Computing device 130C may receive data from one or more devices, and that data may be anonymized already, or may not be anonymized, or may already be obscured. In an embodiment, computing device 130C may generate obscured data from the data received from one or more devices, whether received directly from the one or more devices, or indirectly from another source. In an embodiment, Computing device 130C may obscure received data, even if the received data is already anonymized. In another embodiment, computing device 130C may not perform additional steps on previously anonymized or obscured data.

Referring again to FIG. 1E, in an embodiment, computing device 130C may request one or more services 190 that may be executed on one or more devices. The one or more services may be performed independently by the one or more devices, or may be performed with facilitation of one or more portions of the services by computing device 130C. Computing device 130C may request that service provider 170 provide one or more services that can be presented to the one or more devices. In an embodiment, computing device 130C may transmit obscured data 185 to service provider 170. This transmission may take place via any form of network, e.g., communication network 140 (not pictured in FIG. 1E). In an embodiment, service provider 170 may be integral with computing device 130C. In an embodiment, service provider 170 and computing device 130C may be under the control of a single entity.

Referring again to FIG. 1E, in an embodiment, service provider 170 may receive the obscured data 185. The obscured data 185 may be in any format, as described in several examples herein. The examples illustrated in FIG. 1E and in the following figures are intended for ease of understanding only, and should not be considered an exhaustive or an exclusive enumeration of ways that data may be obscured. For example, in an embodiment, irreversible anonymous data 185A may be obscured by deleting the device origin information from the data, such that the data cannot be recovered using the irreversible anonymous data 185A. In order to obtain the original device information that formed the irreversible anonymous data 185A, a copy of the original data may be retrieved. For example, in an embodiment, computing device 130C may store a separate copy of the data that resulted in the irreversible anonymous data 185A, with uniquely identifying device information present in the copy kept by computing device 130C.

In an embodiment, obscured data 185 may include reversible anonymous data 185B. Data 185B is not limited to a particular type of format, but a simple example is shown. In the example, the device identifiers of the one or more personal devices 120A and 120B, e.g., 00123 and 00124, are converted to new identifiers XYZ and YYZ (e.g., as shown in FIG. 1C), which, in an embodiment, may prevent service provider 170 from learning the identity of devices 00123 and 00124. In an embodiment, reversible anonymous data 185B may be converted into data that uniquely identifies one or more devices, through the providing of one or more algorithms, lookup tables, keys, encryption keys, hash functions, and the like.

In an embodiment, obscured data 185 may include general anonymous data 185C. In an embodiment, this type of data may include any format of aggregated data which gives information about one or more devices, but does not particularly identify the one or more devices that led to the aggregate information. For example, general anonymous data 185C may include such data as "thirty-five devices with more than twenty contacts in a contact list found," or more specific data, such as "thirty-five smartphones, e.g., Apple iPhone 4S running iOS 6.0, with more than 2.0 gigabytes of space remaining, with more than twenty contacts in a contact list found."

Referring again to FIG. 1E, in an embodiment, service provider 170 may receive obscured data 185, as shown in FIG. 1E. In an embodiment, service provider 170 may include an obscured data analyzer module 173. Obscured data analyzer module 173 may receive the obscured data 185 and use the obscured data 185 to determine one or more services or types of services that may be useful to the devices referenced in the obscured data 185. Obscured data analyzer module 173 may be completely automated, or may have some human intervention in the process. In an embodiment, obscured data analyzer 173 may obtain obscured data 185 from several different computing devices 130C, which may allow service provider 170 to provide one or more services more efficiently. In an embodiment, service provider 170 may include service management module 174. Service management module 174 may include existing service analyzing module 174A and new service generation module 174B. Existing service analyzing module 174A and new service generation module 174B may work together or separately, and with or without obscured data analyzer module 173, to determine if a service exists that meets the needs determined based on the received obscured data. If such a service does not exist, then new service generation module 174B may generate a new service, either by requesting from a third party, requesting human intervention, e.g., human programming of a new service, or may generate a new service automatically.

In an embodiment, service provider 170 may include a service transmission module 175, which may transmit one or more services 186 back to the computing device 130C, e.g., to service receiving module 138B, which, in an embodiment, may be a portion of service provider interface module 138. In various embodiments, once one or more actions are taken with respect to receiving the one or more services 186, deobscuring data 187, which may be data that can deobscure the obscured data 185, may be transmitted to the service provider 170, e.g., to data deobscuring module 176 of service provider 170. In an embodiment, deobscuring data 187 is combined with obscured data 185 to result in deobscured data. In another embodiment, deobscuring data 187 does not need to be combined with obscured data 185 in order to result in the deobscured data. In an embodiment, deobscuring data 187 may be transmitted upon receipt of one or more services 186. In another embodiment, one or more actions related to one or more services 186, e.g., proposing the one or more services to one or more devices, may be carried out prior to transmitting the deobscuring data 187. In an embodiment, if a particular number of users do not use one or more services 186, then computing device 130C may not transfer deobscuring data 187.

Figure 1F:
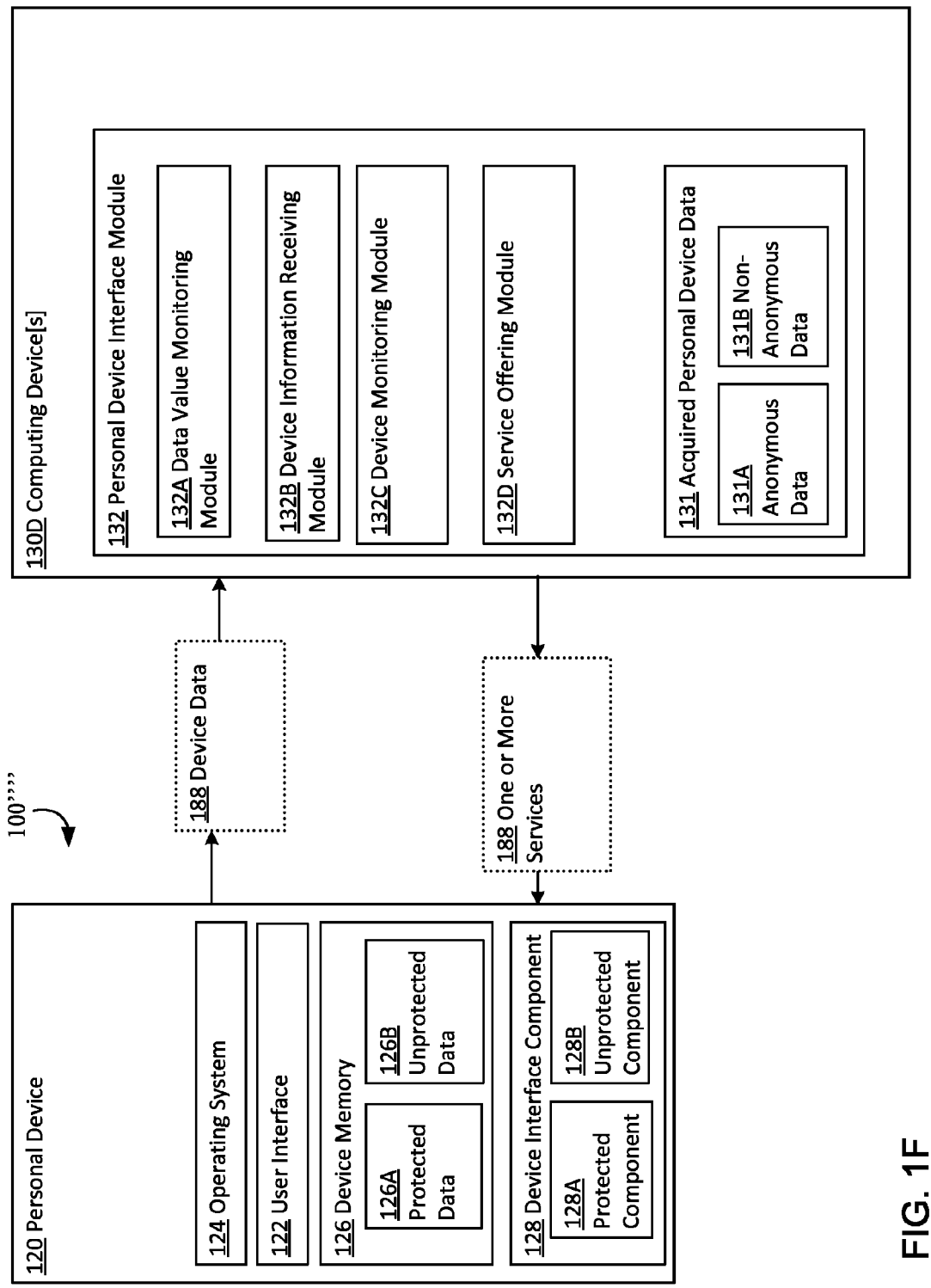
FIG. 1F shows a high-level block diagram of a computing device 130D operating in an exemplary embodiment 100"", according to an embodiment.

Referring now to FIG. 1F, FIG. 1F shows an embodiment of the invention as shown in exemplary embodiment 100"". For example, FIG. 1F shows computing device 130D interacting with personal device 120. In an embodiment, computing device 130D receives device data 188 from personal device 120. Although FIG. 1F shows this transfer as coming directly from personal device 120, in an embodiment, computing device 130D may receive device data 188 from any source, including a third device, a communication network, a social networking site, a device manufacturer, and the like. In an embodiment, computing device 130D monitors one or more personal devices 120 for device data 188. In an embodiment, computing device 130D monitors one or more other sources for device data 188 regarding personal devices 120.

In an embodiment, device data 188 may include data that personal device 120 has collected. In an embodiment, the device data 188 may be modified to obscure an identity of the device 120 or a user of the device 120. In an embodiment, the device data 188 is not obscured. In an embodiment, device data 188 may be about data that is stored on device 120 or otherwise under the control of personal device 120, rather than being the actual data under the control of personal device 120. For example, as shown in FIG. 1F, personal device 120 may include protected data 126A, which, in an embodiment, may include the last thirty locations visited by personal device 120. In an embodiment, device data 188 may include the last thirty locations visited by personal device 120. In another embodiment, device data 188 may include an indication that personal device 120 has thirty device locations stored in its memory. In an embodiment, device data 188 may include an indication that personal device 120 has thirty device locations stored in its memory, and 20 of those locations are locations for which an interest has been expressed by an entity in communication with computing device 130D.

Referring again to FIG. 1F, in an embodiment, computing device 130D may include personal device interface module 132. Personal device interface module 132 may include data value monitoring module 132A. In an embodiment, data value monitoring module 132A may receive information regarding which types of data are valuable (e.g., location data, or location data indicating that a device is inside Times Square on New Years' Eve, and the like), and may monitor one or more devices and other locations for one or more indications that a personal device 120 has data estimated to be valuable, and whether that data is protected. In an embodiment, personal device interface module may include device information receiving module 132B configured to receive device data 188. Device data 188 may have any number of formats, as described above, and as shown by way of non-limiting example in the examples given further herein.

Referring again to FIG. 1F, in an embodiment, computing device 130D may include device monitoring module 132C. In an embodiment, device monitoring module 132C may monitor one or more personal devices 120 through any monitoring technique. In an embodiment, device monitoring module 132C may include software, hardware, or firmware associated with personal device 120, that may be configured to report back to device monitoring module 132C at particular intervals. In an embodiment, device monitoring module 132C may monitor personal device 120 through one or more communication networks 140 (not pictured), and may communicate directly with personal device 120. In an embodiment, device monitoring module 132C may monitor personal device 120 through indirect means, e.g., through other devices or systems that may be used by personal device 120.

Referring again to FIG. 1F, in an embodiment, personal device interface module 132 may include service offering module 132D. For example, as described previously, computing device 130D may acquire one or more services. These services may be presented to personal device 120, either for presentation to a user, or for an automated decision regarding whether to accept the services. In an embodiment, the one or more services 188 may require access to protected data, e.g., protected data 126A of the personal device 120, or one or more protected components, e.g., protected component 128A of personal device 120, or both. In an embodiment, computing device 130D may facilitate the presentation of the one or more services to a user 105 of the personal device 120, via the personal device 120.

Referring again to FIG. 1B, FIG. 1B shows a more detailed description of service provider device 170. In an embodiment, service provider device 170 may include a processor 110. Processor 110 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 110 may be a server. In some embodiments, processor 110 may be a distributed-core processor. Although processor 110 is as a single processor that is part of a single service provider device 170, processor 110 may be multiple processors distributed over one or many service provider devices 170, which may or may not be configured to operate together. Processor 110 is illustrated as being configured to execute computer readable instructions in order to execute one or more operations described above, and as illustrated in FIGS. 5, 6A-6C, 7A-7F, and 8A-8D. In some embodiments, processor 110 is designed to be configured to operate as processing module 150, which may include one or more obscured data referencing at least one attribute of one or more devices in a manner that avoids particular identification of the one or more devices acquiring module 152, one or more services designed to be at least partly executed using the one or more devices acquiring at least partly based on the acquired obscured data that avoids particular identification module 154, and acquired one or more services as return for access to particularly identifying data of the one or more devices associated with attribute data offering module 156.

Referring again to FIG. 1B, in an embodiment, service provider 170 may include a device memory 116. In some embodiments, memory 116 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 116 may be located at a single network site. In some embodiments, memory 116 may be located at multiple network sites, including sites that are distant from each other.

Referring now to FIG. 2, FIG. 2 illustrates an exemplary implementation of the obscured data referencing at least one attribute of one or more devices in a manner that avoids particular identification of the one or more devices acquiring module 152. As illustrated in FIG. 2, the obscured data referencing at least one attribute of one or more devices in a manner that avoids particular identification of the one or more devices acquiring module may include one or more sub-logic modules in various alternative implementations and embodiments. For example, as shown in FIG. 2, e.g., FIG. 2A, in some embodiments, module 152 may include one or more of obscured data referencing at least one attribute of more than one devices in a manner that avoids particular identification of individual devices of the more than one devices acquiring module 202 and obscured data referencing a number of devices having at least one attribute at a particular time in a manner that avoids particular identification of the one or more devices acquiring module 204. In some embodiments, module 204 may include one or more of obscured data referencing a number of devices having at a particular location at a particular time in a manner that avoids particular identification of the one or more devices acquiring module 206, obscured data referencing a number of devices having an image capturing sensor having a particular resolution at a particular time in a manner that avoids particular identification of the one or more devices acquiring module 208, and obscured data referencing a number of devices having a particular type of data at a particular time in a manner that avoids particular identification of the one or more devices acquiring module

210. In some embodiments, module 210 may include obscured data referencing a number of devices having more than twenty-five contacts stored in memory at a particular time in a manner that avoids particular identification of the one or more devices acquiring module 212.

Referring again to FIG. 2, e.g., FIG. 2B, in some embodiments, module 152 may include one or more of obscured data referencing at least one attribute of one or more devices in a manner that avoids particular identification of the one or more devices until deobscured acquiring module 214 (e.g., which, in some embodiments, may include obscured data referencing at least one attribute of one or more devices in a manner that avoids particular identification of the one or more devices until deobscured via data manipulation acquiring module 216), obscured data referencing at least one attribute of one or more devices in a manner that avoids particular identification of the one or more devices by obscuring identification data acquiring module 218, obscured data referencing at least one attribute of one or more devices in a manner that avoids particular identification of the one or more devices by deleting identification data acquiring module 220, obscured data referencing at least one attribute of one or more devices in a manner that avoids particular identification of the one or more devices by at least partially encrypting identification data acquiring module 222, obscured data referencing at least one attribute of one or more devices in a manner that avoids particular identification of the one or more devices by applying one or more reversible algorithms to identification data acquiring module 224, and obscured data referencing at least one attribute of one or more devices in a manner that avoids particular identification of the one or more devices by replacing identification data with data retrieved from a static table acquiring module 226.

Referring again to FIG. 2, e.g., FIG. 2C, as described above, in some embodiments, module 152 may include one or more of obscured data referencing at least one attribute of one or more devices in a manner that avoids particular identification of the one or more devices by replacing identification data with randomly generated data acquiring module 228, obscured data referencing at least one attribute of one or more devices in a manner that avoids particular identification of the one or more devices by replacing identification data with non-randomly generated data acquiring module 230, obscured data referencing at least one attribute of one or more devices in a manner that avoids particular identification of the one or more devices by replacing identification data with ordered data configured to appear random acquiring module 232, and obscured data referencing at least one attribute of one or more devices in a manner that avoids particular identification of the one or more devices by inserting false identification data acquiring module 234. In some embodiments, module 234 may include one or more of obscured data referencing at least one attribute of one or more devices in a manner that avoids particular identification of the one or more devices by inserting false identification data having a same format as true identification data acquiring module 236 and obscured data referencing at least one attribute of one or more devices in a manner that avoids particular identification of the one or more devices by inserting random data having a similar data structure as true identification data acquiring module 238.

Referring now to FIG. 3, FIG. 3 illustrates an exemplary implementation of one or more services designed to be at least partly executed using the one or more devices acquiring at least partly based on the acquired obscured data that avoids particular identification module 154. As illustrated in FIG. 3, the one or more services designed to be at least partly executed using the one or more devices acquiring at least partly based on the acquired obscured data that avoids particular identification module 154 may include one or more sub-logic modules in various alternative implementations and embodiments. For example, as shown in FIG. 3 (e.g., FIG. 3A), in some embodiments, module 154 may include friend-finding service designed to be at least partly executed using a smartphone acquiring at least partly based on the acquired obscured data that avoids particular identification module 302. In some embodiments, module 302 may include one or more of friend-finding service configured to locate one or more entities identified in the smartphone and to present a notification on the smartphone when one or more of the located entities are detected at a particular location acquiring at least partly based on the acquired obscured data that avoids particular identification module 304 and friend-finding service configured to locate one or more entities identified in the smartphone and to present a notification on the smartphone when one or more of the located entities are detected at a particular location acquiring at least partly based on a smartphone contact list property that avoids particular identification module 306. In some embodiments, module 306 may include one or more of friend-finding service configured to locate one or more entities identified in the smartphone and to present a notification on the smartphone when one or more of the located entities are detected at a particular location acquiring at least partly based on a smartphone contact list property of having more than twenty five contacts module 308 and friend-finding service configured to locate one or more entities identified in the smartphone and to present a notification on the smartphone when one or more of the located entities are detected at a particular location acquiring at least partly based on a smartphone contact list property of having more than twenty five contacts that meet a particular contact criterion module 310. In some embodiments, module 310 may include one or more of friend-finding service configured to locate one or more entities identified in the smartphone and to present a notification on the smartphone when one or more of the located entities are detected at a particular location acquiring at least partly based on a smartphone contact list property of having more than twenty five contacts that are of particular gender module 312 and friend-finding service configured to locate one or more entities identified in the smartphone and to present a notification on the smartphone when one or more of the located entities are detected at a particular location acquiring at least partly based on a smartphone contact list property of having more than twenty five contacts that are of particular age module 314.

Referring again to FIG. 3, e.g., FIG. 3B, as described above, in some embodiments, module 154 may include one or more of one or more services designed to be at least partly executed using the one or more devices receiving at least partly based on the acquired obscured data that avoids particular identification module 315, one or more services designed to be at least partly executed using the one or more devices generating at least partly based on the acquired obscured data that avoids particular identification module 316, one or more services designed to be at least partly executed using the one or more devices request at least partly based on the acquired obscured data that avoids particular identification transmitting module 318, and receiving requested one or more services module 320. In some embodiments, module 318 may include one or more of one or more services designed to be at least partly executed using the one or more devices request at least partly based on the acquired obscured data that avoids particular identification transmitting to one or more service providers module 322 and one or more services designed to be at least partly executed using the one or more devices request at least partly based on the acquired obscured data, that avoids particular identification, transmitting to an open exchange module 324. In some embodiments, module 324 may include one or more services designed to be at least partly executed using the one or more devices request at least partly based on the acquired obscured data, that avoids particular identification, posting to a social networking site module 326.

Referring again to FIG. 3, e.g., FIG. 3C, in some embodiments, module 154 may include one or more of one or more services designed to be at least partly executed using the one or more devices description receiving module 328 and one or more received described services designed to be at least partly executed using the one or more devices selecting at least partly based on the acquired obscured data that avoids particular identification module 330. In some embodiments, module 330 may include one or more of one or more received described services designed to be at least partly executed using the one or more devices selecting at least partly based an estimated profitability of the one or more received described services module 332, one or more received described services designed to be at least partly executed using the one or more devices selecting at least partly based an estimated device agreement to install rate of the one or more received described services module 334, and one or more received described services designed to be at least partly executed using the one or more devices selecting at least partly based on the acquired obscured data that avoids particular identification and at least partly based on a received described service property module 336. In some embodiments, module 336 may include one or more of one or more received described services designed to be at least partly executed using the one or more devices selecting at least partly based on the acquired obscured data that avoids particular identification and at least partly based on a received described service developer identity module 338 and one or more received described services designed to be at least partly executed using the one or more devices selecting at least partly based on the acquired obscured data that avoids particular identification and at least partly based on a received described service surcharge module 340.

Referring again to FIG. 3, e.g., FIG. 3D, in some embodiments, module 154 may include one or more of one or more services designed to be at least partly executed using the one or more devices acquiring at least partly based on an estimated value of data that identifies the one or more devices given in exchange for providing at least a portion of the one or more services module 342, one or more services designed to be at least partly executed using the one or more devices acquiring at least partly based on an estimated resale of data that identifies the one or more devices given in exchange for providing at least a portion of the one or more services module 344, one or more services designed to be at least partly executed using the one or more devices acquiring at least partly based on an estimated value of using data that identifies the one or more devices given in exchange for providing at least a portion of the one or more services module 346, one or more services designed to be at least partly executed using the one or more devices developing at least partly based on the acquired obscured data that avoids particular identification module 348, bicycling traffic service designed to be at least partly executed using the one or more devices acquiring at least partly based on the acquired obscured data that indicates one or more devices that are identified as moving on a bicycle for one hour per day or more and avoids particular identification module 350, and ice cream shop information service designed to be at least partly executed using the one or more devices acquiring at least partly based on the acquired obscured data that indicates one or more devices that are identified as in proximity to an ice cream shop when an ambient temperature is above a particular threshold and avoids particular identification module 352.

Referring again to FIG. 3, e.g., FIG. 3E, in some embodiments, module 154 may include one or more of ice cream shop information service designed to be at least partly executed using the one or more devices acquiring at least partly based on the acquired obscured data that indicates one or more devices that are identified as in proximity to an ice cream shop when an ambient temperature is above eighty degrees and avoids particular identification module 354 and digital photo sorting service designed to be at least partly executed using the one or more devices acquiring at least partly based on the acquired obscured data that indicates one or more devices having five hundred or more photographs taken and avoids particular identification module 356.

Figures 4, 4C:
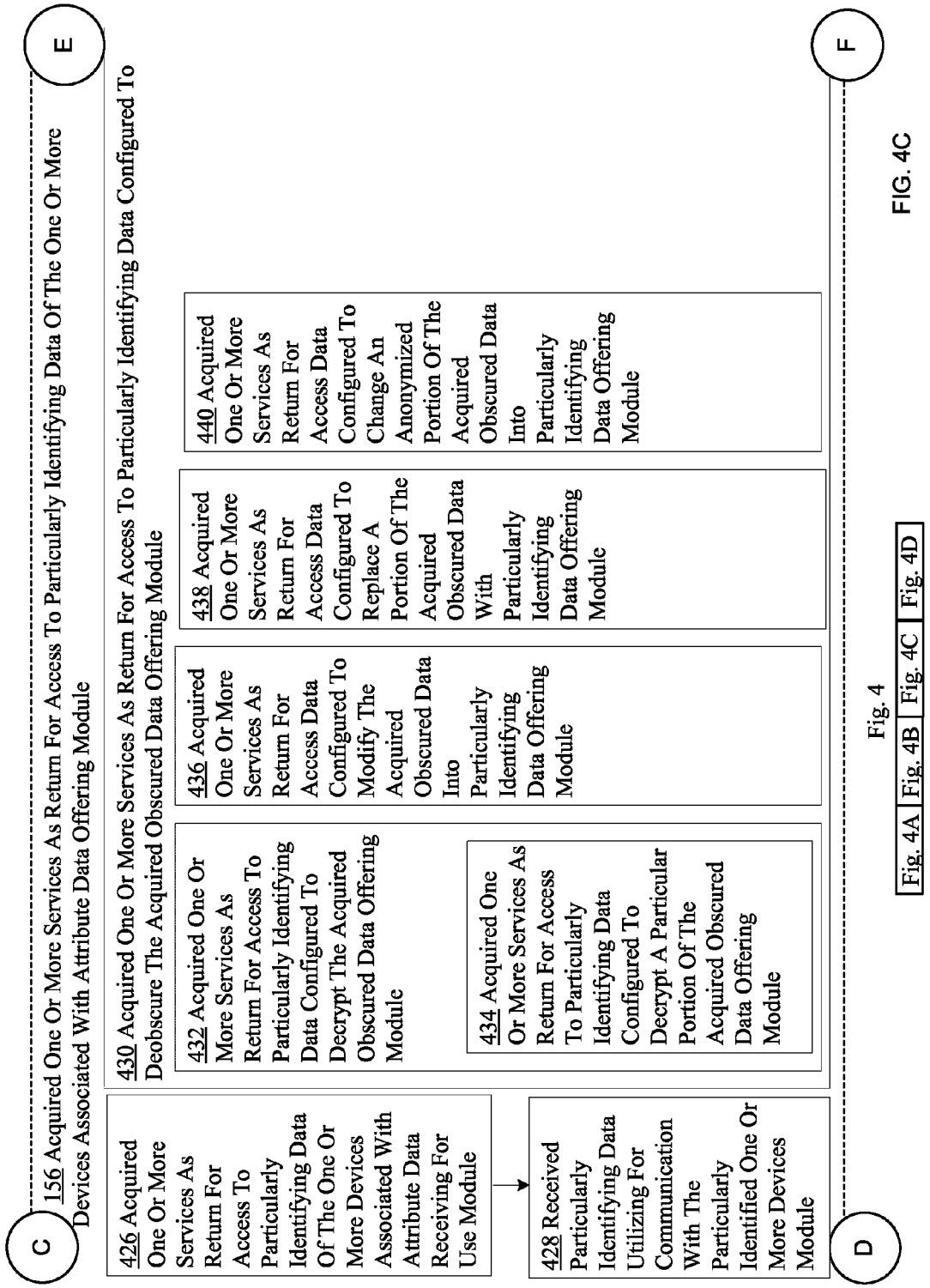

Referring now to FIG. 4, FIG. 4 illustrates an exemplary implementation of acquired one or more services as return for access to particularly identifying data of the one or more devices associated with attribute data offering module 156. As illustrated in FIG. 4, the acquired one or more services as return for access to particularly identifying data of the one or more devices associated with attribute data offering module 156 may include one or more sub-logic modules in various alternative implementations and embodiments. For example, as shown in FIG. 4, e.g., FIG. 4A, in some embodiments, module 156 may include one or more of acquired one or more services as return for access to particularly identifying data that identifies one or more users of the one or more devices associated with attribute data offering module 402, acquired one or more services as return for access to unique device identifier data of the one or more devices associated with attribute data offering module 404, acquired one or more services as return for access to service login credentials used by at least one of the one or more devices associated with attribute data offering module 406, acquired one or more services as return for access to marketplace login credentials used by at least one of the one or more devices associated with attribute data offering module 408, and acquired one or more services as return for access to social networking site login credentials used by at least one of the one or more devices associated with attribute data offering module 410.

Referring again to FIG. 4, e.g., FIG. 4B, in some embodiments, module 156 may include one or more of acquired friend-finding service as return for access to particularly identifying data of the one or more devices associated with attribute data offering module 412, acquired one or more services as return for access to particularly identifying data of the one or more devices associated with attribute data offer for service facilitation presenting module 420, acquired one or more services as return for access to particularly identifying data of the one or more devices associated with attribute data offer for service on at least one of the one or more devices facilitation presenting module 422, and acquired one or more services as return for access to particularly identifying data of the one or more devices associated with attribute data receiving module 424. In some embodiments, module 412 may include acquired friend-finding service as return for access to particularly identifying data of the one or more devices having a contact list having greater than a predetermined number of contacts offering module 414. In some embodiments, module 414 may include acquired friend-finding service as return for access to data to convert acquired obscured data into particularly identifying data of the one or more devices having a contact list having greater than a predetermined number of contacts offering module 416. In some embodiments, module 416 may include acquired friend-finding service as return for access to data to decrypt acquired obscured data into particularly identifying data of the one or more devices having a contact list having greater than a predetermined number of contacts offering module 418.

Referring again to FIG. 4, e.g., FIG. 4C, in some embodiments, module 156 may include one or more of acquired one or more services as return for access to particularly identifying data of the one or more devices associated with attribute data receiving for use module 426, received particularly identifying data utilizing for communication with the particularly identified one or more devices module 428, and acquired one or more services as return for access to particularly identifying data configured to deobscure the acquired obscured data offering module 430. In some embodiments, module 430 may include one or more of acquired one or more services as return for access to particularly identifying data configured to decrypt the acquired obscured data offering module 432, acquired one or more services as return for access data configured to modify the acquired obscured data into particularly identifying data offering module 436, acquired one or more services as return for access data configured to replace a portion of the acquired obscured data with particularly identifying data offering module 438, and acquired one or more services as return for access data configured to change an anonymized portion of the acquired obscured data into particularly identifying data offering module 430. In some embodiments, module 432 may include acquired one or more services as return for access to particularly identifying data configured to decrypt a particular portion of the acquired obscured data offering module 434.

Referring again to FIG. 4, e.g., FIG. 4D, in some embodiments, module 156 may include module 430, as previously described. In some embodiments, module 430 may include one or more of acquired one or more services as return for access to data configured to substitute an anonymized portion of the acquired obscured data with particularly identifying data using a lookup table offering module 442, acquired one or more services as return for access to data filter out a false data portion of the acquired obscured data and leaving particularly identifying data as a remainder offering module 444, and acquired one or more services as return for access to an algorithm for which application to the acquired obscured data results in particularly identifying data offering module 446. In some embodiments, module 446 may include one or more of acquired one or more services as return for access to a database of particularly identifying data of the one or more devices associated with attribute data offering module 448, acquired one or more services as return for restricted access to a database of particularly identifying data of the one or more devices associated with attribute data offering module 450, direct delivery of one or more services as return for access to particularly identifying data of the one or more devices associated with attribute data offering module 452, and direct delivery to one or more users of the one or more devices, of one or more services as return for access to particularly identifying data of the one or more devices associated with attribute data offering module 454.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
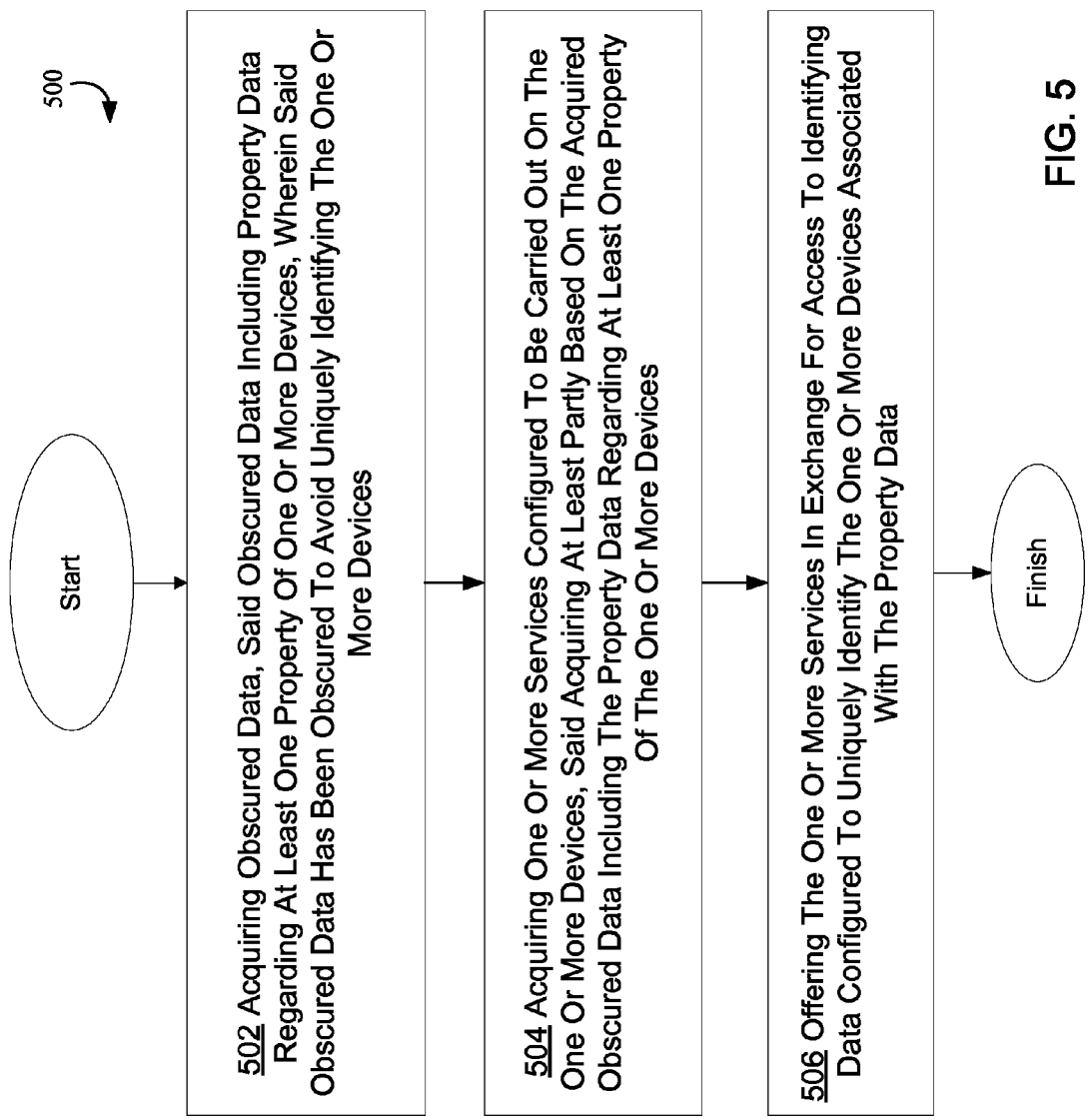
FIG. 5 is a high-level logic flowchart of a process, e.g., operational flow 500, according to an embodiment.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5-8 as well as the other operations to be described herein may be performed by at least one of a machine, an article of manufacture, or a composition of matter.

The following examples are provided merely as illustrations of how various embodiments may be implemented. None of the following examples are intended to be limiting, and all of the examples listed herein may be combined with portions of other examples listed herein, to the extent such combinations are not logically inconsistent. Because of space limitations, each example is not written out each time it is possible to implement that example. Therefore, unless explicitly otherwise stated, each example should be understood to encompass every other example listed both before and after the instant example. Each example is not intended to be limited to a single claim or set of claims, but is rather exemplary of how one or more embodiments may be carried out. Nothing in the following should be interpreted as limiting any claim or enumerating an exhaustive list of how one or more claimed embodiments can be carried out.

Referring now to FIG. 5, FIG. 5 shows operation 500, which may include operation 502 depicting acquiring obscured data, said obscured data including property data regarding at least one property of one or more devices, wherein said obscured data has been obscured to avoid uniquely identifying the one or more devices. For example, FIG. 1, e.g., FIG. 1B, shows obscured data referencing at least one attribute of one or more devices in a manner that avoids particular identification of the one or more devices acquiring module 152 acquiring (e.g., receiving, retrieving, picking up, creating, generating, intercepting, reading, hearing, detecting, and the like) obscured data (e.g., data that has been modified in any way, including deletion, substitution, change, mutation, variation, diversification, transformation, and the like), said obscured data (e.g., data that has been modified in any way, including deletion, substitution, change, mutation, variation, diversification, transformation, and the like) comprising property data (e.g., data about one or more properties, e.g., whether environment-dependent or environment independent, including, but not limited to, one or more of a status, characteristic, snapshot, feature, index, brand, configuration, attribute, algorithm, format, mode, flag setting, variable, data structure, and the like) regarding at least one property (e.g., any attribute of a device or any of the hardware, software, firmware, and the like, whether static or dynamic, permanent or temporary, whether dependent on a user of the device or not, and in an embodiment, may reflect entirely on the user or one or more actions taken out by the user) of one or more devices (e.g., a cellular phone, smart phone, IP phone, VOIP phone, handset, microphone, camera (e.g., video camera, still camera, digital camera, and the like), headphone, earpiece, screen, monitor, television, game system, receiver (e.g., an audio/visual receiver), media player (e.g., DVD player, Blu-ray player, CD player, MP3 player, cassette tape player), tablet device, netbook computer, notebook computer, router, wireless router, bridge, network equipment, server, desktop computer, personal computer, personal computer component (e.g., RAM, hard drive, video card, and the like), personal navigation system, vehicle navigation system, motor vehicle, motor vehicle stereo, motor vehicle control system, motor vehicle communication system (e.g., OnStar), appliance, security system (e.g., a home security system), electronic safety device (e.g., an electronic safe, a door security system, a door locking system), stereo system, speaker, remote control (e.g., a universal remote control, or a device remote control), radio, two-way radio, walkie-talkie, ham radio, a metal detector, a radar detector, a weather station, a robot (e.g., a Roomba), a vacuum cleaner, and the like), wherein said obscured data (e.g., data that has been modified in any way, including deletion, substitution, change, mutation, variation, diversification, transformation, and the like) has been (e.g., the obscuring has already happened, is in the process of happening, or has been indicated that obscuring will happen in due course (e.g., in an embodiment, data may be indicated, e.g., marked, for obscuring, and the obscuring may not have actually taken place on the data yet, but is still considered to have been obscured, if the data will be obscured in the absence of an intervening action) obscured (e.g., modified in any way, including deletion, substitution, change, mutation, variation, diversification, transformation, and the like) to avoid uniquely identifying (e.g., information that would specifically identify the device, or a user of the device, e.g., a MAC address, an IP address, whether static or dynamic, a server name, login information for one or more web sites, social networking sites, marketplaces, and the like) the one or more devices (e.g., any of the list of devices mentioned previously).

Referring again to FIG. 5, operation 500 may include operation 504 depicting acquiring one or more services configured to be carried out on the one or more devices, said acquiring at least partly based on the acquired obscured data including the property data regarding at least one property of the one or more devices. For example, FIG. 1, e.g., FIG. 1B, shows one or more services designed to be at least partly executed using the one or more devices acquiring at least partly based on the acquired obscured data that avoids particular identification module 154 acquiring (e.g., receiving, retrieving, picking up, creating, generating, intercepting, reading, hearing, detecting, and the like) one or more services (e.g., any task, or any portion of any task, or any combination of tasks, that can be carried out by a device, or by a device in communication with another device, which may include human interaction, or may not include human interaction, and which may require one or more resources, either locally to the device, or remotely from the device, and which may include one or more of hardware, software, firmware, data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like) configured to be (e.g., the one or more services are designed to be carried out, or designed in a manner that makes the one or more services capable of being carried out) carried out (e.g., executed, performed, take a step or measure toward, schedule the performance of, instruct an entity to perform, and the like, including one or more portions of the service that are smaller than the service itself, including, but not limited to, data transmission and manipulation, and user interface handling, for example) on (e.g., in this context, on means that the device plays some role in facilitating the carrying out of the device, regardless of whether the device actually performs any of the steps of carrying out, or merely supplies one or more resources, data, or instructions that are used to carry out) the one or more devices (e.g., a cellular phone, smart phone, IP phone, VOIP phone, handset, microphone, camera (e.g., video camera, still camera, digital camera, and the like), headphone, earpiece, screen, monitor, television, game system, receiver (e.g., an audio/visual receiver), media player (e.g., DVD player, Blu-ray player, CD player, MP3 player, cassette tape player), tablet device, netbook computer, notebook computer, router, wireless router, bridge, network equipment, server, desktop computer, personal computer, personal computer component (e.g., RAM, hard drive, video card, and the like), personal navigation system, vehicle navigation system, motor vehicle, motor vehicle stereo, motor vehicle control system, motor vehicle communication system (e.g., OnStar), appliance, security system (e.g., a home security system), electronic safety device (e.g., an electronic safe, a door security system, a door locking system), stereo system, speaker, remote control (e.g., a universal remote control, or a device remote control), radio, two-way radio, walkie-talkie, ham radio, a metal detector, a radar detector, a weather station, a robot (e.g., a Roomba), a vacuum cleaner, and the like) said acquiring at least partly based (e.g., plays at least a small factor in, regardless of how much or how little, including, but not limited to, entirely based) on the acquired obscured data (e.g., in an embodiment, obscured data is data that once contained property data, and data that uniquely identifies one or more of the device and the user of the device from which the data originated, but the data has been altered to obscure, or remove entirely, the data that uniquely identifies the one or more of the device and the user of the device from which the data originated) comprising the property data (e.g., data about one or more properties, e.g., whether environment-dependent or environment independent, including, but not limited to, one or more of a status, characteristic, snapshot, feature, index, brand, configuration, attribute, algorithm, format, mode, flag setting, variable, data structure, and the like) regarding at least one property (e.g., any attribute of a device or any of the hardware, software, firmware, and the like, whether static or dynamic, permanent or temporary, whether dependent on a user of the device or not, and in an embodiment, may reflect entirely on the user or one or more actions taken out by the user) of the one or more devices.

Referring again to FIG. 5, operation 500 may include operation 506 depicting offering the one or more services in exchange for access to identifying data configured to uniquely identify the one or more devices associated with the property data. For example. FIG. 1, e.g., FIG. 1B, shows acquired one or more services as return for access to particularly identifying data of the one or more devices associated with attribute data offering module 156 offering (e.g., a presentation to a potential recipient for which the recipient is free to accept or reject, e.g., which may be in the form of, for example "this is a service we are willing to provide, are you interested," or any variant of that) the one or more services (e.g., any task, or any portion of any task, or any combination of tasks, that can be carried out by a device, or by a device in communication with another device, which may include human interaction, or may not include human interaction, and which may require one or more resources, either locally to the device, or remotely from the device, and which may include one or more of hardware, software, firmware, data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like) in exchange for (e.g., in return for, e.g., as a quid pro quo, e.g., as a bargained-for exchange, e.g., as a colloquial agreement to swap, e.g., covering any agreement to transfer between two or more parties, regardless of formality level) access (e.g., one or more of reading, writing, modifying, altering, deleting, encrypting, transmitting, receiving, or performing any of one or more actions or operations upon) to identifying data (e.g., data that assists in identifying, e.g., describing, e.g., a name, number, description, regardless of particularity, a list of features, a list of properties, whether static or dynamic, and the like) configured to uniquely identify (e.g., identify in such a way as to differentiate between the device and other devices which are not the device) the one or more devices associated (e.g., related to, e.g., in some embodiments, originated, and also including embodiments where the device is the subject of the property data, or had some role in the acquisition, generation, collection, transmission, modification, aggregation, or other manipulation of the property data) with the property data (e.g., data about one or more properties, e.g., whether environment-dependent or environment independent, including, but not limited to, one or more of a status, characteristic, snapshot, feature, index, brand, configuration, attribute, algorithm, format, mode, flag setting, variable, data structure, and the like).

Figure 6A:
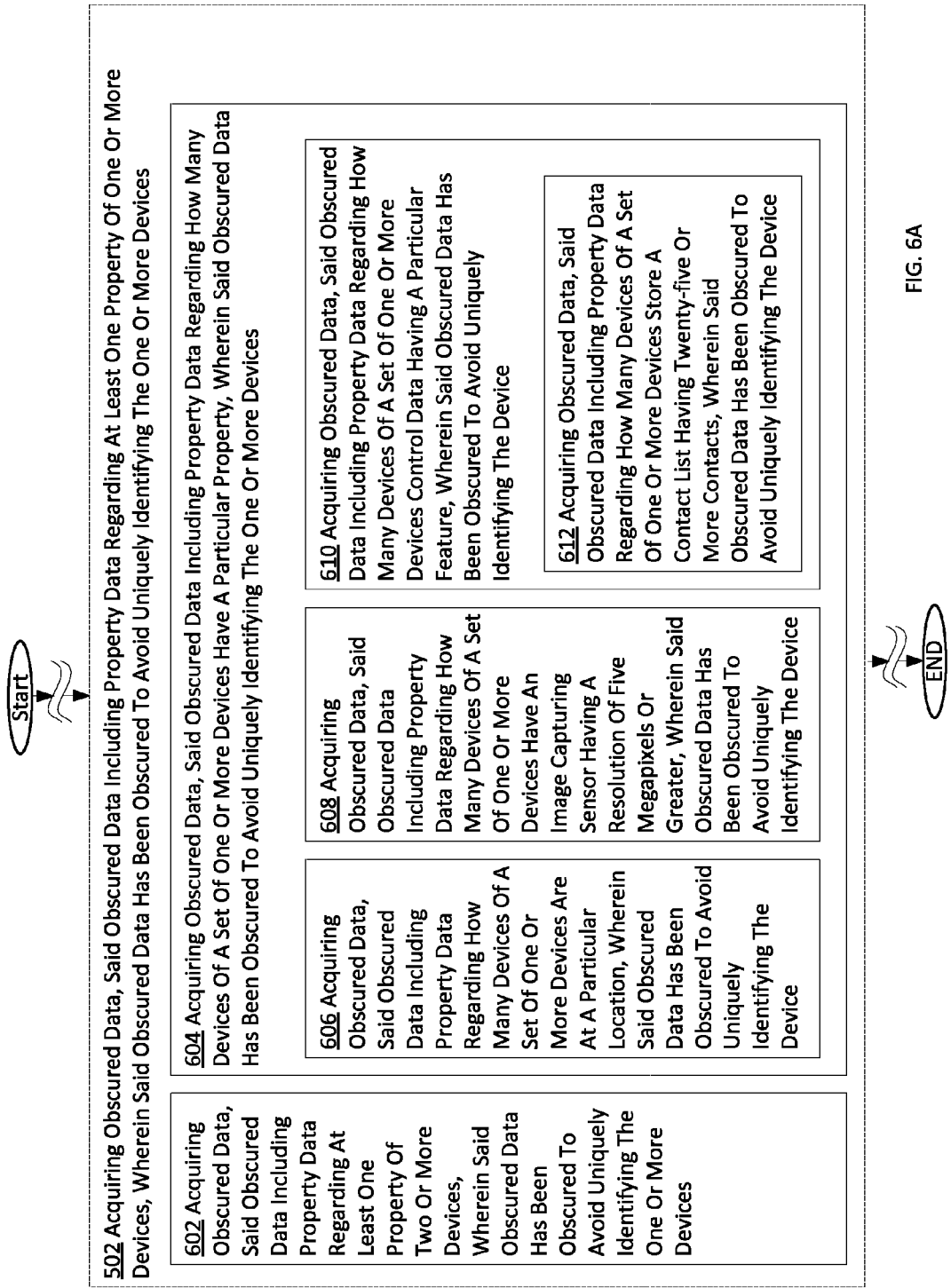
FIG. 6A is a high-level logic flow chart of a process depicting alternate implementations of an acquiring obscured data operation 502, according to one or more embodiments.

FIGS. 6A-6E depict various implementations of operation 502, depicting acquiring obscured data, said obscured data including property data regarding at least one property of one or more devices, wherein said obscured data has been obscured to avoid uniquely identifying the one or more devices according to embodiments. Referring now to FIG. 6A, operation 502 may include operation 602 depicting acquiring obscured data, said obscured data including property data regarding at least one property of two or more devices, wherein said obscured data has been obscured to avoid uniquely identifying the one or more devices. For example, FIG. 2, e.g., FIG. 2A shows obscured data referencing at least one attribute of more than one devices in a manner that avoids particular identification of individual devices of the more than one devices acquiring module 202 acquiring obscured data (e.g., data indicating a location of three smartphones, with device identifiers removed) comprising property data (e.g., data revealing a location of the device at a particular time) regarding at least one property (e.g., location of the device at a particular time) of two or more devices (e.g., three smartphones being carried by users and used at Le Chic restaurant), wherein said obscured data has been obscured (e.g., the device identifiers have been removed or modified, in an embodiment, simply deleted from the obscured data) to avoid uniquely identifying the one or more devices.

Referring again to FIG. 6A, operation 502 may include operation 604 depicting acquiring obscured data, said obscured data including property data regarding how many devices of a set of one or more devices have a particular property, wherein said obscured data has been obscured to avoid uniquely identifying the one or more devices. For example, FIG. 2, e.g., FIG. 2A, shows obscured data referencing a number of devices having at least one attribute at a particular time in a manner that avoids particular identification of the one or more devices acquiring module 204 acquiring obscured data (e.g., a device identifier in which the characters have been replaced with characters from a lookup table), said obscured data including property data regarding how may devices (e.g., one or more cellular telephones carried by users) of a set of one or more devices have a particular property (e.g., whether the device has a camera over five megapixels), wherein said obscured data has been obscured (e.g., the device identifying information portion of the obscured data was identified and characters were substituted using a lookup table) to avoid uniquely identifying the one or more devices.

Referring again to FIG. 6A, operation 604 may include operation 606 depicting acquiring obscured data, said obscured data including property data regarding how many devices of a set of one or more devices are at a particular location, wherein said obscured data has been obscured to avoid uniquely identifying the device. For example, FIG. 2, e.g., FIG. 2A, shows obscured data referencing a number of devices having at a particular location at a particular time in a manner that avoids particular identification of the one or more devices acquiring module 206 acquiring obscured data, said obscured data (e.g., data with encrypted user identification of a user of the device) comprising property data regarding how many devices of a set of one or more devices are at a particular location (e.g., in Times Square), wherein said obscured data has been obscured (e.g., encrypted) to avoid uniquely identifying the device.

Referring again to FIG. 6A, operation 604 may include operation 608 depicting acquiring obscured data, said obscured data including property data regarding how many devices of a set of one or more devices have an image capturing sensor having a resolution of five megapixels or greater, wherein said obscured data has been obscured to avoid uniquely identifying the device. For example, FIG. 2, e.g., FIG. 2A, shows obscured data referencing a number of devices having an image capturing sensor having a particular resolution at a particular time in a manner that avoids particular identification of the one or more devices acquiring module 208 acquiring obscured data, said obscured data (e.g., aggregated data including a number of devices) comprising property data regarding how many devices of a set of one or more devices have an image capturing sensor having a resolution of five megapixels or greater, wherein said obscured data has been obscured (e.g., the data has been aggregated so that no single device has its identifying information) to avoid uniquely identifying the device.

Referring again to FIG. 6A, operation 604 may include operation 610 depicting acquiring obscured data, said obscured data including property data regarding how many devices of a set of one or more devices control data having a particular feature, wherein said obscured data has been obscured to avoid uniquely identifying the one or more devices. For example, FIG. 2, e.g., FIG. 2A, shows obscured data referencing a number of devices having a particular type of data at a particular time in a manner that avoids particular identification of the one or more devices acquiring module 210 acquiring obscured data, said obscured data (e.g., data for which specific identifying information is removed, e.g., "Asus A500 tablet #123456" becomes "Asus A500 tablet") comprising property data regarding how many devices of a set of one or more devices control data (e.g., image data) having a particular feature (e.g., the image data features more than five hundred uncategorized pictures), wherein said obscured data has been obscured (e.g., the most specific reference has been removed, and stored in a separate database) to avoid uniquely identifying the device.

Referring again to FIG. 6A, operation 610 may include operation 612 depicting acquiring obscured data, said obscured data including property data regarding how many devices of a set of one or more devices store a contact list having twenty-five or more contacts, wherein said obscured data has been obscured to avoid uniquely identifying the one or more devices. For example, FIG. 2, e.g., FIG. 2A shows obscured data referencing a number of devices having more than twenty-five contacts stored in memory at a particular time in a manner that avoids particular identification of the one or more devices acquiring module 212 acquiring obscured data, said obscured data (e.g., data for which device identification data has been replaced with false identification data having exactly the same format (e.g., three letters followed by six numbers) comprising property data regarding how many devices of a set of one or more devices store a contact list having twenty-five or more contacts, wherein said obscured data has been obscured (e.g., a replacement algorithm has been scheduled to be run on the data) to avoid uniquely identifying the one or more devices.

Figure 6B:
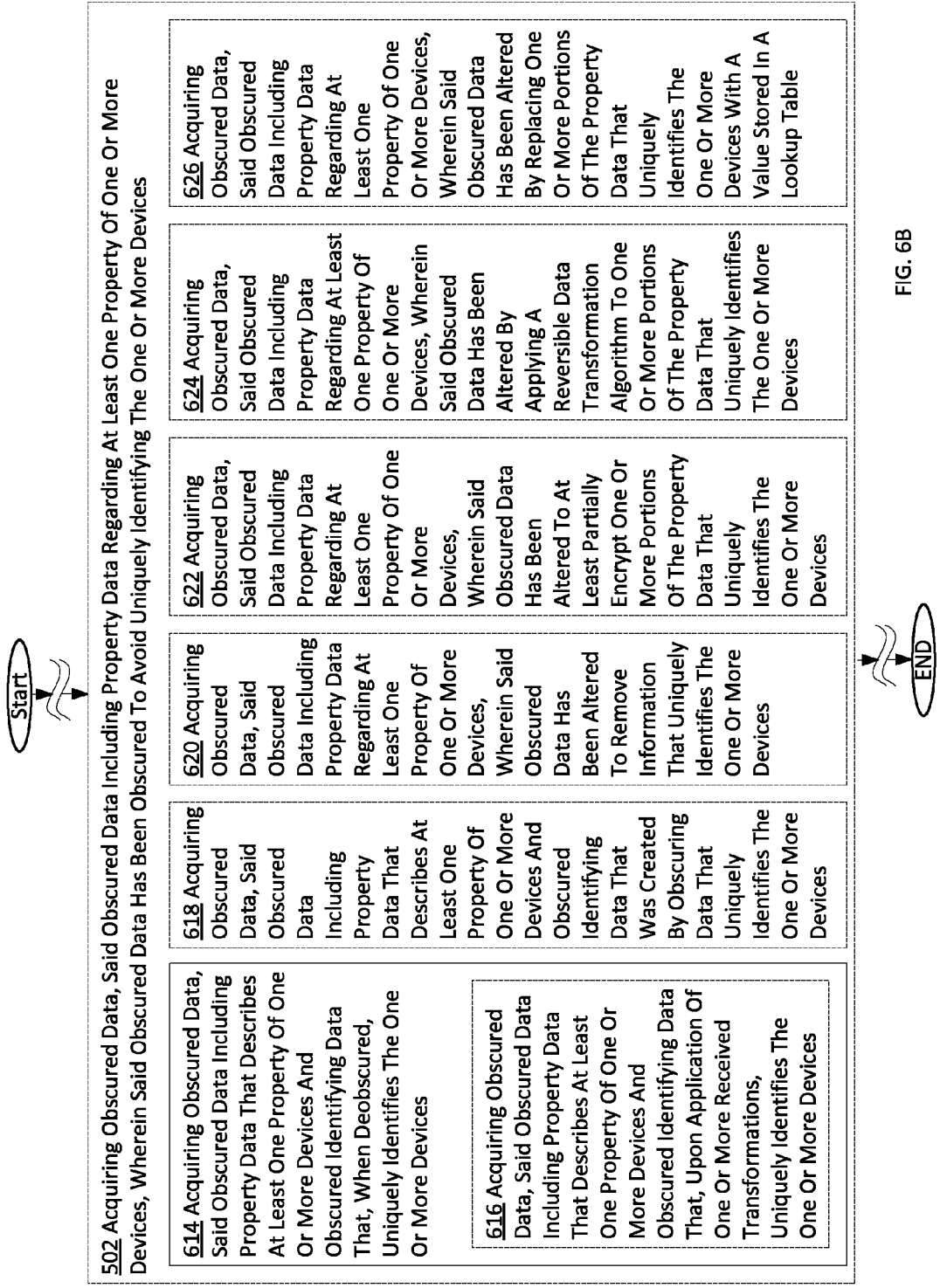
FIG. 6B is a high-level logic flow chart of a process depicting alternate implementations of an acquiring obscured data operation 502, according to one or more embodiments.

Referring now to FIG. 6B, operation 502 may include operation 614 depicting acquiring obscured data, said obscured data including property data that describes at least one property of one or more devices and obscured identifying data that, when deobscured, uniquely identifies the one or more devices. For example, FIG. 2, e.g., FIG. 2B, shows obscured data referencing at least one attribute of one or more devices in a manner that avoids particular identification of the one or more devices until deobscured acquiring module 214 acquiring obscured data, said obscured data (e.g., data for which device identification data, e.g., IP addresses, has been deleted, and a duplicate copy of non-obscured data has been kept at a separate location) comprising property data that describes at least one property (e.g., how many sensors are on the device) of one or more devices (e.g., smartphones), and obscured identifying data (e.g., data for which device identification data has been deleted) that, when deobscured (e.g., device identifying data is restored by any process, including reversal of an algorithm, or in the present example, by using the non-obscured data kept at a separate location to deobscure the data), uniquely identifies (e.g., identifies by a unique identifier character string) the one or more devices.

Referring again to FIG. 6B, operation 614 may include operation 616 depicting acquiring obscured data, said obscured data including property data that describes at least one property of one or more devices and obscured identifying data that, upon application of one or more received transformations, uniquely identifies the one or more devices. For example, FIG. 2, e.g., FIG. 2B, shows obscured data referencing at least one attribute of one or more devices in a manner that avoids particular identification of the one or more devices until deobscured via data manipulation acquiring module 216 acquiring obscured data (e.g., obscured identifying data (e.g., identifying data for which a reversible transformation has been applied) and property data, as described herein), said obscured data including property data that describes at least one property (e.g., what is the cellular signal strength at that device's current location) of one or more devices (e.g., a smartphone) and obscured identifying data (e.g., data for which the portion of the data that identifies the device from which the property data was collected, a reversible transformation algorithm is applied), that, upon application of one or more received transformations (e.g., the reverse of the transformation algorithm is received), uniquely identifies (e.g., via a unique login code used by a user of the device) the one or more devices (e.g., the device is identified as "John Doe, SSN #233-52-2623"'s device").

Referring again to FIG. 6B, operation 502 may include operation 618 depicting acquiring obscured data, said obscured data including property data that describes at least one property of one or more devices and obscured identifying data that was created by obscuring data that uniquely identifies the one or more devices. For example, FIG. 2, e.g., FIG. 2B, shows obscured data referencing at least one attribute of one or more devices in a manner that avoids particular identification of the one or more devices by obscuring identification data acquiring module 218 acquiring obscured data, said obscured data including property data that describes at least one property of one or more devices and obscured identifying data that was created by obscuring data (e.g., deleting one character from a unique device identification character string) that uniquely identifies the one or more devices.

Referring again to FIG. 6B, operation 502 may include operation 620 depicting acquiring obscured data, said obscured data including property data regarding at least one property of one or more devices, wherein said obscured data has been altered to remove information that uniquely identifies the one or more devices. For example, FIG. 2, e.g., FIG. 2B, shows obscured data referencing at least one attribute of one or more devices in a manner that avoids particular identification of the one or more devices by deleting identification data acquiring module 220 acquiring obscured data, said obscured data including property data regarding at least one property (e.g., the device has a velocity meter indicating that the device is traveling more than fifty miles per hour) of one or more devices (e.g., a personal navigation system device), wherein said obscured data has been altered to remove (e.g., to delete) information that uniquely identifies the one or more devices.

Referring again to FIG. 6B, operation 502 may include operation 622 depicting acquiring obscured data, said obscured data including property data regarding at least one property of one or more devices, wherein said obscured data has been altered to at least partially encrypt one or more portions of the property data that uniquely identifies the one or more devices. For example, FIG. 2, e.g., FIG. 2B, shows obscured data referencing at least one attribute of one or more devices in a manner that avoids particular identification of the one or more devices by at least partially encrypting identification data acquiring module 222 acquiring obscured data, said obscured data (e.g., data for which a user id for a login to a marketplace, e.g., the Apple App Store, has been encrypted) comprising property data regarding at least one property (e.g., a number of songs by each artist for the one or more devices) of one or more devices (e.g., twenty Apple iPod music players), wherein said obscured data has been altered to at least partially encrypt one or more portions of the property data that uniquely identifies (e.g., the user id for the marketplace) the one or more devices.

Referring again to FIG. 6B, operation 502 may include operation 624 depicting acquiring obscured data, said obscured data including property data regarding at least one property of one or more devices, wherein said obscured data has been altered by applying a reversible data transformation algorithm to one or more portions of the property data that uniquely identify the one or more devices. For example, FIG. 2, e.g., FIG. 2B, shows obscured data referencing at least one attribute of one or more devices in a manner that avoids particular identification of the one or more devices by applying one or more reversible algorithms to identification data acquiring module 224 acquiring obscured data, said obscured data (e.g., data which has undergone a transformation to hide a device identifier that is part of the data) comprising property data regarding at least one property (e.g., the resolution of a camera on the device) of one or more devices (e.g., tablet devices), wherein said obscured data has been altered by applying a reversible data transformation algorithm to one or more portions of the property data that uniquely identify (e.g., a MAC address) the one or more devices.

Referring again to FIG. 6B, operation 502 may include operation 626 depicting acquiring obscured data, said obscured data including property data regarding at least one property of one or more devices, wherein said obscured data has been altered by replacing one or more portions of the property data that uniquely identifies the one or more devices with a value stored in a lookup table. For example, FIG. 2, e.g., FIG. 2B, shows obscured data referencing at least one attribute of one or more devices in a manner that avoids particular identification of the one or more devices by replacing identification data with data retrieved from a static table acquiring module 226 acquiring obscured data, said obscured data including property data regarding at least one property (e.g., an amount of available storage space on an inserted SD card) of one or more devices (e.g., a smartphone and a tablet device), wherein said obscured data has been altered by replacing one or more portions of the property data that uniquely identify the one or more devices (e.g., a device identification number) with a value stored in a lookup table (e.g., the device identification number is replaced with a different number, and the device identification number is stored in the lookup table with the different number as the lookup number, so that the device identification number may be retrieved from the lookup table using the different number).

Figure 6C:
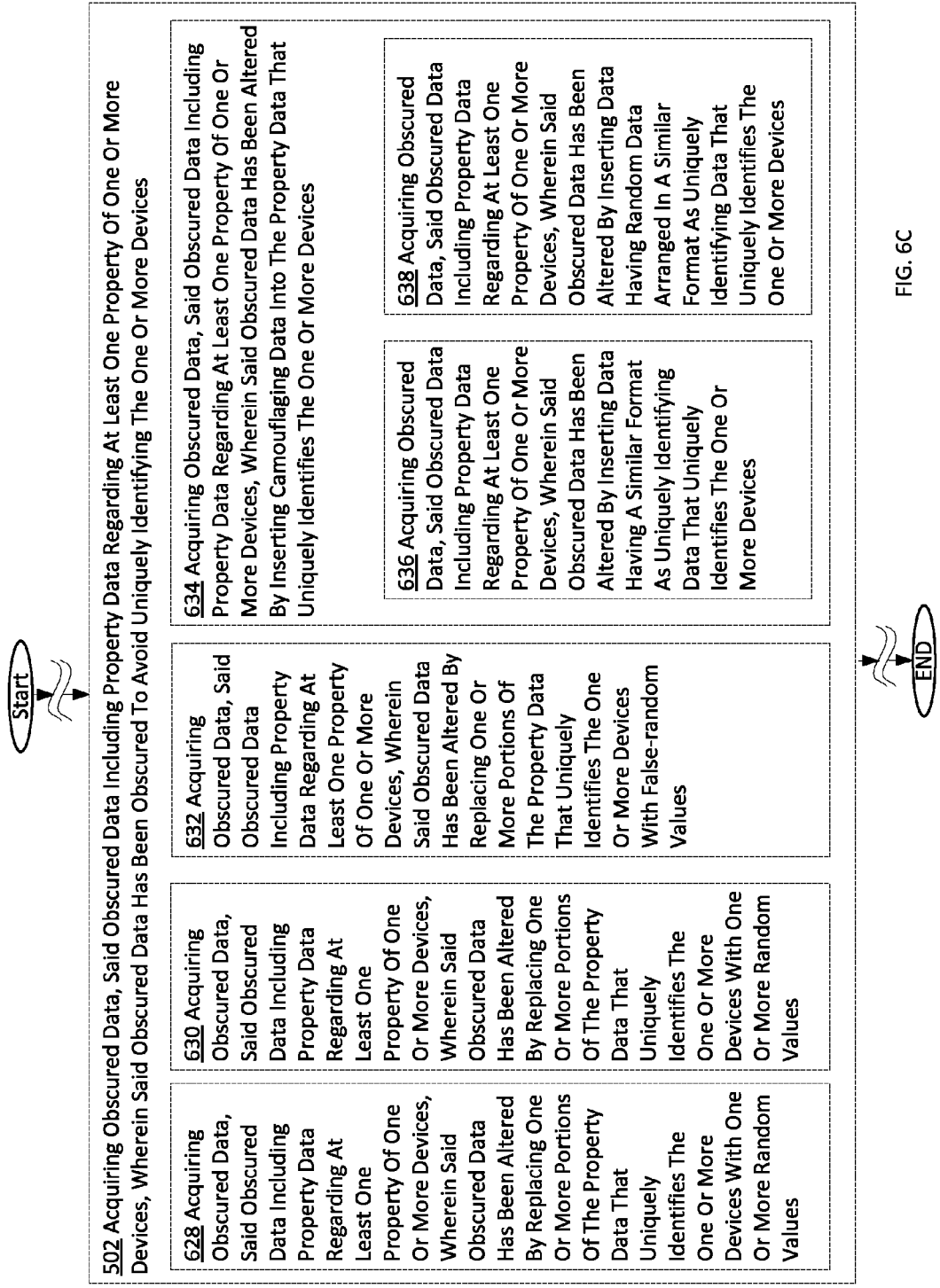
FIG. 6C is a high-level logic flow chart of a process depicting alternate implementations of an acquiring obscured data operation 502, according to one or more embodiments.

Referring now to FIG. 6C, operation 502 may include operation 628 depicting acquiring obscured data, said obscured data including property data regarding at least one property of one or more devices, wherein said obscured data has been altered by replacing one or more portions of the property data that uniquely identify the one or more devices with one or more random values. For example, FIG. 2, e.g., FIG. 2C, shows obscured data referencing at least one attribute of one or more devices in a manner that avoids particular identification of the one or more devices by replacing identification data with randomly generated data acquiring module 228 acquiring obscured data, said obscured data (e.g., data for which the device that generated the property data cannot be accurately ascertained solely using the obscured data) including property data regarding at least one property (e.g., how many users have logged into the device, e.g., a networked computer on an enterprise network) of one or more devices (e.g., networked computers in an office enterprise environment), wherein said obscured data has been altered by replacing one or more portions of the property data (e.g., the computer's name on the corporate enterprise network) that uniquely identify the one or more devices (e.g., the devices are uniquely identified within that particular domain) with one or more random values (e.g., words from the dictionary, e.g., a computer with the ID "frank01" gets replaced with the word "insignia" randomly selected from the dictionary).

Referring again to FIG. 6C, operation 502 may include operation 630 depicting acquiring obscured data, said obscured data including property data regarding at least one property of one or more devices, wherein said obscured data has been altered by replacing one or more portions of the property data that uniquely identify the one or more devices with nonrandom values. For example, FIG. 2, e.g., FIG. 2C, shows obscured data referencing at least one attribute of one or more devices in a manner that avoids particular identification of the one or more devices by replacing identification data with non-randomly generated data acquiring module 230 acquiring obscured data (e.g., data that hides an identity of a device that processed the data and transmitted it to a location), said obscured data including property data regarding at least one property (e.g., which channels have been watched, and for how long) of one or more devices (e.g., internet-equipped television sets), wherein said obscured data has been altered by replacing one or more portions of the property data that uniquely identify (e.g., the television device identification number) the one or more devices with nonrandom values (e.g., the device identification number follows a substitution pattern based on the time, with the key buried in the data, so that the data looks random, but knowing the key and the manner of transformation would allow a person to extract the device identification number from the seemingly-random data, e.g., using a pseudorandom permutation based on an algorithm, e.g., a deterministic algorithm, e.g., a block cipher).

Referring again to FIG. 6C, operation 502 may include operation 632 depicting acquiring obscured data, said obscured data including property data regarding at least one property of one or more devices, wherein said obscured data has been altered by replacing one or more portions of the property data that uniquely identify the one or more devices with false-random values. For example, FIG. 2, e.g., FIG. 2C, shows obscured data referencing at least one attribute of one or more devices in a manner that avoids particular identification of the one or more devices by replacing identification data with ordered data configured to appear random acquiring module 232 acquiring obscured data (e.g., data that does not indicate the identity of the device that collected the property data), said obscured data including property data regarding at least one property of one or more devices, wherein said obscured data has been altered by replacing one or more portions of the property data that uniquely identify the one or more devices with false random values (e.g., values that look random, but are not).

Referring again to FIG. 6C, operation 502 may include operation 634 depicting acquiring obscured data, said obscured data including property data regarding at least one property of one or more devices, wherein said obscured data has been altered by inserting camouflaging data into the property data that uniquely identifies the one or more devices. For example, FIG. 2, e.g., FIG. 2C, shows obscured data referencing at least one attribute of one or more devices in a manner that avoids particular identification of the one or more devices by inserting false identification data acquiring module 234 acquiring obscured data, said obscured data including property data (e.g., data indicating how many text messages were sent in the last thirty days from the device) regarding at least one property of one or more devices (e.g., smartphones with text messaging capability), wherein said obscured data has been altered by inserting camouflaging data (e.g., data that looks similar to uniquely identifying data, but is not uniquely identifying data) into the property data that uniquely identifies the one or more devices.

Referring again to FIG. 6C, operation 634 may include operation 636 depicting acquiring obscured data, said obscured data including property data regarding at least one property of one or more devices, wherein said obscured data has been altered by inserting data having a similar format as uniquely identifying data that uniquely identifies the one or more devices. For example, FIG. 2, e.g., FIG. 2C, shows obscured data referencing at least one attribute of one or more devices in a manner that avoids particular identification of the one or more devices by inserting false identification data having a same format as true identification data acquiring module 236 acquiring obscured data, said obscured data including property data regarding at least one property (e.g., a city location of the device, e.g., "in Seattle" or "in Alexandria, Va.") of one or more devices (e.g., motor vehicle control systems), wherein said obscured data has been altered by inserting data having a similar format (e.g., a vehicle identification number ("VIN") format, e.g., the format defined by ISO 3833, e.g., the 17-character identifier) as uniquely identifying data (e.g., the VIN number of the motor vehicle that has the motor vehicle control system) that uniquely identifies the one or more devices (e.g., the motor vehicle control system).

Referring again to FIG. 6C, operation 634 may include operation 638 depicting acquiring obscured data, said obscured data including property data regarding at least one property of one or more devices, wherein said obscured data has been altered by inserting data having random data arranged in a same format as uniquely identifying data that uniquely identifies the one or more devices. For example, FIG. 2, e.g., FIG. 2C, shows obscured data referencing at least one attribute of one or more devices in a manner that avoids particular identification of the one or more devices by inserting random data having a similar data structure as true identification data acquiring module 238 acquiring obscured data, said obscured data including property data regarding at least one property (e.g., devices moving between five and eight miles per hour in temperatures above eighty degrees) of one or more devices (e.g., exercise monitor devices), wherein said obscured data has been altered by inserting data having random data arranged in a same format (e.g., MAC address formatting) as uniquely identifying data (e.g., a device MAC address) that uniquely identifies the one or more devices.

Figure 7A:
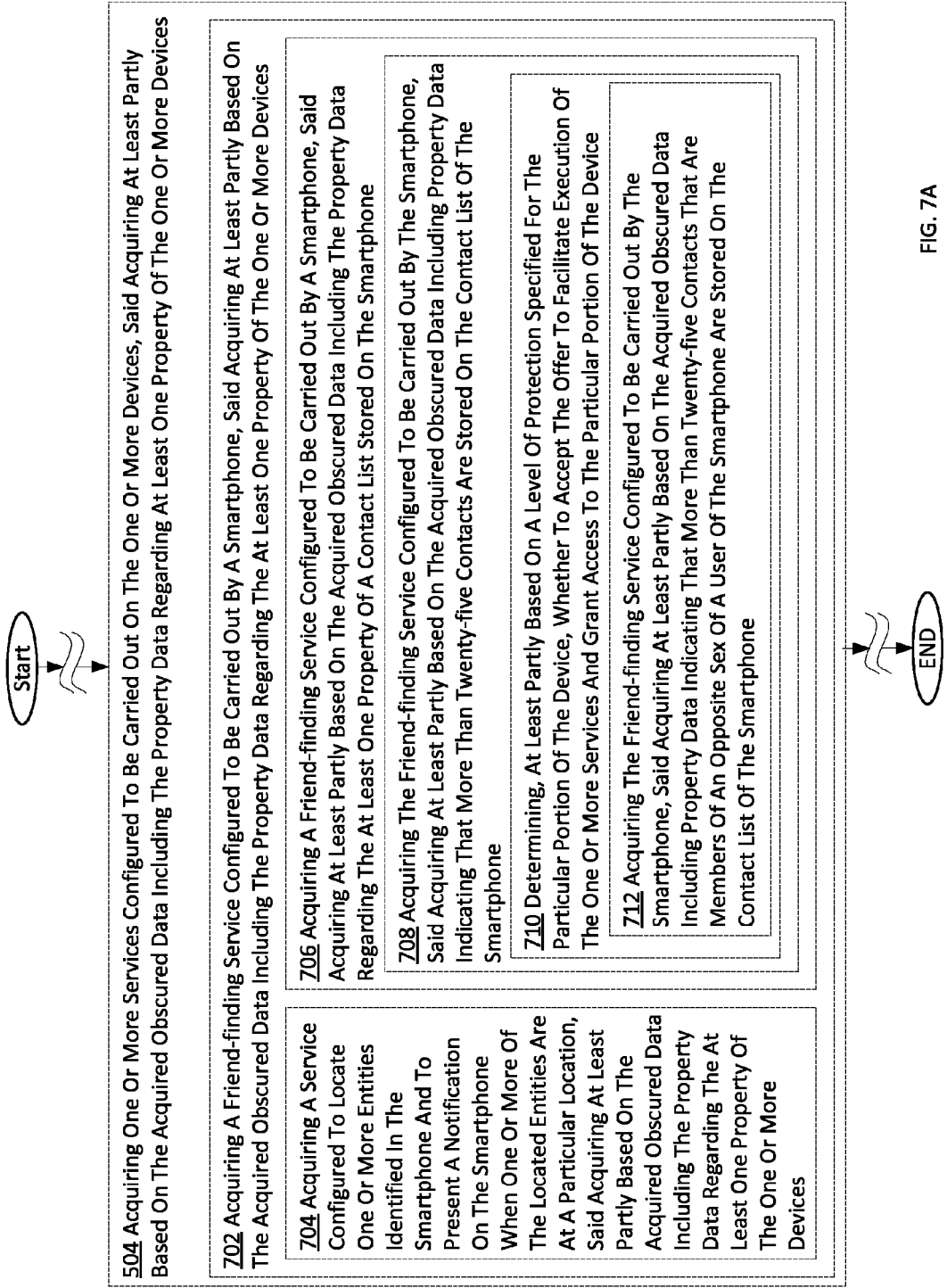
FIG. 7A is a high-level logic flow chart of a process depicting alternate implementations of an acquiring one or more services operation 504, according to one or more embodiments.

FIGS. 7A-7F depict various implementations of operation 504, depicting acquiring one or more services configured to be carried out on the one or more devices, said acquiring at least partly based on the acquired obscured data including the property data regarding at least one property of the one or more devices, according to embodiments. Referring now to FIG. 7A, operation 504 may include operation 702 depicting acquiring a friend-finding service configured to be carried out by a smartphone, said acquiring at least partly based on the acquired obscured data including the property data regarding the at least one property of the one or more devices. For example, FIG. 3, e.g., FIG. 3A, shows friend-finding service designed to be at least partly executed using a smartphone acquiring at least partly based on the acquired obscured data that avoids particular identification module 302 acquiring (e.g., receiving) a friend-finding service configured to be carried out by a smartphone, said acquiring at least partly based on the acquired obscured data (e.g., data that does not specifically identify the smartphone) including the property data (e.g., data about the device contact list) regarding the at least one property (e.g., whether the device has a contact list) of the one or more devices (e.g., cellular telephones).

Referring again to FIG. 7A, operation 702 may include operation 704 depicting acquiring a service configured to locate one or more entities identified in the smartphone and to present a notification on the smartphone when one or more of the located entities are at a particular location, said acquiring at least partly based on the acquired obscured data including the property data regarding the at least one property of the one or more devices. For example, FIG. 3, e.g., FIG. 3A, shows friend-finding service configured to locate one or more entities identified in the smartphone and to present a notification on the smartphone when one or more of the located entities are detected at a particular location acquiring at least partly based on the acquired obscured data that avoids particular identification module 304 acquiring a service configured to locate one or more entities (e.g., people in the device contact list) identified in the smartphone (e.g., listed in the smartphone contact list) and to present a notification (e.g., display the person's name with a red border around the name) when one or more of the located entities are at a particular location (e.g., at the same location as the device, or at a "watch" location that the user is tracking, e.g., a particular coffee shop), said acquiring at least partly based on the acquired obscured data including the property data regarding the at least one property (e.g., the number of contacts in a user's contact list stored at a remote location but modifiable by the device) of the one or more devices.

Referring again to FIG. 7A, operation 702 may include operation 706 depicting acquiring a friend-finding service configured to be carried out by a smartphone, said acquiring at least partly based on the acquired obscured data including the property data regarding the at least one property of a contact list stored on the smartphone. For example, FIG. 3, e.g., FIG. 3A, shows friend-finding service configured to locate one or more entities identified in the smartphone and to present a notification on the smartphone when one or more of the located entities are detected at a particular location acquiring at least partly based on a smartphone contact list property that avoids particular identification module 306 acquiring a friend-finding service (e.g., a service that tells as user where people on the user's contact list stored on the device are located) configured to be carried out by a smartphone (e.g., a smartphone that has Microsoft Outlook's contacts feature), said acquiring at least partly based on the acquired obscured data (e.g., the data that reveals how many contacts are in a user's smartphone, but does not identify the smartphone or the user) including the property data regarding the at least one property of a contact list (e.g., a number of users in the contact list) stored on the smartphone.

Referring again to FIG. 7A. operation 706 may include operation 708 depicting acquiring the friend-finding service configured to be carried out by the smartphone, said acquiring at least partly based on the acquired obscured data including property data indicating that more than twenty-five contacts are stored on the contact list of the smartphone. For example, FIG. 3, e.g., FIG. 3A, shows friend-finding service configured to locate one or more entities identified in the smartphone and to present a notification on the smartphone when one or more of the located entities are detected at a particular location acquiring at least partly based on a smartphone contact list property of having more than twenty five contacts module 308 acquiring the friend-finding service configured to be carried out by the smartphone, said acquiring at least partly based on the acquired obscured data including property data indicating that more than twenty-five contacts are stored on the contact list of the smartphone.

Referring again to FIG. 7A, operation 706 may include operation 710 depicting acquiring the friend-finding service configured to be carried out by the smartphone, said acquiring at least partly based on the acquired obscured data including property data indicating that more than twenty-five contacts that meet a particular demographic are stored on the contact list of the smartphone. For example, FIG. 3, e.g., FIG. 3A, shows friend-finding service configured to locate one or more entities identified in the smartphone and to present a notification on the smartphone when one or more of the located entities are detected at a particular location acquiring at least partly based on a smartphone contact list property of having more than twenty five contacts that meet a particular contact criterion module 310 acquiring the friend-finding service configured to be carried out by the smartphone, said acquiring at least partly based on the acquired obscured data including property data indicating that more than twenty-five contacts that meet a particular demographic (e.g., users of high-end smartphone devices, e.g., the Apple iPhone and the Samsung Galaxy S2) are stored on the contact list of the smartphone.

Referring again to FIG. 7A, operation 710 may include operation 712 depicting acquiring the friend-finding service configured to be carried out by the smartphone, said acquiring at least partly based on the acquired obscured data including property data indicating that more than twenty-five contacts that are members of an opposite sex of a user of the smartphone are stored on the contact list of the smartphone. For example, FIG. 3, e.g., FIG. 3A, shows friend-finding service configured to locate one or more entities identified in the smartphone and to present a notification on the smartphone when one or more of the located entities are detected at a particular location acquiring at least partly based on a smartphone contact list property of having more than twenty five contacts that are of particular gender module 312 acquiring the friend-finding service (e.g., a "talking to women" service) configured to be carried out by the smartphone, said acquiring at least partly based on the acquired obscured data including property data indicating that more than twenty-five contacts that are members of an opposite sex (e.g., female, if the user is a male) of a user of the smartphone are stored on the contact list of the smartphone.

Referring now to FIG. 7B. operation 710 may include operation 714 depicting acquiring the friend-finding service configured to be carried out by the smartphone, said acquiring at least partly based on the acquired obscured data including property data indicating that more than twenty-five contacts that are between ages eighteen and thirty-five are stored on the contact list of the smartphone. For example, FIG. 3, e.g., FIG. 3B, shows friend-finding service configured to locate one or more entities identified in the smartphone and to present a notification on the smartphone when one or more of the located entities are detected at a particular location acquiring at least partly based on a smartphone contact list property of having more than twenty five contacts that are of particular age module 314 acquiring the friend-finding service configured to be carried out by the smartphone, said acquiring at least partly based on the acquired obscured data including property data indicating that more than twenty-five contacts that are between the ages of eighteen and thirty-five are stored on the contact list of the smartphone.

Figure 7C:
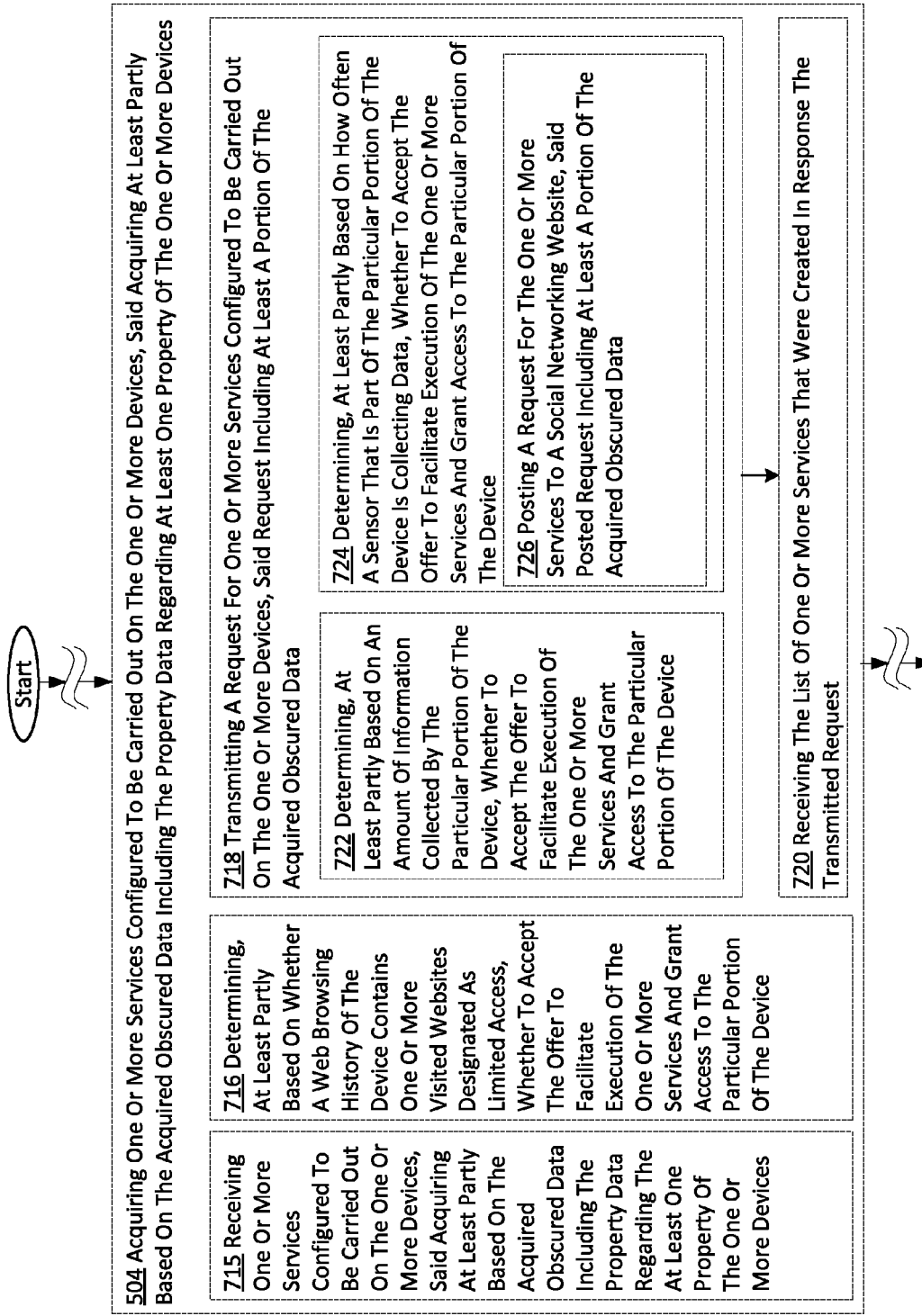
FIG. 7C is a high-level logic flow chart of a process depicting alternate implementations of an acquiring one or more services operation 504, according to one or more embodiments.

Referring now to FIG. 7C, operation 504 may include operation 715 depicting receiving one or more services configured to be carried out on the one or more devices, said acquiring at least partly based on the acquired obscured data including the property data regarding the at least one property of the one or more devices. For example, FIG. 3, e.g., FIG. 3B, shows one or more services designed to be at least partly executed using the one or more devices receiving at least partly based on the acquired obscured data that avoids particular identification module 315 receiving (e.g., receiving, from a service provider that designs services, e.g., if the service is games, a game company) one or more services (e.g., gaming applications) configured to be carried out on the one or more devices (e.g., video game systems), said acquiring at least partly based on the acquired obscured data including the property data (e.g., data indicating how much time the one or more devices spent playing particular types of games, e.g., first person shooters) regarding the at least one property of the one or more devices.

Referring again to FIG. 7C, operation 504 may include operation 716 depicting generating one or more services configured to be carried out on the one or more devices, said acquiring at least partly based on the acquired obscured data that describes the at least one property of the one or more devices. For example, FIG. 3, e.g., FIG. 3B, shows one or more services designed to be at least partly executed using the one or more devices generating at least partly based on the acquired obscured data that avoids particular identification module 316 generating (e.g., creating, or sourcing one or more developer resources to create) one or more services (e.g., a hiking trail status tracking application that tracks a usability of a particular hiking trail in the current climate conditions) configured to be carried out on the one or more devices (e.g., one or more smartphones), said acquiring at least partly based on the acquired obscured data (e.g., position data that does not identify the device by name, although it may give specific position data that could be used to infer the identity of the device given additional information, but by itself, does not identify the device) that describes the at least one property (location) of the one or more devices.

Referring again to FIG. 7C, operation 504 may include operation 718 depicting transmitting a request for one or more services configured to be carried out on the one or more devices, said request including at least a portion of the acquired obscured data. For example, FIG. 3, e.g., FIG. 3B, shows one or more services designed to be at least partly executed using the one or more devices request at least partly based on the acquired obscured data that avoids particular identification transmitting module 318 transmitting a request for one or more services (e.g., a service that analyzes a person's typing style and makes recommendations) configured to be carried out on the one or more devices (e.g., a desktop computer with a natural-style keyboard), said request including at least a portion of the acquired obscured data (e.g., data indicating the number of words typed per hour, and the number of times the backspace and/or delete key is struck, but does not specifically identify the device).

Referring again to FIG. 7C, operation 504 may include operation 720 depicting receiving the one or more services that were created in response to the transmitted request. For example, FIG. 3, e.g., FIG. 3B, shows receiving requested one or more services module 320 receiving the one or more services (e.g., a service that analyzes a person's typing style and makes recommendations) that were created in response to the transmitted request (e.g., the request for typing services for a person with the typing style revealed in the obscured data).

Referring again to FIG. 7C, operation 318 may include operation 322 depicting transmitting a request for one or more services configured to be carried out on the one or more devices to one or more service designers, said request including at least a portion of the acquired obscured data. For example, FIG. 3, e.g., FIG. 3B, shows one or more services designed to be at least partly executed using the one or more devices request at least partly based on the acquired obscured data that avoids particular identification transmitting to one or more service providers module 322 transmitting a request for one or more services (e.g., an application that collects concert information and selects concerts a user of a device might be interested in, based on music listened to by a user of a device, e.g., a media player, or a device that includes a media player) configured to be carried out on the one or more devices (e.g., one or more media player devices, e.g., an Apple iPod, or a home stereo system) to one or more service designers (e.g., developers of services, in this example, perhaps music industry or ticket sales companies are developing applications like this one, e.g., Sony Recording Studios develops such an application, or Ticketmaster), said request including at least a portion of the acquired obscured data (e.g., aggregate statistics regarding the types of music played by the various devices).

Referring again to FIG. 7C, operation 318 may include operation 324 depicting posting a request for the one or more services to a public or semi-public exchange said posted request including at least a portion of the acquired obscured data. For example, FIG. 3, e.g., FIG. 3B, shows one or more services designed to be at least partly executed using the one or more devices request at least partly based on the acquired obscured data, that avoids particular identification, transmitting to an open exchange module 324 posting (e.g., entering a request at a web portal to be posted to a public or semi-public web site) a request for the one or more services (e.g., a hiking trail status tracking application that tracks a usability of a particular hiking trail in the current climate conditions) to a public or a semi-public exchange (e.g., a developer network website), said posted request including at least a portion of the acquired obscured data (e.g., posting numbers of devices that were on a particular trail in the previous twenty-four hours, without revealing the device identities, or, in an embodiment, any specific information regarding the device).

Referring again to FIG. 7C, operation 724 may include operation 726 depicting posting a request for the one or more services to a social networking website, said posted request including at least a portion of the acquired obscured data. For example, FIG. 3, e.g., FIG. 3B, shows one or more services designed to be at least partly executed using the one or more devices request at least partly based on the acquired obscured data, that avoids particular identification, posting to a social networking site module 326 posting a request for the one or more services (e.g., a bicycling trail information and status tracking application) to a social networking website (e.g., Facebook, or Twitter), said posted request including at least a portion of the acquired obscured data (e.g., data indicating how many devices have three or more bicycle-related applications downloaded on them, without revealing the specific identity of the devices).

Figure 7D:
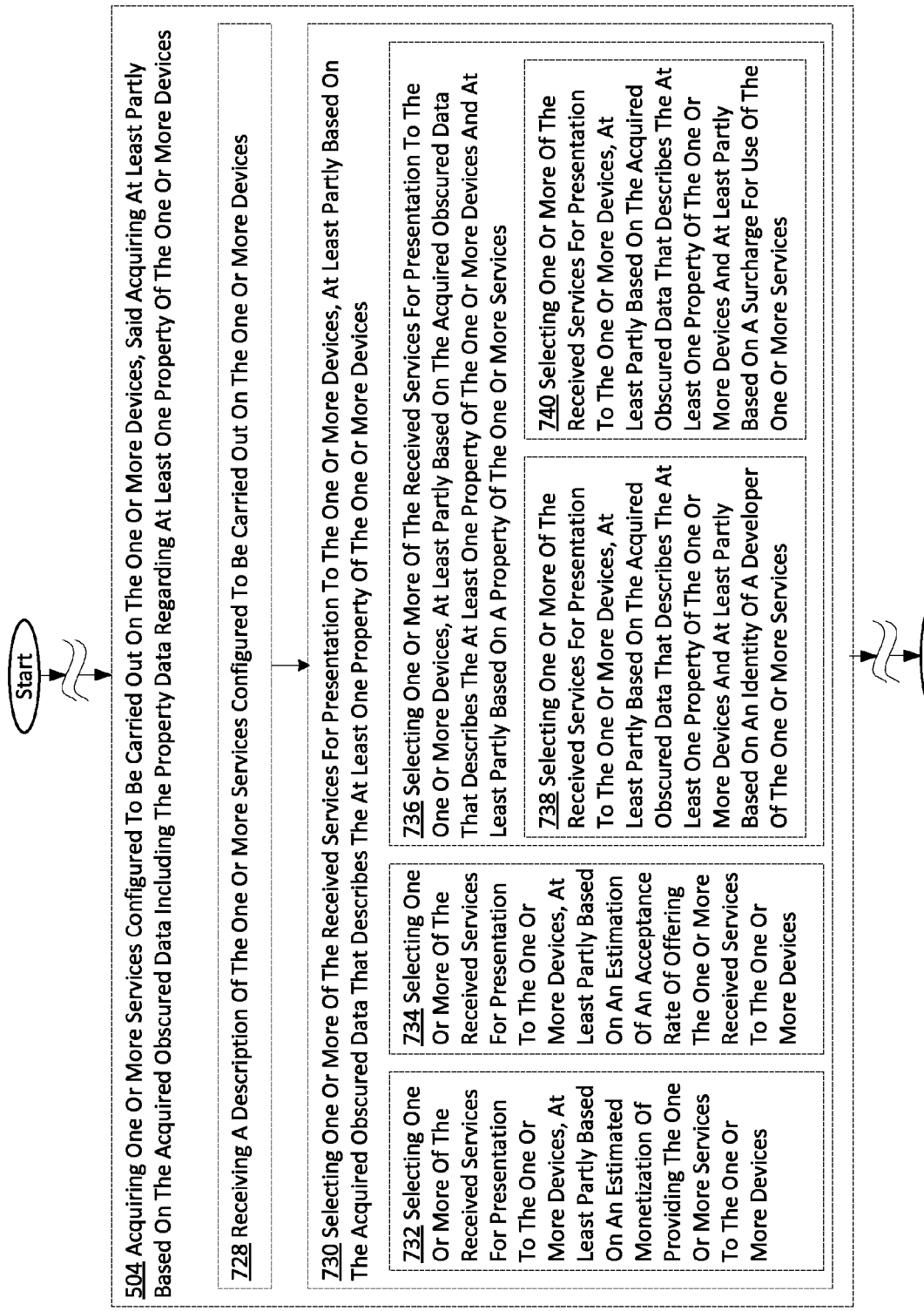
FIG. 7D is a high-level logic flow chart of a process depicting alternate implementations of an acquiring one or more services operation 504, according to one or more embodiments.

Referring now to FIG. 7D, operation 504 may include operation 728 depicting receiving a description of the one or more services configured to be carried out on the one or more devices. For example, FIG. 3, e.g., FIG. 3C, shows one or more services designed to be at least partly executed using the one or more devices description receiving module 328 receiving a description (e.g., a listing, including the name, and an estimated amount of resources used by) of the one or more services (e.g., a picture sorting service and a friend-in-picture counting service) configured to be carried out on the one or more devices (e.g., devices with an image capturing sensor and a memory).

Referring again to FIG. 7D, operation 504 may include operation 730 depicting selecting one or more of the received services for presentation to the one or more devices, at least partly based on the acquired obscured data that describes the at least one property of the one or more devices. For example, FIG. 3, e.g., FIG. 3C, shows one or more received described services designed to be at least partly executed using the one or more devices selecting at least partly based on the acquired obscured data that avoids particular identification module 330 selecting one or more of the received services (e.g. selecting the picture sorting service from the picture sorting service and the friend-in-picture counting service), for presentation to the one or more devices, at least partly based on the acquired obscured data (e.g., data indicating a number of pictures stored on the device) that describes the at least one property (e.g., a number of pictures stored on the device) of the one or more devices (e.g., devices with an image capturing sensor and a memory).

Referring again to FIG. 7D, operation 730 may include operation 732 depicting selecting one or more of the received services for presentation to the one or more devices, at least partly based on an estimated monetization of providing the one or more services to the one or more devices. For example, FIG. 3, e.g., FIG. 3C, shows one or more received described services designed to be at least partly executed using the one or more devices selecting at least partly based an estimated profitability of the one or more received described services module 332 selecting one or more of the received services (e.g., selecting a picture location tagging service from a picture sorting service and a friend identification service) for presentation to the one or more devices, at least partly based on an estimated monetization (e.g., the picture location tagging service is estimated to generate more revenue) of providing the one or more services to the one or more devices.

Referring again to FIG. 7D. operation 730 may include operation 734 depicting selecting one or more of the received services for presentation to the one or more devices, at least partly based on an estimation of an acceptance rate of offering the one or more received services to the one or more devices. For example, FIG. 3, e.g., FIG. 3C, shows one or more received described services designed to be at least partly executed using the one or more devices selecting at least partly based an estimated device agreement to install rate of the one or more received described services module 334 selecting one or more of the received services (e.g., selecting a rest stop finding service from a number of travel services) at least partly based on an estimation (e.g., in an embodiment, the estimation is a computer algorithm based on previous sales, whether using targeted information or general information, and in another embodiment, a human user creates the estimate, and in another embodiment, may be based on other factors, such as a number of miles traveled by the device without detecting a stop, or the average speed of the device, or a character profile of the device that is cross-checked against medical records to determine if a user of the device has prior prostate or kidney problems that require more frequent urination) of an acceptance rate (e.g., a rate at which the user of the device accepts the selected one or more services) of offering the one or more received services (e.g., the rest stop finding service) to the one or more devices (e.g., portable navigation systems).

Referring again to FIG. 7D, operation 730 may include operation 736 depicting selecting one or more of the received services for presentation to the one or more devices, at least partly based on the acquired obscured data that describes the at least one property of the one or more devices and at least partly based on a property of the one or more services. For example, FIG. 3, e.g., FIG. 3C, shows one or more received described services designed to be at least partly executed using the one or more devices selecting at least partly based on the acquired obscured data that avoids particular identification and at least partly based on a received described service property module 336 selecting one or more of the received services (e.g., a soda pop vending machine locating service) for presentation to the one or more devices (e.g., one or more smartphones), at least partly based on the acquired obscured data (e.g., temperature data collected by the smartphones that does not uniquely identify the smartphones) that describes the at least one property of the one or more devices (e.g., the devices are located at a position where the ambient temperature is greater than eighty degrees) and at least partly based on a property of the one or more services (e.g., the service is provided by a company, e.g., Coca-Cola, with which a preexisting relationship exists).

Referring again to FIG. 7D, operation 736 may include operation 738 depicting selecting one or more of the received services for presentation to the one or more devices, at least partly based on the acquired obscured data that describes the at least one property of the one or more devices and at least partly based on an identity of a developer of the one or more services. For example, FIG. 3, e.g., FIG. 3C, shows one or more received described services designed to be at least partly executed using the one or more devices selecting at least partly based on the acquired obscured data that avoids particular identification and at least partly based on a received described service developer identity module 338 selecting one or more of the received services (e.g., a pickup football game scheduler that compares friends' locations and schedules) for presentation to the one or more devices (e.g., various notebook computers, desktop computers, tablet devices, and smartphones that run a calendaring program authored by an operating system designer, e.g., Microsoft), at least partly based on the acquired obscured data (e.g., data indicating how many devices have the calendaring program installed) that describes the at least one property of the one or more devices (e.g., whether the calendaring program is installed, and in an embodiment, how much time is spent using the program, or how many calendar entries have been entered on the device), and at least partly based on an identity of a developer (e.g., a person or company that designed the pickup football game scheduler) of the one or more services (e.g., the company that owns the calendaring program may select based on a reputation of the developer, or that the developer used to work for the company, or that the developer has a revenue-sharing deal with the company, or a cross-promotional deal for the calendaring program).

Referring again to FIG. 7D, operation 736 may include operation 740 depicting selecting one or more of the received services for presentation to the one or more devices, at least partly based on the acquired obscured data that describes the at least one property of the one or more devices and at least partly based on a surcharge for use of the one or more services. For example, FIG. 3, e.g., FIG. 3C, shows one or more received described services designed to be at least partly executed using the one or more devices selecting at least partly based on the acquired obscured data that avoids particular identification and at least partly based on a received described service surcharge module 340 selecting one or more of the received services (e.g., a bicycle-riding mapping application) for presentation to the one or more devices (e.g., bicycle-mounted navigation systems), at least partly based on the acquired obscured data (e.g., data indicating how many miles per day the device travels on a bicycle, but that does not identify a serial number of the device or of the bicycle) that describes the at least one property (e.g., distance traveled over a particular time period) of the one or more devices (e.g., the bicycle-mounted navigation systems) and at least partly based on a surcharge for use of the one or more services (e.g., the bicycle-riding mapping application may be selected because it is free, or because it is the most expensive, depending on the embodiment and on the motivations of the various parties, e.g., a motivation to have the application installed on as many devices as possible).

Figure 7E:
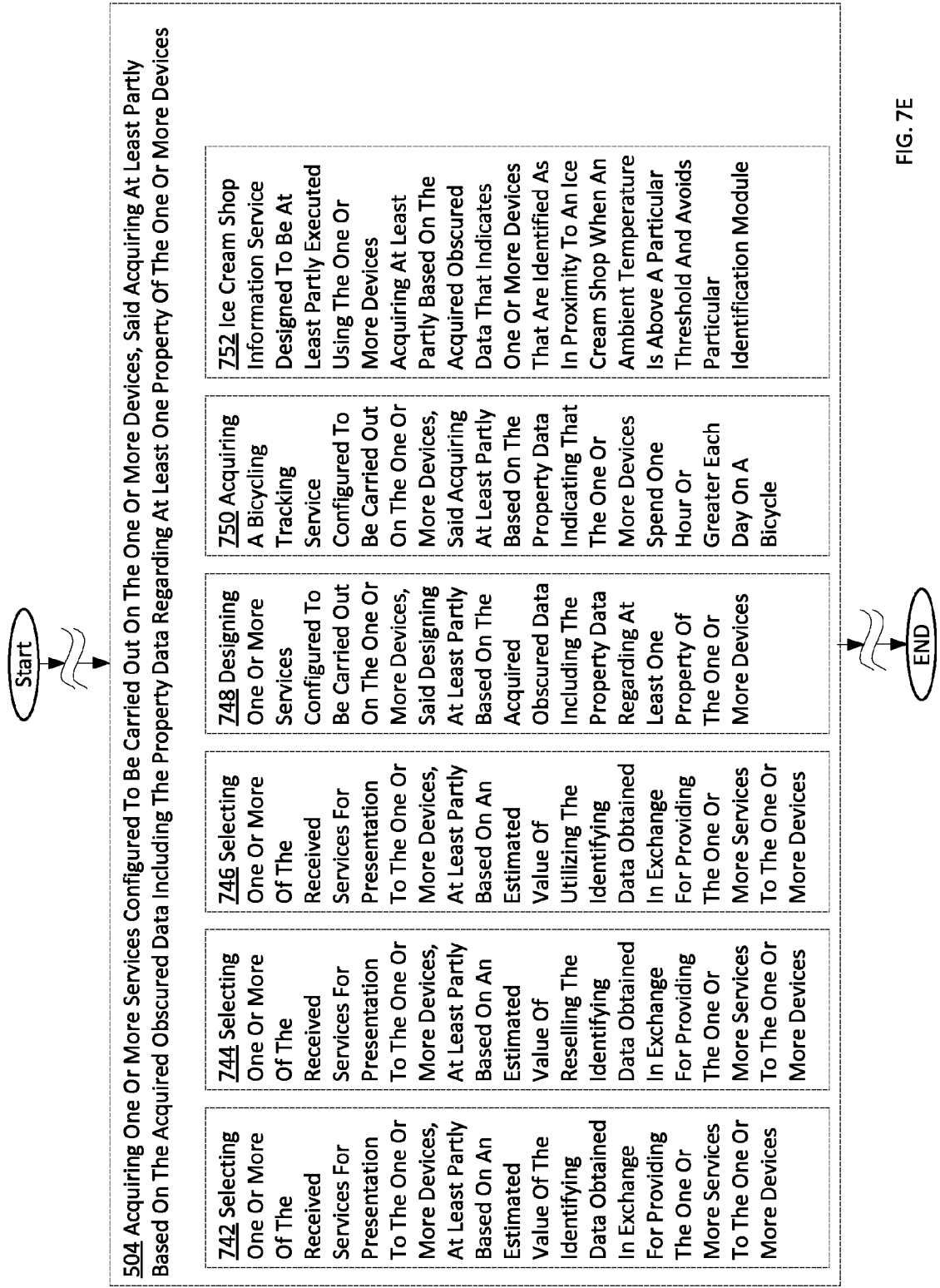
FIG. 7E is a high-level logic flow chart of a process depicting alternate implementations of an acquiring one or more services operation 504, according to one or more embodiments.

Referring now to FIG. 7E, operation 504 may include operation 742 depicting selecting one or more of the received services for presentation to the one or more devices, at least partly based on an estimated value of the identifying data obtained in exchange for providing the one or more services to the one or more devices. For example, FIG. 3, e.g., FIG. 3D, shows one or more services designed to be at least partly executed using the one or more devices acquiring at least partly based on an estimated value of data that identifies the one or more devices given in exchange for providing at least a portion of the one or more services module 342 selecting one or more of the received services (e.g., a service that tracks an employee's use of their time in order to boost their efficiency) for presentation to the one or more devices (e.g., employee's laptops issued by a company that the employee is allowed to take home), at least partly based on an estimated (e.g., estimated by a device running an algorithm, or by a human given various data inputs) value of the identifying data (e.g., identifying one or more specific devices and their usage patterns) obtained in exchange for providing the one or more services (e.g., the time usage tracker) to the one or more devices (e.g., the company-issued laptops).

Referring again to FIG. 7E, operation 504 may include operation 744 depicting selecting one or more of the received services for presentation to the one or more devices, at least partly based on an estimated value of selling the identifying data obtained in exchange for providing the one or more services to the one or more devices. For example, FIG. 3, e.g., FIG. 3D, shows one or more services designed to be at least partly executed using the one or more devices acquiring at least partly based on an estimated resale of data that identifies the one or more devices given in exchange for providing at least a portion of the one or more services module 344 selecting one or more of the received services (e.g., a music playlist creating service) for presentation to the one or more devices (e.g., portable media players, e.g., an Apple iPod), at least partly based on an estimated (e.g., estimated by a device running an algorithm, or by a human given various data inputs, or estimated quotes provided by one or more entities that may be interested in purchasing the data) value of selling (e.g., providing to a third party for a fee) the identifying data (e.g., a list of the music that a particular device likes to play) obtained in exchange for providing the one or more services (e.g., a music playlist creating service) to the one or more devices (e.g., the portable media players).

Referring again to FIG. 7E, operation 504 may include operation 746 depicting selecting one or more of the received services for presentation to the one or more devices, at least partly based on an estimated value of utilizing the identifying data obtained in exchange for providing the one or more services to the one or more devices. For example, FIG. 3, e.g., FIG. 3D, shows one or more services designed to be at least partly executed using the one or more devices acquiring at least partly based on an estimated value of using data that identifies the one or more devices given in exchange for providing at least a portion of the one or more services module 346 selecting one or more of the received services (e.g., a "find new fun places" service based on a device's location and/or other factors about the user) for presentation to the one or more devices (e.g., one or more tablet devices and/or smartphones being carried by users on vacations), at least partly based on an estimated value of utilizing the identifying data (e.g., using the identifying data that specifically identifies the devices that commonly go to exotic burger shops, so that more applications that cost money may be delivered to the device that cater to burger lovers) obtained in exchange for providing the one or more services e.g., the "find new fun places" service based on a device's location and/or other factors about the user) to the one or more devices (e.g., the one or more tablet devices and/or smartphones being carried by users on vacations).

Referring again to FIG. 7E, operation 504 may include operation 748 depicting designing one or more services configured to be carried out on the one or more devices, said designing at least partly based on the acquired obscured data including the property data regarding at least one property of the one or more devices. For example, FIG. 3, e.g., FIG. 3D, shows one or more services designed to be at least partly executed using the one or more devices developing at least partly based on the acquired obscured data that avoids particular identification module 348 designing one or more services (e.g., designing (e.g., contracting to a device that puts together services, or to a human developer) one or more services configured to be carried out on the one or more devices, said designing at least partly based on the acquired obscured data including the property data regarding at least one property (e.g., a location) of the one or more devices.

Referring again to FIG. 7E, operation 504 may include operation 750 depicting acquiring a bicycling tracking service configured to be carried out on the one or more devices, said acquiring at least partly based on the property data indicating that the one or more devices spend one hour or greater each day on a bicycle. For example, FIG. 3, e.g., FIG. 3D, shows bicycling traffic service designed to be at least partly executed using the one or more devices acquiring at least partly based on the acquired obscured data that indicates one or more devices that are identified as moving on a bicycle for one hour per day or more and avoids particular identification module 350 acquiring a bicycling tracking service configured to be carried out on the one or more devices (e.g., portable navigation devices that can be carried in a pocket or mounted to the handlebars of a bicycle), said acquiring at least partly based on the property data indicating that the one or more devices spend one hour or greater each day on a bicycle Referring again to FIG. 7E, operation 504 may include operation 752 depicting acquiring an ice cream shop information service configured to be carried out on the one or more devices, said acquiring at least partly based on the property data indicating that the one or more devices are in a proximity of an ice cream shop. For example, FIG. 3, e.g., FIG. 3D, shows ice cream shop information service designed to be at least partly executed using the one or more devices acquiring at least partly based on the acquired obscured data that indicates one or more devices that are identified as in proximity to an ice cream shop when an ambient temperature is above a particular threshold and avoids particular identification module 352 acquiring an ice cream shop information service configured to be carried out on the one or more devices (e.g., a user's smartphone), said acquiring at least partly based on the property data (e.g., location data of the device) indicating that the one or more devices are in a proximity of an ice cream shop.

Figure 7F:
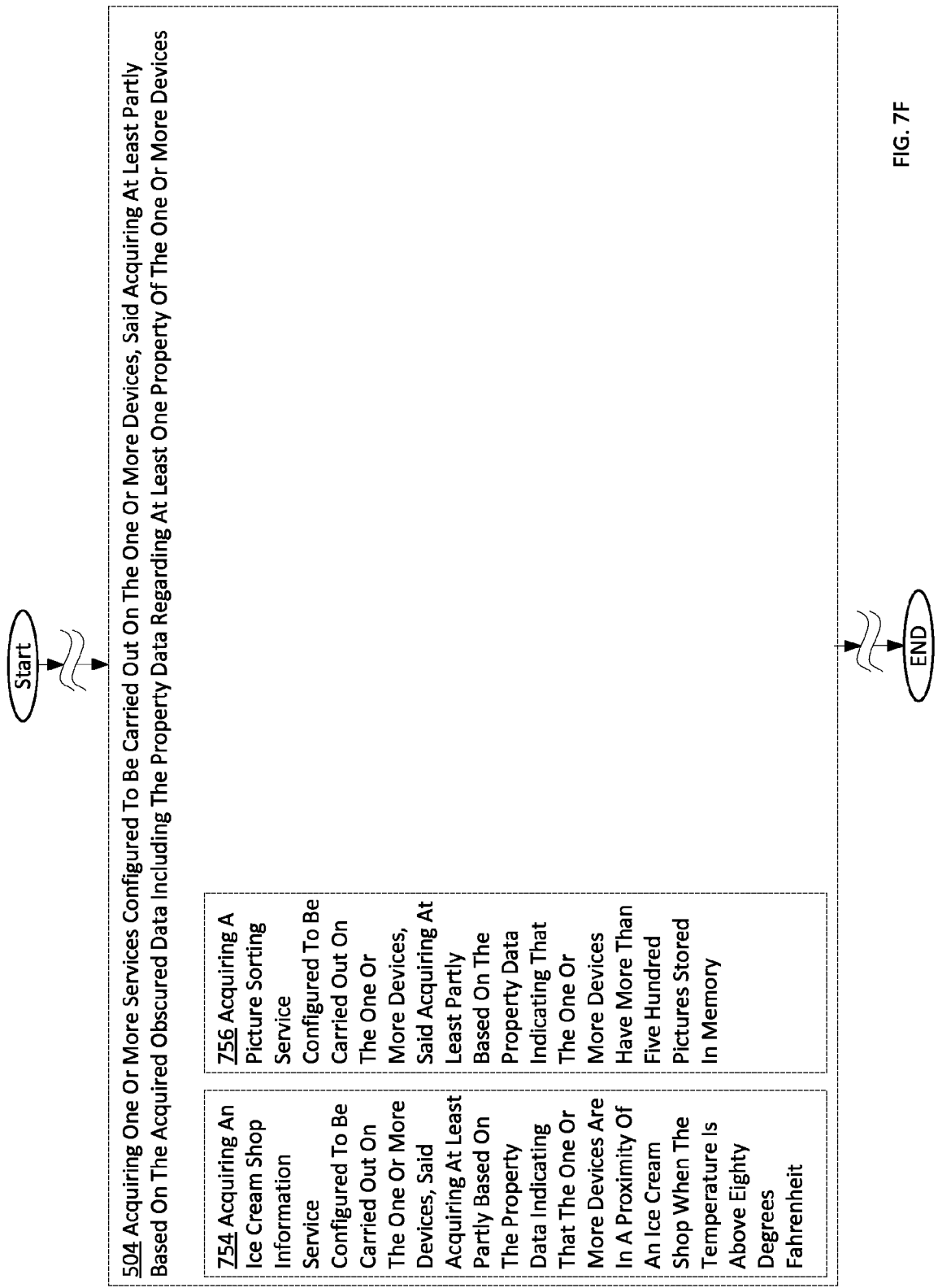
FIG. 7F is a high-level logic flow chart of a process depicting alternate implementations of an acquiring one or more services operation 504, according to one or more embodiments.

Referring now to FIG. 7F, operation 504 may include operation 754 depicting acquiring an ice cream shop information service configured to be carried out on the one or more devices, said acquiring at least partly based on the property data indicating that the one or more devices are in a proximity of an ice cream shop when the temperature is above eighty degrees Fahrenheit. For example, FIG. 3, e.g., FIG. 3E, shows ice cream shop information service designed to be at least partly executed using the one or more devices acquiring at least partly based on the acquired obscured data that indicates one or more devices that are identified as in proximity to an ice cream shop when an ambient temperature is above eighty degrees and avoids particular identification module 354 acquiring an ice cream shop information service configured to be carried out on the one or more devices (e.g., personal devices carried by or worn on (e.g., such as augmented reality goggles), said acquiring at least partly based on the property data indicating that the one or more devices are in a proximity of an ice cream shop when the temperature is above eighty degrees Fahrenheit.

Referring again to FIG. 7F, operation 504 may include operation 756 depicting acquiring a picture sorting service configured to be carried out on the one or more devices, said acquiring at least partly based on the property data indicating that the one or more devices have more than five hundred pictures stored in memory. For example, FIG. 3, e.g., FIG. 3E, shows digital photo sorting service designed to be at least partly executed using the one or more devices acquiring at least partly based on the acquired obscured data that indicates one or more devices having five hundred or more photographs taken and avoids particular identification module 356 acquiring a picture sorting service configured to be carried out on the one or more devices (e.g., digital cameras with internet connections, tablet devices with cameras built in, and laptop computers that store pictures downloaded from a camera), said acquiring at least partly based on the property data indicating that the one or more devices have more than five hundred pictures stored in memory.

Figure 8A:
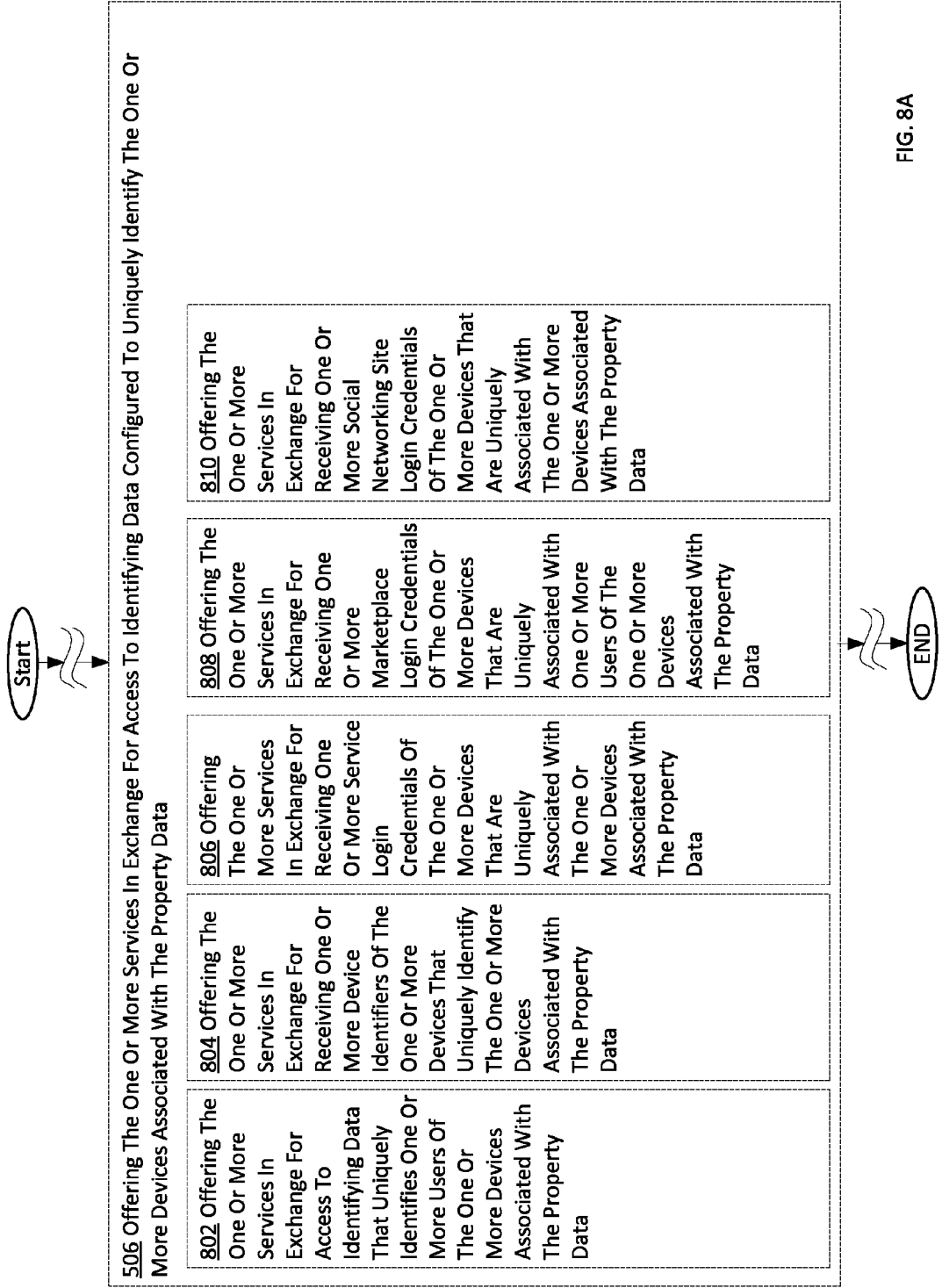
FIG. 8A is a high-level logic flow chart of a process depicting alternate implementations of a facilitating performance of at least a portion of the at least one service operation 506, according to one or more embodiments.
Figure 8C:
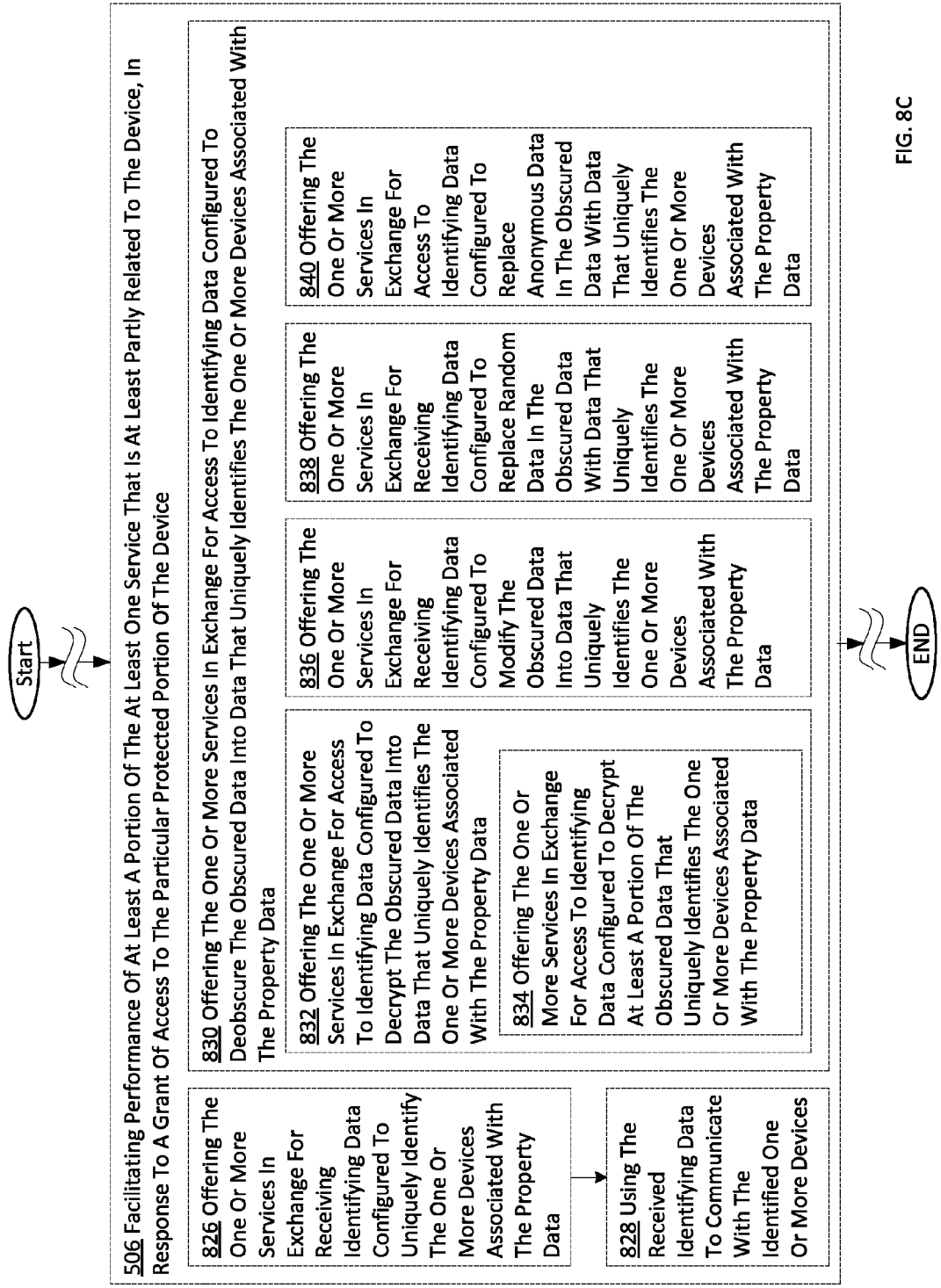
FIG. 8C is a high-level logic flow chart of a process depicting alternate implementations of a facilitating performance of at least a portion of the at least one service operation 506, according to one or more embodiments.

FIGS. 8A-8C depict various implementations of operation 506 depicting offering the one or more services in exchange for access to identifying data configured to uniquely identify the one or more devices associated with the property data, according to embodiments. Referring now to FIG. 8A, operation 506 may include operation 802 depicting offering the one or more services in exchange for access to identifying data that uniquely identifies one or more users of the one or more devices associated with the property data. For example, FIG. 4, e.g., FIG. 4A, shows acquired one or more services as return for access to particularly identifying data that identifies one or more users of the one or more devices associated with attribute data offering module 402 offering the one or more services (e.g., a common web page caching and updating service for offline and/or faster reading) in exchange for access to identifying data (e.g., a login to an email service) that uniquely identifies one or more users of the one or more devices (e.g., an internet-enabled device) associated with the property data (e.g., a web browsing history of a device).

Referring again to FIG. 8A, operation 506 may include operation 804 depicting offering the one or more services in exchange for receiving one or more device identifiers of the one or more devices that uniquely identify the one or more devices associated with the property data. For example, FIG. 4, e.g., FIG. 4A, shows acquired one or more services as return for access to unique device identifier data of the one or more devices associated with attribute data offering module 404 offering the one or more services in exchange for receiving one or more device identifiers (e.g., MAC addresses) of the one or more devices that uniquely identify the one or more devices (e.g., any device on a network) associated with the property data (e.g., ambient temperature data surrounding the device).

Referring again to FIG. 8A, operation 506 may include operation 806 depicting offering the one or more services in exchange for receiving one or more service login credentials of the one or more devices that are uniquely associated with the one or more devices associated with the property data. For example, FIG. 4, e.g., FIG. 4A, shows acquired one or more services as return for access to service login credentials used by at least one of the one or more devices associated with attribute data offering module 406 offering the one or more services (e.g., a music playlist creating service) in exchange for receiving one or more service login credentials (e.g., credentials for a user's login to a music sharing, purchasing, and managing network, e.g., Microsoft's Zune network) of the one or more devices (e.g., a Microsoft Zune) that are uniquely associated with the one or more devices (e.g., each device may have one login) associated with the property data (e.g., a list of artists whose music is stored on the device, and, in an embodiment, how many songs by each artist that are stored on the device).

Referring again to FIG. 8A, operation 506 may include operation 808 depicting offering the one or more services in exchange for receiving one or more marketplace login credentials of the one or more devices that are uniquely associated with one or more users of the one or more devices associated with the property data. For example, FIG. 4, e.g., FIG. 4A, shows acquired one or more services as return for access to marketplace login credentials used by at least one of the one or more devices associated with attribute data offering module 408 offering the one or more services (e.g., a weather forecasting service) in exchange for receiving one or more marketplace login credentials (e.g., credentials to a store where a user can purchase media for a phone device online, e.g., the Apple App Store) of the one or more devices (e.g., an Apple iMac and an Apple iPhone) that are uniquely associated with one or more users of the one or more devices associated with the property data (e.g., data regarding the surroundings of the Apple device).

Referring again to FIG. 8A, operation 506 may include operation 810 depicting offering the one or more services in exchange for receiving one or more social networking site login credentials of the one or more devices that are uniquely associated with the one or more devices associated with the property data. For example, FIG. 4, e.g., FIG. 4A, shows acquired one or more services as return for access to social networking site login credentials used by at least one of the one or more devices associated with attribute data offering module 410 offering the one or more services (e.g., a "how green are you" service that tracks the user's habits to determine their environmental impact, and then posts that to the user's social networking site of their choice) in exchange for receiving one or more social networking site (e.g., Facebook) login credentials (e.g., in an embodiment, that may include a login and a password) of the one or more devices (e.g., a smartphone) that are uniquely associated with the one or more devices associated with the property data.

Referring now to FIG. 8B, operation 506 may include operation 812 depicting offering a friend-finding service in exchange for access to identifying data that uniquely identifies the one or more devices associated with the property data. For example, FIG. 4, e.g., FIG. 4B, shows acquired friend-finding service as return for access to particularly identifying data of the one or more devices associated with attribute data offering module 412 offering a friend-finding service in exchange for access to identifying data (e.g., an account number associated with a user that is herself associated with a device, e.g., her smartphone) that uniquely identifies the one or more devices (e.g., identifies the device as a specific known user's device) associated with the property data (e.g., contact list data).

Referring again to FIG. 8B, operation 412 may include operation 814 depicting offering a friend-finding service in exchange for access to identifying data that uniquely identifies the one or more devices having more than twenty-five contacts in their contact list. For example, FIG. 4, e.g., FIG. 4B shows acquired friend-finding service as return for access to particularly identifying data of the one or more devices having a contact list having greater than a predetermined number of contacts offering module 414 offering a friend-finding service in exchange for access to identifying data (e.g., an identification number assigned by the communication network that handles the transmission of data to and from the device, e.g., a Verizon 4G LTE network) that uniquely identifies the one or more devices having more than twenty-five contacts in their contact list.

Referring again to FIG. 8B, operation 414 may include operation 816 depicting offering a friend-finding service in exchange for access to identifying data configured to convert the obscured data into data that uniquely identifies the one or more devices having more than twenty-five contacts in their contact list. For example, FIG. 4, e.g., FIG. 4B, shows acquired friend-finding service as return for access to data to convert acquired obscured data into particularly identifying data of the one or more devices having a contact list having greater than a predetermined number of contacts offering module 416 offering a friend-finding service in exchange for access to identifying data configured to convert the obscured data into data that uniquely identifies the one or more devices having more than twenty-five contacts in their contact list.

Referring again to FIG. 8B, operation 816 may include operation 818 depicting offering a friend-finding service in exchange for access to identifying data configured to decrypt a portion of the obscured data that uniquely identifies the one or more devices having more than twenty-five contacts in their contact list. For example, FIG. 4, e.g., FIG. 4B, shows acquired friend-finding service as return for access to data to decrypt acquired obscured data into particularly identifying data of the one or more devices having a contact list having greater than a predetermined number of contacts offering module 418 offering a friend-finding service in exchange for access to identifying data (e.g., the social security number of a user that is associated with the device) configured to decrypt a portion of the obscured data that uniquely identifies the one or more devices having more than twenty-five contacts in their contact list.

Referring again to FIG. 8B, operation 506 may include operation 820 depicting presenting an offer to facilitate the carrying out of one or more services in exchange for access to identifying data configured to uniquely identify the one or more devices associated with the property data. For example, FIG. 4, e.g., FIG. 4B, shows acquired one or more services as return for access to particularly identifying data of the one or more devices associated with attribute data offer for service facilitation presenting module 420 presenting an offer to facilitate the carrying out of one or more services (e.g., an in-game item recommending service that observes a user playing a game that supports in-game purchases, and recommends items for that user to purchase in-game) in exchange for access to identifying data (e.g., an device identification number associated with a particular game machine) configured to uniquely identify the one or more devices (e.g., a game system, e.g., a PlayStation) associated with the property data (e.g., data indicating how long a user has been playing one or more particular games).

Referring again to FIG. 8B, operation 506 may include operation 822 depicting facilitating presentation, on at least one of the one or more devices, an offer to provide the one or more services in exchange for access to identifying data configured to uniquely identify the one or more devices associated with the property data. For example, FIG. 4, e.g., FIG. 4B, shows acquired one or more services as return for access to particularly identifying data of the one or more devices associated with attribute data offer for service on at least one of the one or more devices facilitation presenting module 422 facilitating presentation (e.g., taking one or more steps to assist in displaying on a display of at least one of the one or more devices), an offer to provide the one or more services (e.g., an in-game item recommending service that observes a user playing a game that supports in-game purchases, and recommends items for that user to purchase in-game) in exchange for access to identifying data (e.g., a configuration of a saved game stored in memory that is unique to a particular device) configured to uniquely identify the one or more devices associated with the property data.

Referring again to FIG. 8B, operation 506 may include operation 824 depicting offering the one or more services in exchange for receiving identifying data configured to uniquely identify the one or more devices associated with the property data. For example, FIG. 4, e.g., FIG. 4B, shows acquired one or more services as return for access to particularly identifying data of the one or more devices associated with attribute data offering module 424 offering the one or more services (e.g., a steak dinner finding service) in exchange for receiving identifying data configured to uniquely identify the one or more devices (e.g., one or more user smartphones) associated with the property data.

Referring now to FIG. 8C, operation 506 may include operation 826 depicting offering the one or more services in exchange for receiving identifying data configured to uniquely identify the one or more devices associated with the property data. For example, FIG. 4, e.g., FIG. 4C, shows acquired one or more services as return for access to particularly identifying data of the one or more devices associated with attribute data receiving for use module 426 offering the one or more services (e.g., the ideal garden planting time calculating service), in exchange for receiving identifying data (e.g., an address of the home in which the garden planning device is installed) configured to uniquely identify the one or more devices (e.g., one or more home gardening assistance devices that are mounted to a piece of real property) associated with the property data (e.g., weather conditions).

Referring again to FIG. 8C, operation 506 may include operation 828 depicting using the received identifying data to communicate with the identified one or more devices. For example, FIG. 4, e.g., FIG. 4C, shows received particularly identifying data utilizing for communication with the particularly identified one or more devices module 428 using the received identifying data (e.g., the address) to communicate (e.g., either electronically communicate with the device, or to mail the address associated with the device a sales flyer for extra trowels) with the identified one or more devices (e.g., the one or more home gardening assistance devices that are mounted to a piece of real property).

Referring again to FIG. 8C, operation 506 may include operation 830 depicting offering the one or more services in exchange for access to identifying data configured to deobscure the obscured data into data that uniquely identifies the one or more devices associated with the property data. For example, FIG. 4, e.g., FIG. 4C, shows acquired one or more services as return for access to particularly identifying data configured to deobscure the acquired obscured data offering module 430 offering the one or more services (e.g., displaying a rule book for a sport or game being played in the proximity of the device) in exchange for access to identifying data (e.g., a deobscuring lookup table that can look up a user's real name from the obscured data, using the obscured data as a key to the lookup table) configured to deobscure (e.g., convert the obscured data into data that uniquely identifies the one or more devices and/or a user of the one or more devices) the obscured data (e.g., data including property data and user names that were altered from their true value using a lookup table) into data that uniquely identifies the one or more devices (e.g., a name of the owner of the device stored when the device was first configured by the user) associated with the property data (e.g., location data).

Referring again to FIG. 8C, operation 830 may include operation 832 depicting offering the one or more services in exchange for access to identifying data configured to decrypt the obscured data into data that uniquely identifies the one or more devices associated with the property data. For example, FIG. 4, e.g., FIG. 4C, shows acquired one or more services as return for access to particularly identifying data configured to decrypt the acquired obscured data offering module 432 offering the one or more services (e.g., a service for managing data transfer over a tablet that has wireless and cellular connections) in exchange for access to identifying data configured to decrypt the obscured data into data that uniquely identifies the one or more devices associated with the property data.

Referring again to FIG. 8C, operation 832 may include operation 834 depicting offering the one or more services in exchange for access to identifying data configured to decrypt at least a portion of the obscured data that uniquely identifies the one or more devices associated with the property data. For example, FIG. 4, e.g., FIG. 4C, shows acquired one or more services as return for access to particularly identifying data configured to decrypt a particular portion of the acquired obscured data offering module 434 offering the one or more services (e.g., an alternative health-food finding service) in exchange for access to identifying data (e.g., a decryption algorithm) at least a portion (e.g., in an embodiment, just the identifying data is encrypted) of the obscured data that uniquely identifies (e.g., a device serial number) the one or more devices device (e.g., an updating inventory of what is in the refrigerator that is stored and maintained on the device, e.g., a smart appliance, e.g., a smart refrigerator in a user's house) associated with the property data (e.g., an updating inventory of the food in the refrigerator stored in memory).

Referring again to FIG. 8C, operation 830 may include operation 836 depicting offering the one or more services in exchange for receiving identifying data configured to modify the obscured data into data that uniquely identifies the one or more devices associated with the property data. For example, FIG. 4, e.g., FIG. 4C, shows acquired one or more services as return for access data configured to modify the acquired obscured data into particularly identifying data offering module 436 offering the one or more services (e.g., a service identifying which grocery store has the freshest inventory of blackberries) in exchange for receiving identifying data configured to modify (e.g., fix one or more characters of a character string identifying the device that were modified to obscure the device identifier character string) the obscured data into data that uniquely identifies the one or more devices associated with the property data.

Referring again to FIG. 8C, operation 830 may include operation 838 depicting offering the one or more services in exchange for receiving identifying data configured to replace random data in the obscured data with data that uniquely identifies the one or more devices associated with the property data. For example, FIG. 4, e.g., FIG. 4C, shows acquired one or more services as return for access data configured to replace a portion of the acquired obscured data with particularly identifying data offering module 438 offering the one or more services (e.g., a service designed to teach the user of a device used to access one or more banking web sites to conserve money and save wisely) in exchange for receiving identifying data configured to replace random data in the obscured data with data that uniquely identifies (e.g., bank account numbers) the one or more devices (e.g., the bank account number that is inputted by the device may uniquely identify the device) associated with the property data.

Referring again to FIG. 8C, operation 830 may include operation 840 depicting offering the one or more services in exchange for access to identifying data configured to replace anonymous data in the obscured data with data that uniquely identifies the one or more devices associated with the property data. For example, FIG. 4, e.g., FIG. 4C, shows acquired one or more services as return for access data configured to change an anonymized portion of the acquired obscured data into particularly identifying data offering module 440 offering the one or more services (e.g., an application that downloads user fan art for media stored in a user's cloud storage) in exchange for access to identifying data (e.g., a social networking service, e.g., Facebook username of a user that owns the device) configured to replace anonymous data in the obscured data with data that uniquely identifies the one or more devices associated with the property data.

Figure 8D:
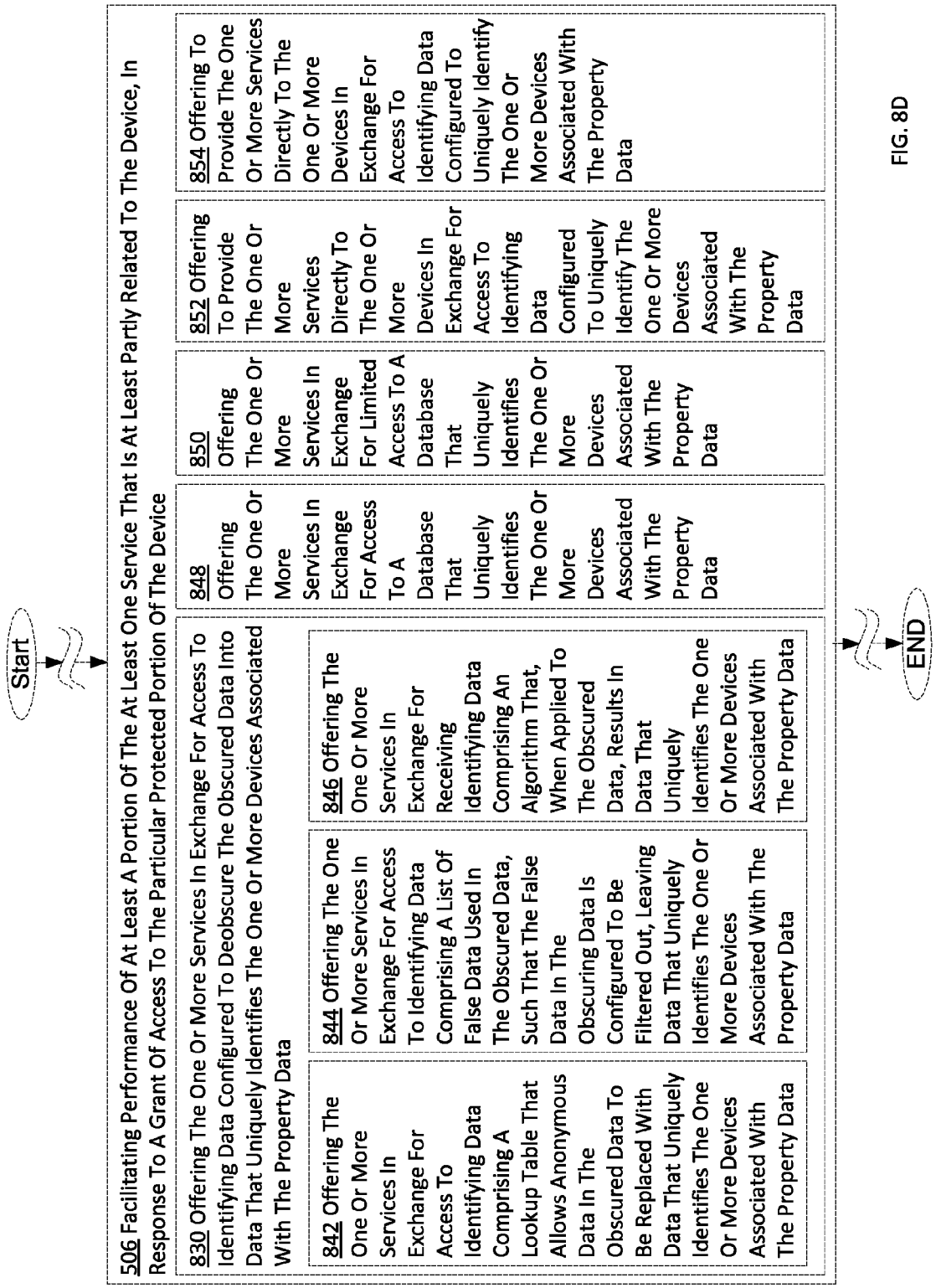
FIG. 8D is a high-level logic flow chart of a process depicting alternate implementations of a facilitating performance of at least a portion of the at least one service operation 506, according to one or more embodiments.

Referring now to FIG. 8D, operation 830 may include operation 842 depicting offering the one or more services in exchange for access to identifying data comprising a lookup table that allows anonymous data in the obscured data to be replaced with data that uniquely identifies the one or more devices associated with the property data. For example, FIG. 4, e.g., FIG. 4D, shows acquired one or more services as return for access data configured to substitute an anonymized portion of the acquired obscured data with particularly identifying data using a lookup table offering module 442 offering the one or more services (e.g., a story building application that builds a narrative story out of a user's twitter feed and a user's friends' microblogging service feed, e.g., Twitter feed) in exchange for access to identifying data comprising a lookup table that allows anonymous data in the obscured data to be replaced with data that uniquely identifies the one or more devices associated with the property data (e.g., the anonymous data is used as an index of the lookup table, which reveals the uniquely identifying data).

Referring again to FIG. 8D, operation 830 may include operation 844 depicting offering the one or more services in exchange for access to identifying data comprising a list of false data used in the obscured data, such that the false data in the obscuring data is configured to be filtered out, leaving data that uniquely identifies the one or more devices associated with the property data. For example, FIG. 4, e.g., FIG. 4D, shows acquired one or more services as return for access to data filter out a false data portion of the acquired obscured data and leaving particularly identifying data as a remainder offering module 444 offering the one or more services in exchange for access to identifying data comprising a list of false data (e.g., data that may appear similar to identifying data but that is used to prevent detection of the actual identifying data, e.g., a list of aliases appearing along with a list of real names) used in the obscured data (e.g., data including a list of users of the one or more devices, to which a number of false names, e.g., aliases, have been added), such that the false data in the obscuring data is configured to be filtered out (e.g., the aliases can be removed), leaving data that uniquely identifies the one or more devices associated with the property data.

Referring again to FIG. 8D, operation 830 may include operation 846 depicting offering the one or more services in exchange for receiving identifying data comprising an algorithm that, when applied to the obscured data, results in data that uniquely identifies the one or more devices associated with the property data. For example, FIG. 4, e.g., FIG. 4D, shows acquired one or more services as return for access to an algorithm for which application to the acquired obscured data results in particularly identifying data offering module 446 offering the one or more services (e.g., a personal money and savings management service) in exchange for receiving identifying data comprising an algorithm (e.g., a reversal algorithm that reverses previously encrypted data), that when applied to the obscured data (e.g., data for which the portion that uniquely identifies a device has been obscured via the use of a reversible algorithm), results in data that uniquely identifies (e.g., IP addresses) the one or more devices associated with the property data.

Referring again to FIG. 8D, operation 506 may include operation 848 depicting offering the one or more services in exchange for access to a database that uniquely identifies the one or more devices associated with the property data. For example, FIG. 4, e.g., FIG. 4D, shows acquired one or more services as return for access to a database of particularly identifying data of the one or more devices associated with attribute data offering module 448 offering the one or more services in exchange for access to a database (e.g., a database kept by a cable television service provider, e.g., Comcast) that uniquely identifies the one or more devices (e.g., internet-enabled television sets) associated with the property data (e.g., property data indicating televisions that are turned on for more than five hours per day).

Referring again to FIG. 8D, operation 506 may include operation 850 depicting offering the one or more services in exchange for limited access to a database that uniquely identifies the one or more devices associated with the property data. For example, FIG. 4, e.g., FIG. 4D, shows acquired one or more services as return for restricted access to a database of particularly identifying data of the one or more devices associated with attribute data offering module 450 offering the one or more services in exchange for limited access (e.g., the entire database cannot be copied, but portions may be viewed and/or stored) to a database that uniquely identifies the one or more devices (e.g., a database kept by a device provider, e.g., Apple or Samsung) associated with the property data (e.g., location data).

Referring again to FIG. 8D, operation 506 may include operation 852 depicting offering to provide the one or more services directly to the one or more devices in exchange for access to identifying data configured to uniquely identify the one or more devices associated with the property data. For example, FIG. 4, e.g., FIG. 4D, shows direct delivery of one or more services as return for access to particularly identifying data of the one or more devices associated with attribute data offering module 452 offering to provide the one or more services (e.g., an athletic training assistance body monitoring service) directly to the one or more devices (e.g., a heart-rate and other factors monitoring watch) in exchange for access to identifying data (e.g., data that uniquely identifies a user of the monitoring watch, via the user's unique login name) configured to uniquely identify the one or more devices (e.g., a unique user login is sufficient to uniquely identify the monitoring watch as "Todd's watch," because Todd does not have any other devices that are exactly like Todd's watch) associated with the property data.

Referring again to FIG. 8D, operation 506 may include operation 856 depicting offering one or more services configured to be presented to one or more users of the one or more devices, in exchange for access to identifying data configured to uniquely identify the one or more devices associated with the property data. For example, FIG. 4, e.g., FIG. 4D, shows direct delivery to one or more users of the one or more devices, of one or more services as return for access to particularly identifying data of the one or more devices associated with attribute data offering module 454 offering one or more services (e.g., a common web page caching and updating service for offline and/or faster reading) configured to be presented to one or more users of the one or more devices (e.g., any device with a web browser, including smartphones, tablets, desktop computers, laptop computers, internet-enabled kitchen devices, and the like), in exchange for access to identifying data (e.g., data that specifically identifies the device, or the user using the device, e.g., an IP address) configured to uniquely identify the one or more devices associated with the property data (e.g., data regarding what web pages are browsed and how frequently the web pages are browsed).

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A device, comprising:
an obscured data that references at least one attribute of one or more devices in a manner that avoids particular identification of the one or more devices acquiring module;
a one or more services designed to be at least partly executed through use of the one or more devices acquiring at least partly based on the acquired obscured data that avoids particular identification module; and
an acquired one or more services as return for access to particularly identifying data of the one or more devices associated with attribute data offering module.

2. The device of claim 1, wherein said obscured data that references at least one attribute of one or more devices in a manner that avoids particular identification of the one or more devices acquiring module comprises:
an obscured data that references at least one attribute of more than one devices in a manner that avoids particular identification of individual devices of the more than one devices acquiring module, wherein the devices are smartphone devices and the at least one attribute is a location attribute with device identifiers removed.

3. The device of claim 1, wherein said obscured data that references at least one attribute of one or more devices in a manner that avoids particular identification of the one or more devices acquiring module comprises:
an obscured data that references a number of devices having at least one attribute at a particular time in a manner that avoids particular identification of the one or more devices acquiring module, wherein the at least one attribute is a location attribute and the obscured data is an encrypted user identification data.

4. The device of claim 3, wherein said obscured data that references a number of devices having at least one attribute at a particular time in a manner that avoids particular identification of the one or more devices acquiring module comprises:
an obscured data that references a number of devices having a particular type of data at a particular time in a manner that avoids particular identification of the one or more devices acquiring module, wherein the obscured data is a device identifier in which characters of the device identifier have been replaced with characters from a lookup table.

5. The device of claim 1, wherein said obscured data that references at least one attribute of one or more devices in a manner that avoids particular identification of the one or more devices acquiring module comprises:
an obscured data that references at least one attribute of one or more devices in a manner that avoids particular identification of the one or more devices until deobscured acquiring module.

6. The device of claim 5, wherein said obscured data that references at least one attribute of one or more devices in a manner that avoids particular identification of the one or more devices until deobscured acquiring module comprises:
an obscured data that references at least one attribute of one or more devices in a manner that avoids particular identification of the one or more devices until deobscured via data manipulation acquiring module.

7. The device of claim 1, wherein said obscured data that references at least one attribute of one or more devices in a manner that avoids particular identification of the one or more devices acquiring module comprises:
an obscured data that references at least one attribute of one or more devices in a manner that avoids particular identification of the one or more devices through obscuring device identification data acquiring module.

8. The device of claim 1, wherein said obscured data that references at least one attribute of one or more devices in a manner that avoids particular identification of the one or more devices acquiring module comprises:
an obscured data that references at least one attribute of one or more devices in a manner that avoids particular identification of the one or more devices by at least partially encrypting identification data acquiring module.

9. The device of claim 1, wherein said obscured data that references at least one attribute of one or more devices in a manner that avoids particular identification of the one or more devices acquiring module comprises:
an obscured data that references at least one attribute of one or more devices in a manner that avoids particular identification of the one or more devices by applying one or more reversible algorithms to identification data acquiring module.

10. The device of claim 1, wherein said obscured data that references at least one attribute of one or more devices in a manner that avoids particular identification of the one or more devices acquiring module comprises:
an obscured data that references at least one attribute of one or more devices in a manner that avoids particular identification of the one or more devices by replacing identification data with data retrieved from a static table acquiring module.

11. The device of claim 1, wherein said obscured data that references at least one attribute of one or more devices in a manner that avoids particular identification of the one or more devices acquiring module comprises:
an obscured data that references at least one attribute of one or more devices in a manner that avoids particular identification of the one or more devices by replacing identification data with ordered data configured to appear random acquiring module.

12. The device of claim 1, wherein said obscured data that references at least one attribute of one or more devices in a manner that avoids particular identification of the one or more devices acquiring module comprises:
an obscured data that references at least one attribute of one or more devices in a manner that avoids particular identification of the one or more devices by inserting false identification data acquiring module.

13. The device of claim 1, wherein said one or more services designed to be at least partly executed through use of the one or more devices acquiring module comprises:
a friend-finding service configured to locate one or more entities identified in the smartphone and to present a notification on the smartphone when one or more of the located entities are detected at a particular location acquiring module, wherein said acquiring is at least partly based on a smartphone contact list property of having more than twenty-five contacts that are of a particular age.

14. The device of claim 1, wherein said one or more services designed to be at least partly executed through use of the one or more devices acquiring module comprises:
a one or more services designed to be at least partly executed through use the one or more devices request transmitting module, wherein said request is at least partly based on the acquired obscured data that avoids particular device identification; and
a receiving the requested one or more services module.

15. The device of claim 14, wherein said one or more services designed to be at least partly executed through use of the one or more devices request transmitting module comprises:
a one or more services designed to be at least partly executed through use of the one or more devices request transmitting to an open exchange module.

16. The device of claim 15, wherein said one or more services designed to be at least partly executed through use of the one or more devices request transmitting to an open exchange module comprises:
a one or more services designed to be at least partly executed through use of the one or more devices request posting to a social networking site module, wherein the one or more services include one or more of a bicycling trail information and status tracking application, a picture sorting service and a friend-in-picture counting services, a rest stop finding service, and a soda pop vending machine locating service.

17. The device of claim 1, wherein said one or more services designed to be at least partly executed using the one or more devices acquiring at least partly based on the acquired obscured data that avoids particular identification module comprises:
a one or more services designed to be at least partly executed using the one or more devices description receiving module; and
a one or more received described services designed to be at least partly executed using through use of the one or more devices selecting at least partly based on the acquired obscured data that avoids particular identification module.

18. The device of claim 17, wherein said one or more received described services designed to be at least partly executed through use of the one or more devices selecting module comprises:
a one or more received described services designed to be at least partly executed through use of the one or more devices selecting module, wherein the selecting is at least partly based on an estimated profitability of the one or more received described services.

19. The device of claim 17, wherein said one or more received described services designed to be at least partly executed through use of the one or more devices selecting module comprises:
a one or more received described services designed to be at least partly executed through use of the one or more devices selecting module, wherein the selecting is at least partly based on the acquired obscured data that avoids particular identification of the one or more devices and at least partly based on a property of the one or more received described services, wherein the property of the one or more received described services includes one or more of a property of an entity that provides the service, a reputation of the service developer, and an existence of a revenue-sharing deal with the entity that provides the service.

20. The device of claim 19, wherein said one or more received described services designed to be at least partly executed through use of the one or more devices selecting module comprises:
a one or more received described services designed to be at least partly executed through use of the one or more devices selecting module, wherein the selecting is at least partly based on the acquired obscured data that avoids particular identification of the one or more devices and at least partly based on a surcharge of the one or more received described services.

21. The device of claim 1, wherein said one or more services designed to be at least partly executed through use of the one or more devices acquiring at least partly based on the acquired obscured data that avoids particular identification module comprises:

a one or more services designed to be at least partly executed through use of the one or more devices acquiring at least partly based on an estimated value of data that identifies the one or more devices given in exchange for providing at least a portion of the one or more services module.

22. The device of claim 1, wherein said one or more services designed to be at least partly executed through use of the one or more devices acquiring module comprises:
a one or more services designed to be at least partly executed through use of the one or more devices developing module, wherein the developing is at least partly based on the acquired obscured data that avoids particular identification of the one or more devices.

23. The device of claim 1, wherein said acquired one or more services as return for access to particularly identifying data of the one or more devices associated with attribute data offering module comprises:
an acquired one or more services as return for access to particularly identifying data that identifies one or more users of the one or more devices associated with attribute data offering module.

24. The device of claim 1, wherein said acquired one or more services as return for access to particularly identifying data of the one or more devices associated with attribute data offering module comprises:
an acquired one or more services as return for access to marketplace login credentials used by at least one of the one or more devices associated with attribute data offering module.

25. The device of claim 1, wherein said acquired one or more services as return for access to particularly identifying data of the one or more devices associated with attribute data offering module comprises:
an acquired one or more services as return for access to social networking site login credentials used by at least one of the one or more devices associated with attribute data offering module.

26. The device of claim 1, wherein said acquired one or more services as return for access to particularly identifying data of the one or more devices associated with attribute data offering module comprises:
an acquired one or more services as return for access to particularly identifying data configured to deobscure the acquired obscured data offering module.

27. The device of claim 26, wherein said acquired one or more services as return for access to particularly identifying data configured to deobscure the acquired obscured data offering module comprises:
an acquired one or more services as return for access to particularly identifying data configured to decrypt the acquired obscured data offering module.

28. The device of claim 27, wherein said acquired one or more services as return for access to particularly identifying data configured to decrypt the acquired obscured data offering module comprises:
an acquired one or more services as return for access to particularly identifying data configured to decrypt a particular portion of the acquired obscured data offering module.

29. The device of claim 26, wherein said acquired one or more services as return for access to particularly identifying data configured to deobscure the acquired obscured data offering module comprises:
an acquired one or more services as return for access data configured to modify the acquired obscured data into particularly identifying data offering module.

30. The device of claim 26, wherein said acquired one or more services as return for access to particularly identifying data configured to deobscure the acquired obscured data offering module comprises:
an acquired one or more services as return for access data configured to replace a portion of the acquired obscured data with particularly identifying data offering module.

31. The device of claim 26, wherein said acquired one or more services as return for access to particularly identifying data configured to deobscure the acquired obscured data offering module comprises:
an acquired one or more services as return for access data configured to change an anonymized portion of the acquired obscured data into particularly identifying data offering module.

32. The device of claim 26, wherein said acquired one or more services as return for access to particularly identifying data configured to deobscure the acquired obscured data offering module comprises:
an acquired one or more services as return for access to data configured to substitute an anonymized portion of the acquired obscured data with particularly identifying data using a lookup table offering module.

33. The device of claim 26, wherein said acquired one or more services as return for access to particularly identifying data configured to deobscure the acquired obscured data offering module comprises:
an acquired one or more services as return for access to data filter out a false data portion of the acquired obscured data and leaving particularly identifying data as a remainder offering module.

34. The device of claim 26, wherein said acquired one or more services as return for access to particularly identifying data configured to deobscure the acquired obscured data offering module comprises:
an acquired one or more services as return for access to an algorithm for which application to the acquired obscured data results in particularly identifying data offering module.

35. The device of claim 1, wherein said acquired one or more services as return for access to particularly identifying data of the one or more devices associated with attribute data offering module comprises:
an acquired one or more services as return for access to a database of particularly identifying data of the one or more devices associated with attribute data offering module.

36. The device of claim 1, wherein said acquired one or more services as return for access to particularly identifying data of the one or more devices associated with attribute data offering module comprises:
an acquired one or more services as return for restricted access to a database of particularly identifying data of the one or more devices associated with attribute data offering module.

37. The device of claim 1, wherein said acquired one or more services as return for access to particularly identifying data of the one or more devices associated with attribute data offering module comprises:
a direct delivery to one or more users of the one or more devices, of one or more services as return for access to particularly identifying data of the one or more devices associated with attribute data offering module.

38. The device of claim 1, wherein said obscured data that references at least one attribute of one or more devices in a manner that avoids particular identification of the one or more devices acquiring module comprises:

an obscured data referencing at least one attribute of one or more devices in a manner that avoids particular identification of the one or more devices by replacing identification data with randomly generated data acquiring module.

39. The device of claim 1, wherein said obscured data that references at least one attribute of one or more devices in a manner that avoids particular identification of the one or more devices acquiring module comprises:

an obscured data referencing at least one attribute of one or more devices in a manner that avoids particular identification of the one or more devices by inserting false identification data having a same format as true identification data acquiring module.

40. A device, comprising:

one or more general purpose integrated circuits configured to receive instructions to configure as an obscured data that references at least one attribute of one or more devices in a manner that avoids particular identification of the one or more devices acquiring module at one or more first particular times;

one or more general purpose integrated circuits configured to receive instructions to configure as a one or more services designed to be at least partly executed through use of the one or more devices acquiring at least partly based on the acquired obscured data that avoids particular identification module at one or more second particular times; and one or more general purpose integrated circuits configured to receive instructions to configure as a acquired one or more services as return for access to particularly identifying data of the one or more devices associated with attribute data offering module at one or more third particular times.

41. A device comprising:

an integrated circuit configured to purpose itself as an obscured data that references at least one attribute of one or more devices in a manner that avoids particular identification of the one or more devices acquiring module at a first time;

the integrated circuit configured to purpose itself as a one or more services designed to be at least partly executed through use of the one or more devices acquiring at least partly based on the acquired obscured data that avoids particular identification module at a second time; and the integrated circuit configured to purpose itself as a acquired one or more services as return for access to particularly identifying data of the one or more devices associated with attribute data offering module at a third time.

* * * * *